(12) United States Patent
Yribarren

(10) Patent No.: US 8,232,474 B2
(45) Date of Patent: Jul. 31, 2012

(54) APPARATUSES, SYSTEMS, AND METHODS FOR INHIBITING THE REMOVAL OF CABLE FROM CONDUIT

(76) Inventor: Richard J. Yribarren, Tranquillity, CA (US)

(*) Notice: Subject to any disclaimer, the term of this patent is extended or adjusted under 35 U.S.C. 154(b) by 540 days.

(21) Appl. No.: 12/420,474

(22) Filed: Apr. 8, 2009

(65) Prior Publication Data

US 2009/0301777 A1    Dec. 10, 2009

Related U.S. Application Data

(60) Provisional application No. 61/060,096, filed on Jun. 9, 2008, provisional application No. 61/107,399, filed on Oct. 22, 2008.

(51) Int. Cl.
*H01R 4/00* (2006.01)

(52) U.S. Cl. .................................................. 174/99 R

(58) Field of Classification Search ............... 174/74 R, 174/77 R, 80, 81, 82, 84 R, 88 R, 88 S, 650, 174/656, 657, 658, 659, 663, 664; 248/56; 439/462, 584

See application file for complete search history.

(56) References Cited

U.S. PATENT DOCUMENTS

| | | | |
|---|---|---|---|
| 1,851,940 A | | 3/1932 | Williams |
| 1,988,667 A | * | 1/1935 | Smalley .................... 52/147 |
| 2,938,692 A | * | 5/1960 | Bosworth et al. ............ 248/68.1 |
| 3,127,471 A | * | 3/1964 | Greiner ........................ 174/135 |
| 3,360,766 A | * | 12/1967 | Schumacher ................. 439/472 |
| 3,454,291 A | | 7/1969 | Goldsobel et al. |
| 3,667,640 A | | 6/1972 | Morrow |
| 4,191,334 A | * | 3/1980 | Bulanda et al. ............. 24/16 PB |
| 4,262,166 A | | 4/1981 | Radzishevsky et al. |
| 4,767,086 A | | 8/1988 | Blomqvist |

(Continued)

FOREIGN PATENT DOCUMENTS

DE    20 2005 000 757    3/2005

(Continued)

OTHER PUBLICATIONS

Printout of http://www.cablecuff.com/; retrieved on Apr. 8, 2009.

(Continued)

*Primary Examiner* — William Mayo, III
(74) *Attorney, Agent, or Firm* — Marcus N. DiBuduo; Mark D. Miller

(57) ABSTRACT

Apparatuses, systems, and methods for securing one or more wires or cables relative to a conduit, for example, an underground conduit, an above ground conduit, or a conduit disposed in a building. The inhibiting device can hinder or prevent the removal of such wires or cables from the conduit by compressing the wires or cables between a clamp and a portion of the inhibiting device and/or conduit at a location that is not co-axial with a central axis of the conduit. As a result, a resistive frictional load is applied to the wires or cables which has a vector generally parallel and opposite to a removal force and a vector generally perpendicular to the removal force. In some embodiments, the inhibiting device can include a bolt, fabric, nylon, polymer, or compression type clamp. In some embodiments, a system can include a plurality of clamps which are transversely and axially separated.

66 Claims, 25 Drawing Sheets

U.S. PATENT DOCUMENTS

| | | | |
|---|---|---|---|
| 4,869,687 A * | 9/1989 | Johnson | 439/470 |
| 5,042,114 A | 8/1991 | Parrish | |
| 5,178,559 A * | 1/1993 | Mello | 439/472 |
| 5,383,796 A * | 1/1995 | Bowen et al. | 439/469 |
| 5,455,391 A | 10/1995 | Demesmaeker et al. | |
| 5,553,787 A * | 9/1996 | Guginsky | 439/472 |
| 5,729,872 A | 3/1998 | Ginocchio | |
| 5,783,776 A | 7/1998 | Birmingham et al. | |
| 5,939,676 A | 8/1999 | Birmingham et al. | |
| 5,957,239 A * | 9/1999 | Marshak | 182/150 |
| 6,101,684 A | 8/2000 | Ginocchio | |
| 6,140,582 A * | 10/2000 | Sheehan | 174/669 |
| 6,327,753 B1 * | 12/2001 | Rushing | 24/135 N |
| 6,647,187 B2 | 11/2003 | Consonni et al. | |
| 6,875,926 B2 | 4/2005 | Buekers et al. | |
| 7,446,267 B2 | 11/2008 | Hedstrom | |
| 2007/0020974 A1 | 1/2007 | Carlson | |
| 2007/0232153 A1 | 10/2007 | Funtmann | |

FOREIGN PATENT DOCUMENTS

| | | | |
|---|---|---|---|
| DE | 2005000757 | * | 3/2005 |
| GB | 2 025 555 | | 1/1980 |
| GB | 2025555 | * | 1/1980 |
| GB | 2 183 405 | | 6/1987 |
| GB | 2183405 | * | 6/1987 |
| WO | WO/98/25329 | | 11/1998 |
| WO | WO/02/073762 | | 9/2002 |

OTHER PUBLICATIONS

Spears Manufacturing Company; Thermoplastic Valves & Accessories: Product Guide & Engineering Specifications (22nd Edition, 2009); downloaded on Jul. 29, 2010 at http://www.spearsmfg.com/V-4/V-4_Files/V-4-1207A_0209_complete_web.pdf; entire brochure and in particular pp. 52-57 on gate valves.

* cited by examiner

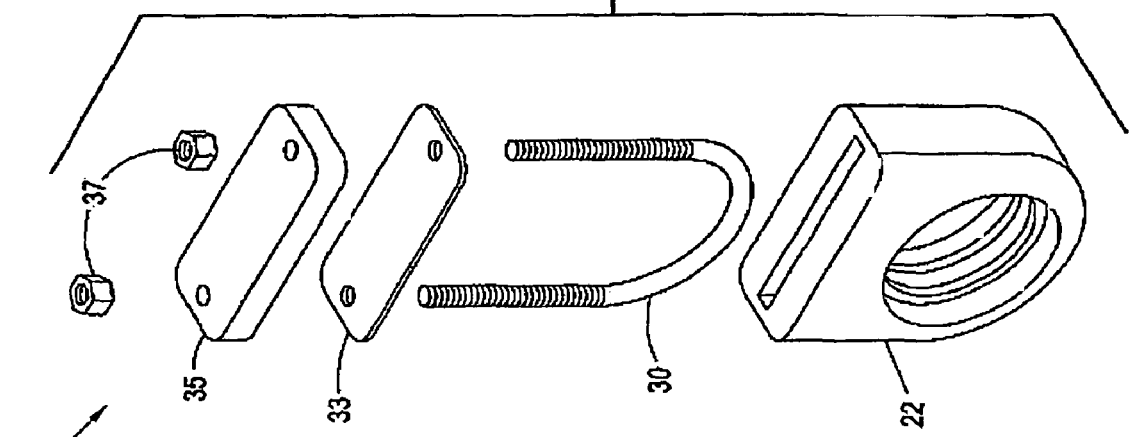
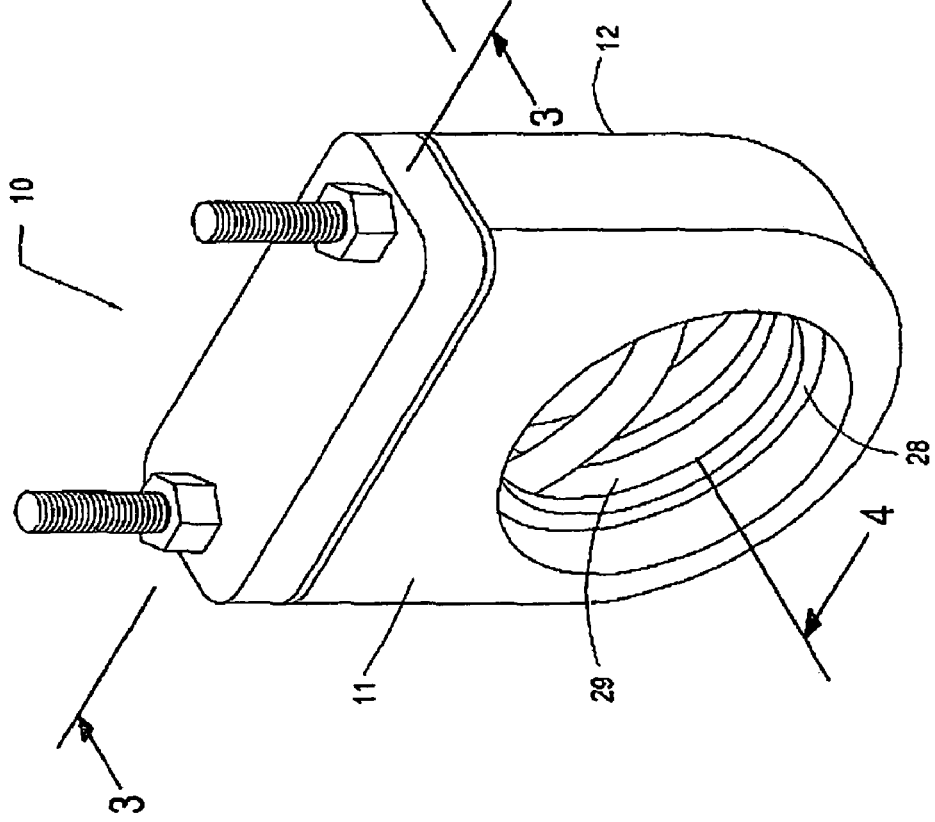

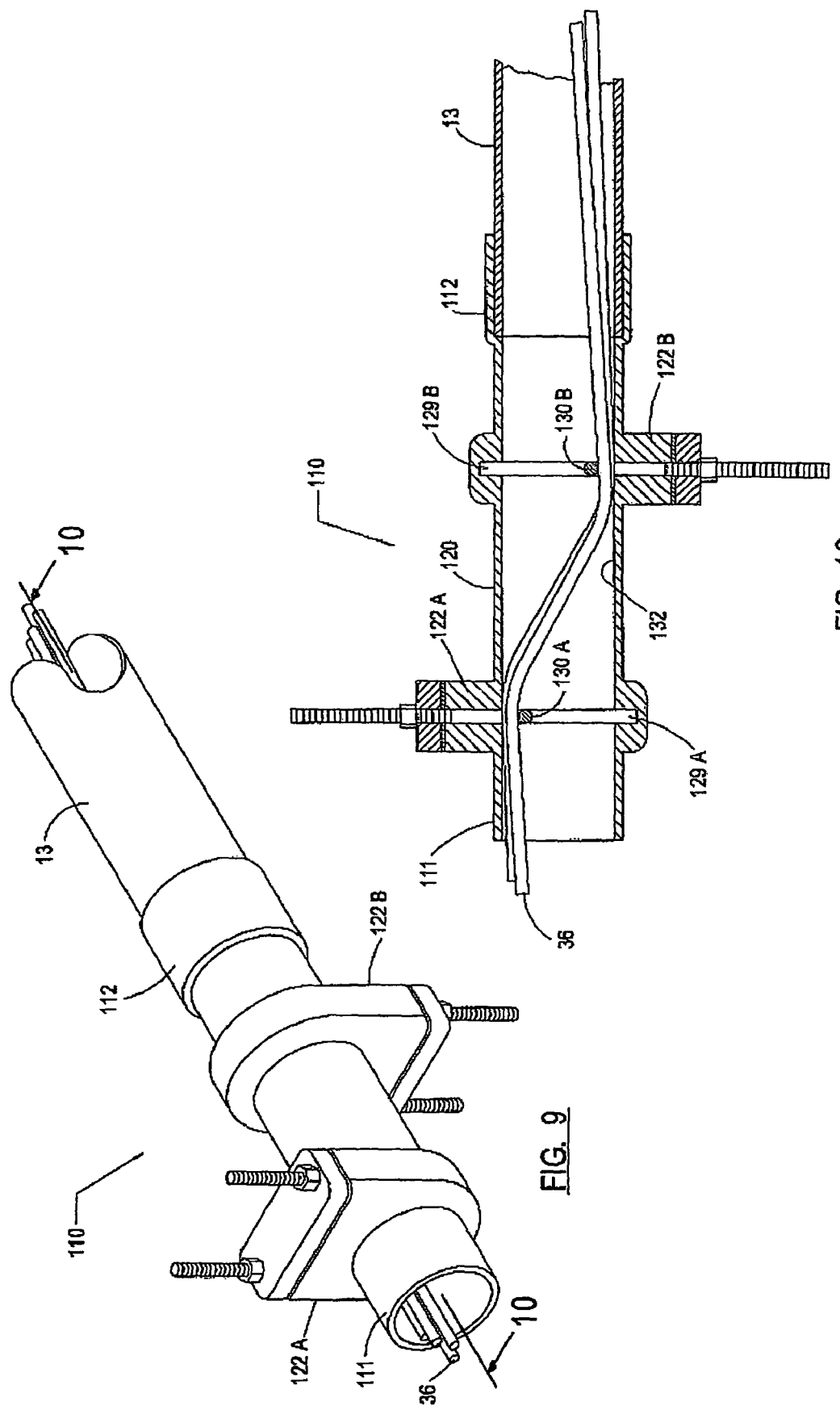

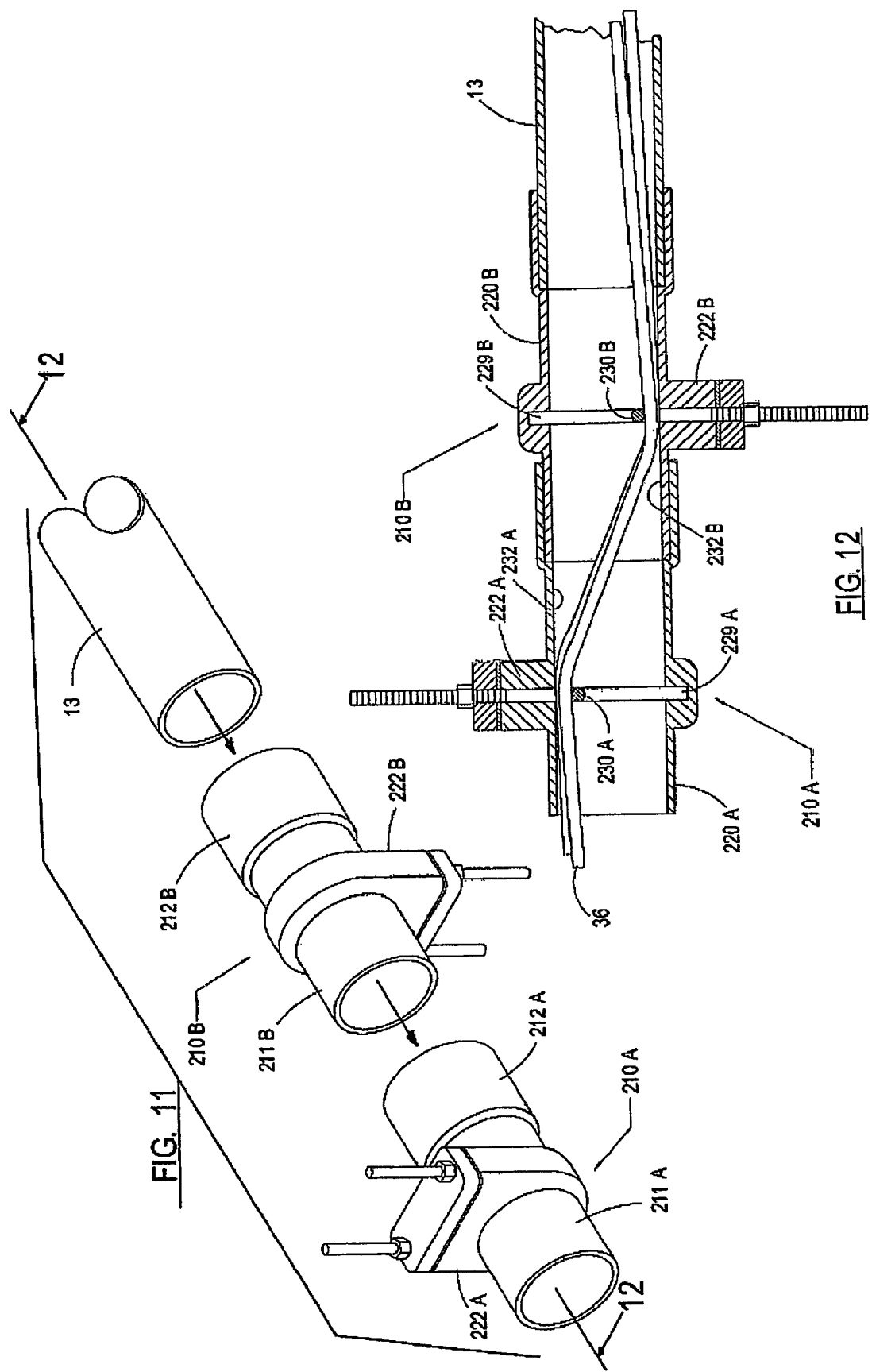

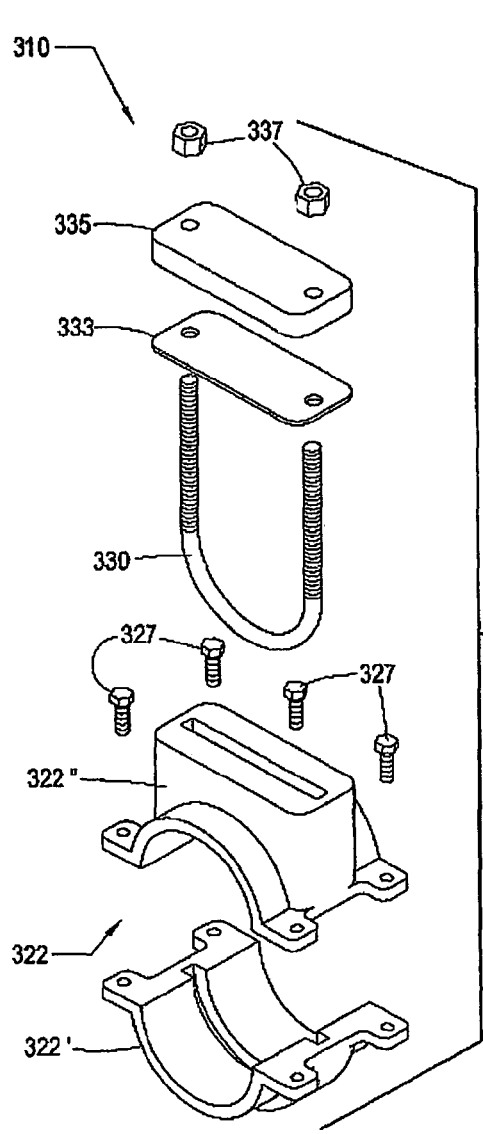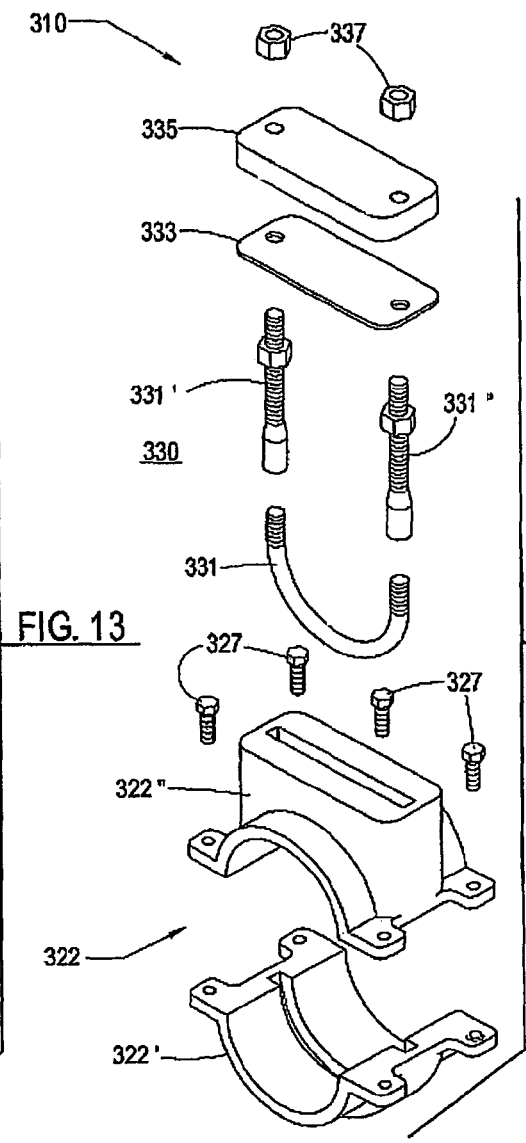

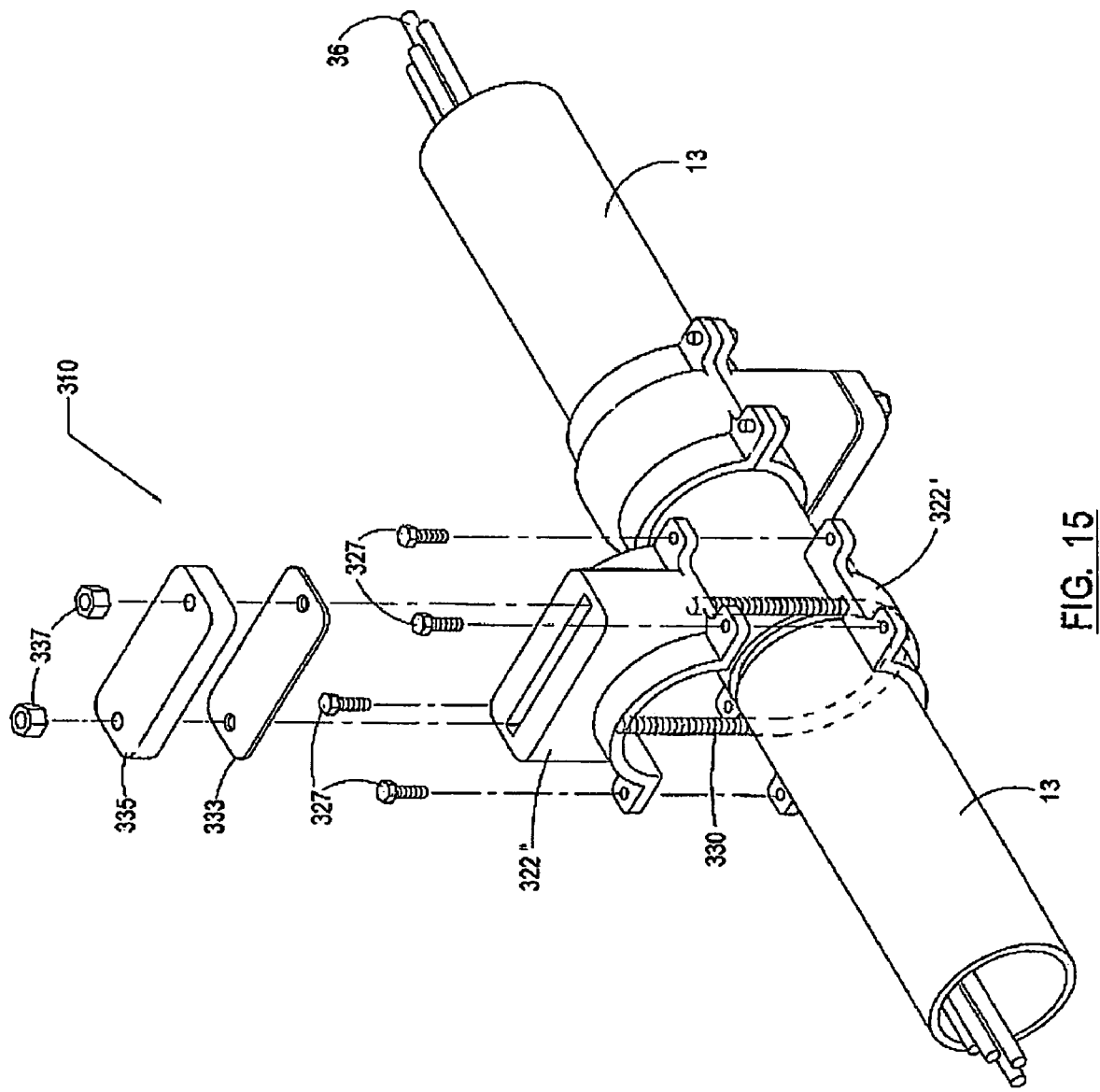

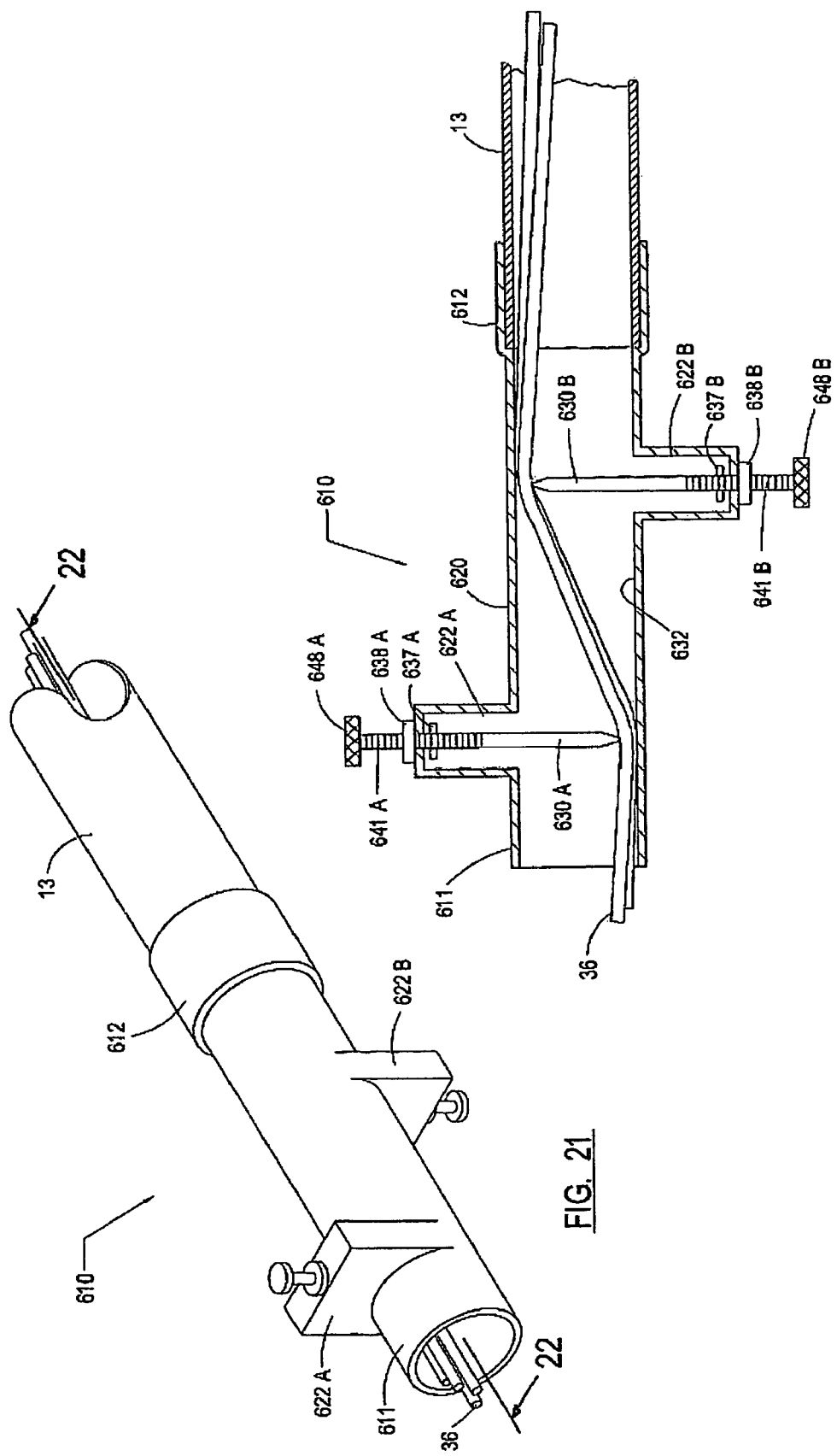

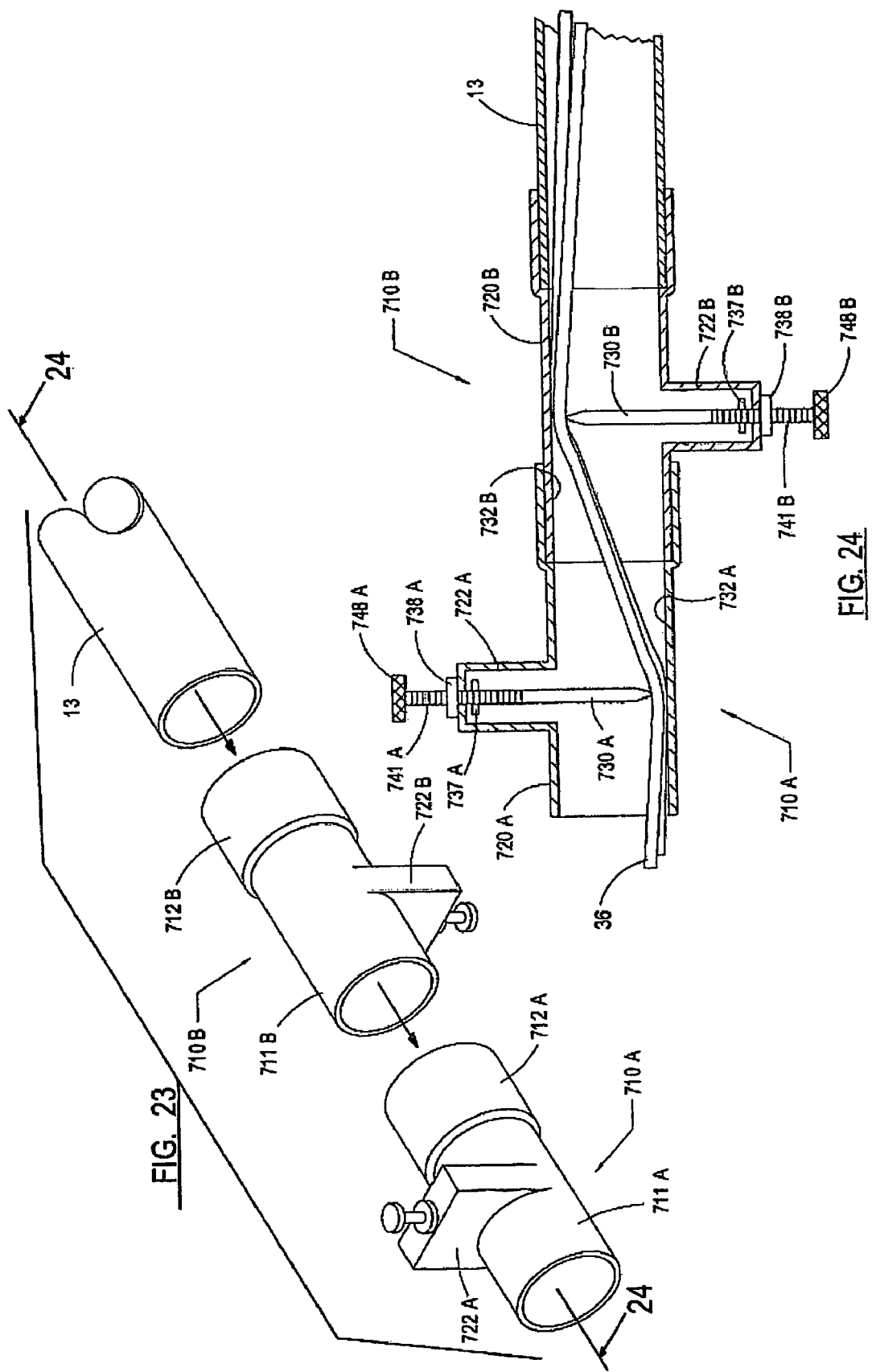

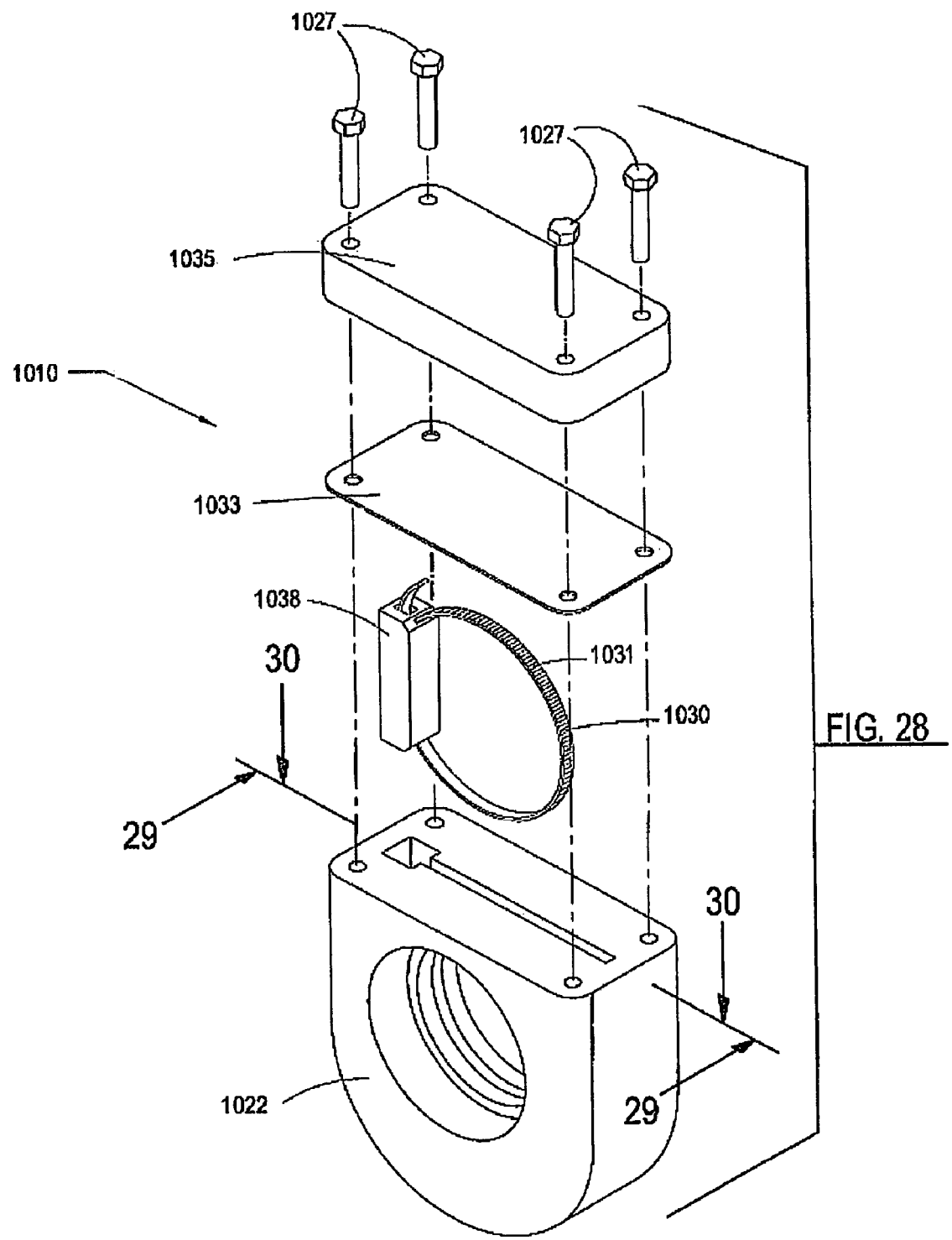

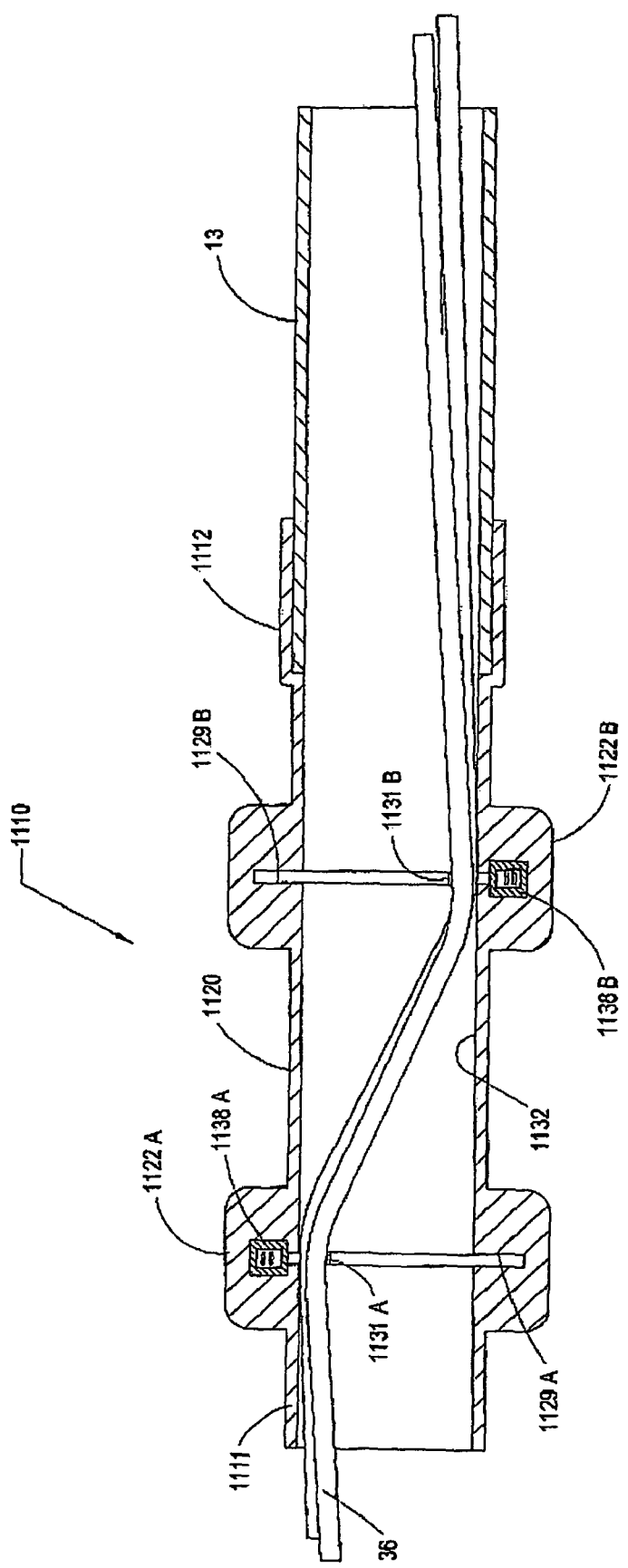

APPARATUSES, SYSTEMS, AND METHODS FOR INHIBITING THE REMOVAL OF CABLE FROM CONDUIT

RELATED APPLICATIONS

This application claims the benefit of U.S. Provisional Patent Application No. 61/060,096, filed on Jun. 9, 2008, and of U.S. Provisional Patent Application No. 61/107,399, filed on Oct. 22, 2008, each of which are hereby incorporated by reference in their entirety.

BACKGROUND OF THE INVENTION

1. Field of the Invention

This invention is generally related to inhibiting the removal of cable or wire from a conduit. More particularly, embodiments of the present invention pertain to apparatuses, systems and methods for applying a restraining load to one or more wires or cables resulting in the prevention of unwanted theft or removal of such wires or cables from the conduit.

2. Background and Description of Related Art

Wire and cable are widely used for the communication of signals. Wire can be formed from different materials such as metals, plastics, or ceramics, each of which are particularly suited for the efficient transmission of different signals, e.g. metal conducts electrical signals, glass conducts light signals, etc. Although a cable generally contains numerous individual strands of wires, some cables can include a single strand of wire. While this disclosure will particularly refer to cables comprising multiple metal wires, given its importance in the context of contemporary applications, it is to be appreciated that the instant invention may also be useful for hindering removal of wires or cables made from other well-known materials or materials yet to be discovered or widely used in industry.

A common metal used in the manufacture of electrical wire is copper. As the market value of copper and other metals used for the manufacture of wire increases, the rate of wire theft also tends to increase. Stolen wire can be redeployed in another application, or most commonly, sold as raw material in the original or a modified form for a profit. Unfortunately, due to the ease of access to electrical wires, the ease of processing the wire to a different form, and the difficulty in tracking the metal origin, this is a very difficult crime to prevent and solve.

One easily accessible source of wire for wire theft are electrical pull boxes which are commonly utilized in most communities in the United States and throughout the world. Electrical pull boxes generally have a box-like configuration with a removable lid and one or more conduit entry points to receive wire into the inner chamber defined by the walls and lid of the pull box. The typical electrical pull box may be configured to receive wire into the chamber through one or more sides of the pull box and allows wire to exit the chamber through one or more of the sides. The incoming wires can be connected to the outgoing wires in the chamber. In the typical configuration, the incoming and outgoing wires are disposed in appropriately configured and sized conduits to protect the wire from exposure to the elements and to reduce the likelihood of damage or other mishap which may cause a disruption in the transmission.

Pull boxes are attractive targets for thievery since they are typically located in areas that can be accessed discretely. Since the wires are generally free, i.e. unsecured within the pull box or conduit, they can be removed relatively easily; all the thief has to do is to take the pull box lid off, cut the wires at their connection and then pull on the wires to remove them from the conduit.

Another target of wire theft is wires or cables which are disposed within a tubular conduit. The conduit provides protection to the wires or cables within the conduit from the elements and the surrounding environment. In some examples, the conduit may be placed underground while in other examples the conduit may be disposed above ground. In yet other examples, the conduit may be disposed inside portions of a building, such as in the rafters, basement, or between the walls. In some implementations, the conduit may have a significantly long length, for example over one hundred meters. Sometimes, then, the conduit may comprise multiple sections of conduit that are connected end to end.

Underground wire is typically stolen by a thief grasping an end of the wire or cable by hand and pulling it from the conduit. In other examples, underground wire can be stolen by first attaching one end of the wire or cables to a traction device such as the tow-bar of a sufficiently powerful vehicle. The vehicle is usually driven away, pulling the cable in an axial direction and removing it from the conduit. Frequently such thefts are carried out on newly laid cables, or cables that have been partially laid such that an end is easily accessible. Nonetheless, when the wires are not easily accessible, the thief may dig toward the underground wire conduit in order to free a wire end to allow for removal as described above.

Wire theft represents a sizable cost both to the owner and to society at large. To the owner, in addition to the cost of replacing the wire, there is additional labor and equipment costs associated with installing the replacement wire. These costs can run into the hundreds of dollars, and in some instances, thousands of dollars. To a society, the unauthorized removal of wire may disrupt community power, communications, etc. It can also result in an increased risk of harm to the person or property of those affected by the disruption. Further, these disruptions may lead to a general reduction in the productivity and well-being of the society.

Over the years, various devices have been developed to deter or prevent theft of wire or cable from a conduit. For instance, U.S. Patent Application Publication No. 2007/0020974 to Carlson discloses a tamper resistant plug configured to prevent unauthorized persons from pulling wires out of a conduit. Further in the art, WIPO Patent Publication No. 02/073762 to Theron, et al., discusses a method of combating the theft of an underground cable in which there is secured to the outside surface of a cable, at spaced intervals along the length thereof, a series of obstructive elements, each of which, engages the outer surface of the cable either frictionally or physically. However, the devices disclosed in each of these references are inadequate in that they apply retention force in the same direction as the removal force. As such, when a removal force in the axial direction exceeds the retention force, the wire or cable may be removed.

Therefore, there is a need for apparatuses, systems and methods that can effectively and economically restrain or hinder the rapid removal of one or more wires or cables within a conduit, thus deterring theft of such wires or cables.

SUMMARY OF THE INVENTION

Embodiments of the present invention provide apparatuses, systems and methods for inhibiting the removal of an axially disposed device.

In some embodiments of the present invention, an apparatus can include a clamp at least partially enclosed in a clamp guide, the clamp guide having an opening for axially receiving the device therein. The apparatus can frictionally compress the device between the clamp and an inner surface of one of the group consisting of the clamp guide, the conduit, and combinations thereof. The clamp can be secured to the clamp guide by a securing mechanism.

In some implementations, in accordance with some embodiments of the present invention, a proximal edge of a clamp can compress the cable at a location where the axis of movement of the clamp substantially intersects a vector running generally perpendicular from the central axis of the conduit towards the securing mechanism. In some examples, and without limitation, the clamp can be a rigid fastener. In other examples, the clamp can be a flexible material having a high tensile strength. In other examples, the clamp can include a flexible portion and a rigid portion. In other implementations in accordance with some embodiments of the present invention, a distal end of the clamp can compress the cable at a location where the axis of movement of the clamp substantially intersects a vector running generally perpendicular from the central axis of the conduit away from the securing mechanism. In some examples, and without limitation, the clamp can have a distal end comprising a deformable or compressible material.

In some embodiments of the present invention, a system for inhibiting the removal of a linear device can include: a first inhibiting means engaged with a first section of the conduit, wherein the first inhibiting means is capable of axially receiving the linear device; a second inhibiting means engaged with a second section of the conduit wherein the second inhibiting means is capable of axially receiving the linear device; and a coupling means engaged with the first inhibiting means and the second inhibiting means. Each of the first and the second inhibiting means can frictionally press the device against an inner portion of one of the group consisting of the first inhibiting means, the second inhibiting means, the coupling means, the first section of the conduit, the second section of the conduit, and combinations thereof.

In some embodiments of the present invention, a method of inhibiting the removal of a device axially disposed within a clamp guide can include the step of compressing the axially disposed device between (i) a movable clamp at least partially enclosed within the clamp guide and (ii) an inner surface of one of the group consisting of the clamp guide, a conduit engaged with the clamp guide, and combinations thereof.

In some embodiments of the present invention, a method of inhibiting the removal of a linear device axially disposed within a conduit can include the steps of: engaging a first inhibiting device to the conduit, the inhibiting device comprising a body, a clamp, and a securing mechanism, wherein the body has an opening for axially receiving the linear device therein; compressing the linear device between the clamp and an inner surface of one of the group consisting of the body, the conduit, and combinations thereof; and causing the securing mechanism to prevent the clamp from moving with respect to the body. In some implementations, the method can further include the step of engaging a second inhibiting device to the first, where the inhibiting devices can be transversely and/or axially separated relative to a central axis of the conduit.

In some embodiments of the present invention, an apparatus for inhibiting the removal of an axially disposed device can include: a housing for engaging a conduit and receiving the axially disposed device, the housing enclosing at least one movable clamp capable of frictionally compressing the axially disposed device; and a mechanism for securing the position of the clamp with respect to the housing.

In some embodiments of the present invention, an apparatus for preventing the removal of a wire axially disposed in a housing can include a movable clamp at least partially enclosed in the housing and a lock to fix the position of the clamp with respect to the housing, wherein the clamp is configured to frictionally compress the wire against an inner surface of the housing.

In some embodiments of the present invention, an apparatus for restraining a wire disposed in a conduit can include: a housing with a first end for engaging with a first section of the conduit and a second end for engaging with a second section of the conduit; a U-bolt at least partially enclosed in the housing, the U-bolt having a bent portion and two extended portions, wherein the extended portions protrude through at least one opening in the housing; and at least two nuts for attachment to the extended portions. The wire can be disposed in the housing and frictionally compressed between the bent portion of the U-bolt and the housing when the nuts are secured on the extended portions.

In some embodiments of the present invention, an apparatus for restraining a wire disposed in a conduit can include: a housing with a first end for engaging with a first section of the conduit and a second end for engaging with a second section of the conduit; and a strap at least partially enclosed in the housing, the strap having a first end engaged with a key disposed within a lock, wherein the key comprises a gear rack and the lock comprises a ratchet corresponding to the gear rack. The wire can be disposed in the housing and frictionally compressed between the strap and the housing when the key is rotated in the lock.

In some embodiments of the present invention, an apparatus for restraining a wire disposed in a conduit can include: a housing with a first end for engaging with a first section of the conduit and a second end for engaging with a second section of the conduit; a bolt having a first end inside the housing and a second end outside of the housing, wherein the first end has a deformable member attached thereto; a roll pin engaged with the bolt at a location inside of the housing; and a lock nut engaged with the bolt at a location outside the housing. The wire can be disposed in the housing and frictionally compressed between the deformable member and the housing when the bolt is rotated with respect to the roll pin.

In some embodiments of the present invention, an apparatus for restraining a wire disposed in a conduit can include: a housing with a first end for engaging with a first section of the conduit and a second end for engaging with a second section of the conduit; and a nylon tie having a first end with an integrated gear rack protruding through a first opening in the housing and a second end with an integrated ratchet protruding through a second opening in the housing. The wire can be disposed in the housing and frictionally compressed between the tie and the housing when the gear rack is engaged with the ratchet.

In some embodiments of the present invention, an apparatus for restraining a wire disposed in a conduit can include: a clamp comprising a rigid portion, a strap with an integrated gear rack, and at least one ratchet; and a housing with a first end for engaging with a first section of the conduit and a second end for engaging with a second section of the conduit, wherein the housing has a cavity formed therein for receiving the rigid portion of the clamp. The wire can be disposed in the housing and frictionally compressed between the strap and the housing when the gear rack is engaged with the ratchet.

In some embodiments of the present invention, an apparatus for restraining a wire disposed in a conduit can include: a clamp comprising a rigid portion, a strap with an integrated gear rack, and at least one ratchet; and a housing with a first end for engaging with a first section of the conduit and a second end for engaging with a second section of the conduit, wherein the housing has a cavity formed therein for receiving the rigid portion of the clamp. The wire can be disposed in the housing and frictionally compressed between the strap and the rigid portion when the gear rack is engaged with the ratchet.

In some embodiments of the present invention, a method for restraining a wire disposed in a conduit can include the steps of: engaging a first end of a housing with a first section of the conduit and engaging a second end of the housing with a second section of the conduit, wherein the housing has a cavity for receiving the wire between the first end and the second end; moving a U-bolt having a bent portion and two extended portions, wherein the bent portion of the U-bolt is enclosed in the housing and wherein the ends of the extended portions protrude through at least one opening in the housing; and tightening nuts attached to the extended portions of the U-bolt until the wire is frictionally compressed between the bent portion of the U-bolt and the housing.

In some embodiments of the present invention, a method for restraining a wire disposed in a conduit can include the steps of: engaging a first end of a housing with a first section of the conduit and engaging a second end of the housing with a second section of the conduit, wherein the housing has a cavity for receiving the wire between the first end and the second end; engaging an integrated gear rack portion of a nylon strap with an integrated ratchet portion of the nylon strap, wherein the gear rack portion protrudes through a first opening in the housing and the ratchet portion protrudes through a second opening in the housing, the strap forming a loop inside the housing; and pulling the integrated rack portion through the ratchet portion until the wire is frictionally compressed against the housing.

In some embodiments of the present invention, a method for restraining a wire disposed in a conduit can include the steps of: engaging a first end of a housing with a first section of the conduit and engaging a second end of the housing with a second section of the conduit, wherein the housing can receive the wire between the first end and the second end; engaging an integrated gear rack portion of a clamp with an integrated ratchet portion of the clamp, wherein the integrated ratchet portion forms a loop and is at least partially passed through a rigid portion of the clamp; placing the rigid portion of the clamp in a cavity formed in the housing; and pulling the integrated rack portion through the ratchet portion until the wire is frictionally compressed against one of the group consisting of the housing, the rigid portion, and combinations thereof.

These and other objects, advantages, and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1 is a perspective view of an exemplary apparatus for hindering the removal of a wire or cable from a conduit in accordance with some embodiments of the present invention.

FIG. 2 is an exploded perspective view of the exemplary apparatus of FIG. 1.

FIG. 9 is a perspective view of another exemplary system for hindering the removal of a wire or cable from a conduit in accordance with some embodiments of the present invention.

FIG. 10 is a cross sectional view of the exemplary system of FIG. 9, taken along the 10-10 lines.

FIG. 11 is a perspective view of another exemplary system for hindering the removal of a wire or cable from a conduit in accordance with some embodiments of the present invention.

FIG. 12 is a cross sectional view of the exemplary system of FIG. 11, taken along the 12-12 lines.

FIG. 13 is an exploded perspective view of another exemplary apparatus for hindering the removal of a wire or cable from a conduit in accordance with some embodiments of the present invention.

FIG. 14 is an exploded perspective view of another exemplary apparatus for hindering the removal of a wire or cable from a conduit in accordance with some embodiments of the present invention.

FIG. 15 is an exploded perspective view of an exemplary system incorporating the exemplary apparatuses of FIG. 13 or 14 in accordance with some embodiments of the present invention.

FIG. 21 is a perspective view of another exemplary system for hindering the removal of a wire or cable from a conduit in accordance with some embodiments of the present invention.

FIG. 22 is a cross sectional view of the exemplary system of FIG. 21, taken along the 22-22 lines.

FIG. 23 is an exploded perspective view of another exemplary system for hindering the removal of a wire or cable from a conduit in accordance with some embodiments of the present invention.

FIG. 24 is a cross sectional view of the exemplary system of FIG. 23, taken along the 24-24 lines.

FIG. 28 is a perspective view of an exemplary apparatus for hindering the removal of a wire or cable from a conduit in accordance with some embodiments of the present invention.

FIG. 36 is a cross sectional view of the exemplary system of FIG. 35, taken along the 36-36 lines.

DETAILED DESCRIPTION OF THE PREFERRED EMBODIMENTS

Figure 3:
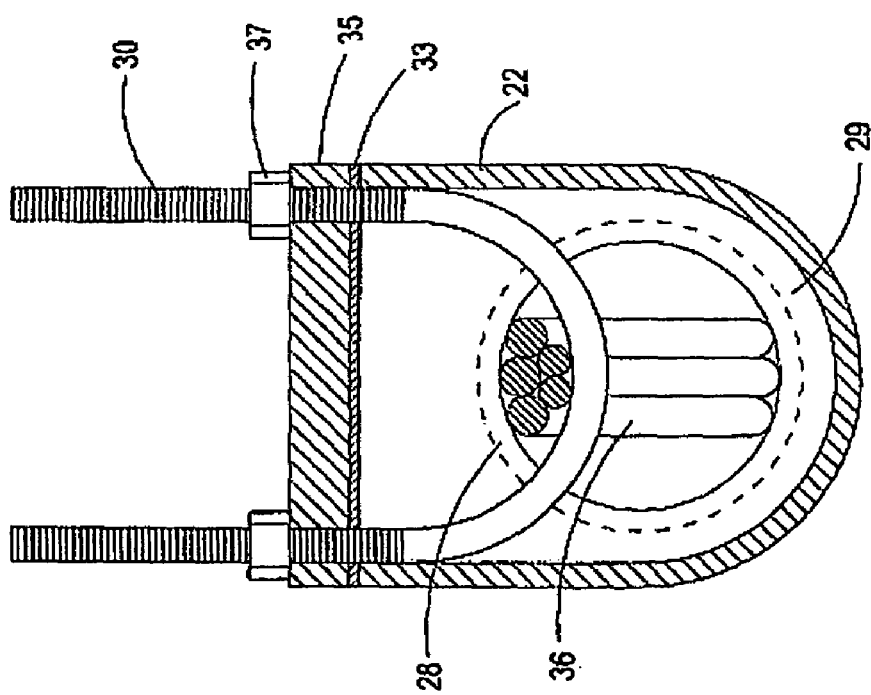
FIG. 3 is a cross sectional view of the exemplary apparatus of FIG. 1, taken along the 3-3 lines.

The invention, in its various aspects, will be explained in greater detail below. While the invention will be described in conjunction with several exemplary embodiments, the exemplary embodiments themselves do not limit the scope of the invention. Similarly, the exemplary embodiments as illustrated in the accompanying drawings, wherein like or similar reference characters designate like or corresponding parts throughout the several views and examples, do not limit the scope of the exemplary embodiments and/or of the invention. Rather the invention, as defined by the claims, may cover alternatives, modifications, and/or equivalents of the exemplary embodiments. It is to be appreciated that although the invention is described in conjunction with inhibiting the removal of a cable from a conduit, some embodiments of the invention also contemplate inhibiting the removal of one or more individual wires. It is also to be appreciated that some embodiments of the invention contemplate inhibiting the removal of other linear structures or devices that may be axially disposed within a conduit. For example, some embodiments of the present invention may also contemplate hindering the removal of copper tubing from conduits. Thus, it is to be appreciated that, for the sake of convenience and simplicity, the terms "wire", "cable", "cord", "string", "line", "wiring", "tubing", and "linear structure" may generally be used interchangeably herein, but are generally also given their art-recognized meanings.

An Exemplary Apparatus for Inhibiting the Removal of Cable from Conduit

Referring to the drawings, and specifically to FIGS. 1-4, an exemplary inhibitor 10 may comprise first end 11 and second end 12. First end 11 and second end 12 may each be configured to engage a section of tubular conduit (for example, conduit 13A, 13B) in at least one opening therein. For example, and without limitation, first end 11 may have an opening therein for engaging first conduit 13A and second end 12 may have a similar and corresponding opening therein for engaging second conduit 13B. In some embodiments, openings in first end 11 and openings in second end 12 may be parallel relative to each other such that conduit 13A is coaxial with conduit 13B. In some embodiments, openings in first end 11 and second end 12 may be angled relative to each other such that conduit 13A is angled relative to conduit 13B. For example, and without limitation, inhibitor 10 may provide for an elbow in a long run of conduit sections by having a first end 11 oriented forty five degrees with respect to second end 12. It is to be appreciated the other relative angles between the ends are also contemplated in accordance with some embodiments of the present invention.

As illustrated in the example of FIG. 1, first end 11 and second end 12 may have circular openings for engaging a conduit. In some embodiments, the ends may have oval, square, rectangular or any other shape openings thereof for engaging correspondingly shaped conduit. In some embodiments, the openings in first end 11 and second end 12 may not have the same shape. For example, and without limitation, first end 11 can include a square shaped opening for engaging a square shaped conduit and opening 12 can include an oval shaped opening for engaging an oval shaped conduit. It is to be appreciated that other shapes and combinations thereof are also contemplated in accordance with some embodiments of the present invention.

In some embodiments, conduit may engage ends 11 and 12 of inhibitor 10 by a snap fit connection. In some embodiments, ends 11 and 12 may be configured to receive the conduit in a press, interference, or sliding fit. In some embodiments, the conduit can be secured to, and maintained with, the inhibitor by sealants or adhesives. For example, and without limitation, pipe glue may be applied to the interface between the conduit and openings in end 11 and/or end 12 for permanently fixing the conduit therein. In other examples, a sealant ring such as an O-Ring may be disposed in the interface between the conduit and the openings. In some embodiments, a variety of mechanical fasteners such as screws, bolts, hooks, loops or rivets may be used to secure the inhibitor and the conduit. It is to be appreciated that securing the conduit to the inhibitor serves not only to increase the mechanical stability but also to prevent water, earth, and other materials from seeping into the conduit and degrading the cable or wires therein. It is to be appreciated that other fastening and securing means are contemplated in accordance with some embodiments of the present invention.

Referring now to the exemplary apparatus as illustrated in FIG. 2, inhibitor 10 may comprise a number of subcomponents. In some embodiments, inhibitor 10 may include clamp guide 22 for engaging conduit (not shown) through openings in first and second ends and a slot for receiving clamp 30. In some embodiments in accordance with the present invention, clamp 30 may be a rigid fastener. For example, and without limitation, clamp 30 may be a U-Bolt, J-Bolt, V-Bolt, M-Bolt, L-Bolt, or any other bent fastener. In some embodiments, and as will be discussed more fully below, the clamp may comprise a fabric material or webbing or a compression member.

In some embodiments, clamp 30 may have securing features and inhibitor 10 may additionally include devices having complementary securing features. In some embodiments, clamp 30 may have at least one threaded end for engaging a corresponding securing mechanism 37. For example, securing mechanism 37 may have threaded features that are sized and configured to engage with complementary threaded features of clamp 30. In other examples, the clamp may have a plurality of registers for engaging with one or more pins. It is to be appreciated that other securing features and combinations thereof are contemplated in accordance with some embodiments of the present invention.

Inhibitor 10 may further include washer 35 for distributing a load of clamp 30. In some embodiments, inhibitor 10 may include a seal 33 for securing the interface between washer 35 and clamp guide 22. In some embodiments, seal 33 can be formed of a deformable or compressible material which may be compressed between washer 35 and clamp guide 22 so as to seal the slotted opening in clamp guide 22 wherein clamp 30 can be disposed. In some embodiments, each of washer 35 and seal 33 may be configured with openings for receiving portions of clamp 30.

While a preferred embodiment includes a clamp 30 and hexagonal securing mechanism 37, it is to be appreciated that other clamping and securing mechanisms may be provided in accordance with some embodiments of the present invention. As illustrated in the exemplary embodiment of FIG. 2, securing mechanism 37 may be a hexagonal fitting configured to be engaged by a socket or box-end wrench. However, in some examples, and without limitation, the securing mechanism may be engaged by a drive shaft that is rotated by a motor or engine. In use, securing mechanism 37 may be secured over threaded portions of clamp 30 and rotated in relation thereto until washer 35 is sealed against a top portion of clamp guide 22 by seal 33. The relative motion between threaded securing mechanism 37 and threaded clamp 30 causes movement of the clamp 30 within clamp guide 22 in the direction towards securing mechanism 37. It is to be appreciated that other means of moving the clamp relative to the clamp guide are contemplated in accordance with some embodiments of the present invention. For example, the clamp may be coupled to a hydraulically or pneumatically driven piston.

Figure 4:
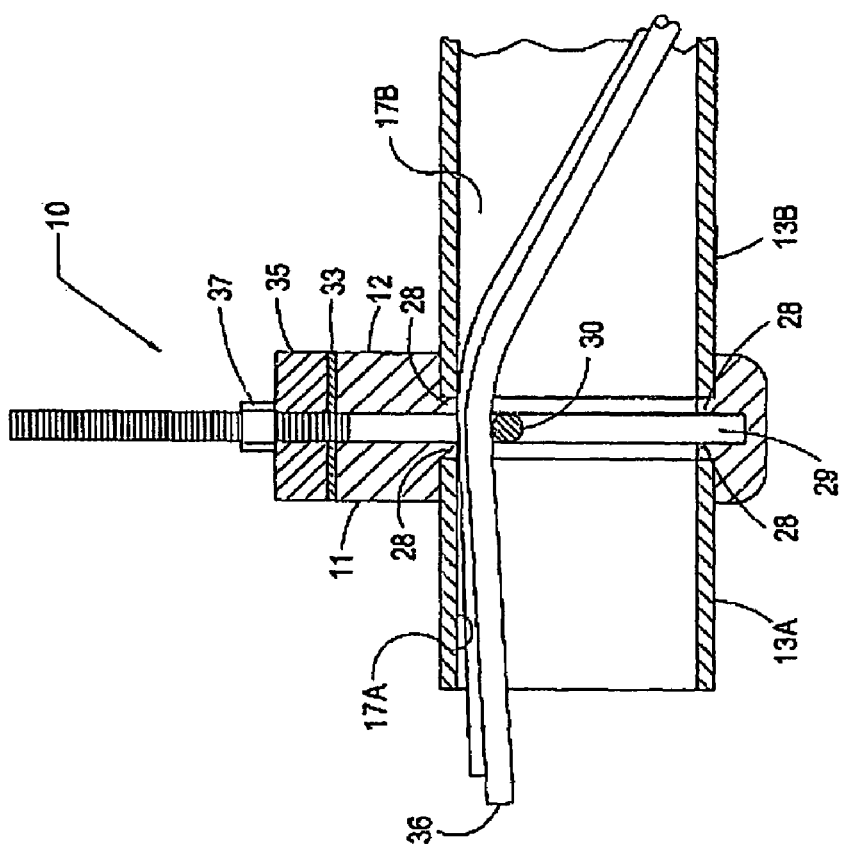
FIG. 4 is a cross sectional view of the exemplary apparatus of FIG. 1, taken along the 4-4 lines.

As illustrated in the example of FIG. 4, and in accordance with some embodiments of the present invention, a distal portion of clamp 30 may initially be positioned in cavity 29 of clamp guide 22 such that device 36 (for convenience, and without limitation, hereafter "cable" 36) may be positioned between a proximal portion of clamp 30 and a portion of clamp guide 22. By imparting relative and rotational movement on securing mechanism 37, clamp 30 can be moved towards an inside portion of clamp guide 22, thereby pressing cable 36 between clamp 30 and portion 28 of clamp guide 22. In some embodiments, portion 28 of clamp guide 22 can be flush with conduit 13A and or conduit 13B such that there are no sharp edges which may pierce or cut cable 36. In some embodiments, portion 28 of clamp guide 22 can be rounded in a direction radially outward from a central axis of conduit 13 such that a portion of cable 36, when compressed by clamp 30, can protrude slightly past inner portions 17A, 17B of the conduit. It is to be appreciated that the protruding portion of the clamp guide can have other shapes and/or configurations in accordance with some embodiments of the present invention.

In some embodiments, portion 28 of clamp guide 22 may have a configuration such that cable 36 can also be pressed against one or more inner surfaces, 17A, 17B, of conduit 13A, 13B, respectively. It is to be appreciated that, in accordance with some embodiments of the present invention, cable 36 may be secured against portion 28 of clamp guide 22, inner surfaces 17A, 17B of conduit 13A, 13B, respectively, and combinations thereof. As discussed above, in some embodiments, portion 28 of clamp guide 22 may be flush with inner surfaces 17A, 17B of conduits 13A, 13B, respectively, and/or rounded such that cable 36 is not damaged when placed in compression therewith. It is further to be appreciated that, and as discussed more fully below, an inhibitor in accordance with some embodiments of the present invention may further include a device body against a portion of which the cable can be pressed against.

As shown in the exemplary depiction in FIG. 4, and without limitation, cable 36 can see multiple forces when a tensile load (for example, a removal force) is applied to it. Taking a central axis of the conduit as a frame of reference, for example and without limitation, the applied tensile load can have (i) a vector generally in the direction of the central axis and (ii) a vector generally transverse to that axis. In addition, a normal load can be applied to cable 36 between clamp 30 and either a portion 28 of clamp guide or a portion of an interior wall 17A, 17B of conduit 13A, 13B, respectively. In reaction, a resistive frictional load can be applied to cable 36 that will have a directional vector generally parallel and opposite to the axial component of the tensile load applied to cable 36. The resistive frictional load may also be proportional to the coefficient of friction that is specific to the materials used for construction of wire 36, clamp 30, clamp guide 22, and conduit 13.

In the case where the tensile load is applied as an attempt to remove cable 36 from conduit 13 by overcoming the resistive loads imparted to cable 36 by inhibitor 10, it can be appreciated that removal will not occur unless the axial component of the tensile force is sufficient to overcome the resistive frictional load. For a given tensile force applied to cable 36, the probability of cable 36 being removed is reduced if the tensile force in cable 36 has a larger transverse component than if the tensile load is entirely axial. It is believed that this is true because the axial component of the removal force is inversely proportional to the transverse component, and thus, an increase in the transverse component will cause a decrease in the axial component. When the removal force has a lesser axial component, the resistive frictional load is more likely to inhibit the removal of the cable 36 from the inhibitor 10.

As illustrated in the example of FIG. 4, clamp 30 may have axis of movement substantially perpendicular to a central axis of the sections of conduit. However, in some embodiments, the inhibitor can be configured such that the clamp has an axis of movement other than perpendicular to a central axis of the sections of the conduit. It is believed that when clamp 30 moves about an axis that is not perpendicular to a central axis of the sections of conduit 13, a retention force may be applied to cable 36 by clamp 30 which has a vector generally opposite to that of a force which may be imparted on cable 36 during a theft attempt. As such, the reactive loads will tend to place the clamp 30 in compression rather than in bending, which may be a condition that is less likely to result in failure of the inhibitor.

In some embodiments, the dimensions of clamp guide 22 may also serve to anchor inhibitor 10 within the surrounding medium. For example, and without limitation, inhibitor 10 may be buried underground along with sections of the conduit and backfilled with earth. In some embodiments, clamp guide 22 may be configured to protrude in a radial direction sufficiently beyond that of conduit 13. When a removal load is applied to cable 36 that has been secured in accordance with some embodiments of the present invention, the protruding portions of clamp guide 22 will engage the surrounding medium and supply reactive loads to further prevent removal of cable 36. Thus, in some embodiments, clamp guide 22 can be formed with significant surface area so as to increase opposition with the surrounding medium thereby increasing the retention load applied to inhibitor 10. In some embodiments, anchoring features may be associated with other outer surfaces of the inhibitor. For example, and without limitation, anchors may be spade shaped protrusions that are effective at engaging the surrounding earth to resist motion. In other examples, anchors may be protrusions with circular, rectangular, elliptical, or non-geometrically shaped cross sections sufficient to engage the earth. It is to be appreciated that the clamp guide may comprise various other shapes, sizes, configurations, and features suitable for engaging with the surrounding medium in accordance with some embodiments of the present invention.

In some embodiments, inhibitor 10 may be configured in a way such that the coefficient of friction is increased between (i) cable 36 and (ii) clamp 30, portion 28 of clamp guide 22, or inner surfaces 17A, 17B of conduits 13A, 13B. By increasing the coefficient of friction, inhibitor 10 may be more effective in hindering removal of cable 36. In some embodiments, the coefficient of friction may be increased by selection of the type, roughness, or geometry of material used. For example, and without limitation, a layer of vulcanized rubber may be affixed to a portion of clamp 30 which contacts cable 36. In other examples, a layer of vulcanized rubber may be affixed to portion 28 of clamp guide 22 or to inner surfaces 17A, 17B of conduits 13A, 13B. In yet other examples, clamp 30, portion 28 of clamp guide 22, or inner surfaces 17A, 17B of conduits 13A, 13B may have a roughened surface or have a tacky substance such as a natural or synthetic oil or adhesive affixed thereto. It is to be appreciated that other means of increasing a coefficient of friction with respect to the cable are contemplated in accordance with some embodiments of the present invention.

It is to be appreciated that a variety of materials and combinations thereof may be used to form the components of the inhibitor in accordance with some embodiments of the present invention. In some embodiments, metal or polymers having relatively high stiffness may be used. For example, and without limitation, one, a plurality, or all components of the inhibitor may be formed of steel, cast iron, aluminum, or moldable plastic. In some embodiments, components upon which the most force is imparted may comprise materials having high stiffness and components upon which lesser force is imparted may comprise materials having lower stiffness. For example, and without limitation, clamp 30, securing mechanism 37, and washer 35 may comprise cast iron or steel while clamp guide 22 may comprise moldable plastic.

An Exemplary System for Inhibiting the Removal of Cable from Conduit

In some embodiments, a system can include one inhibitor distributed along a length of conduit run. In some embodiments, a system can include at least two inhibitors distributed along a length of a conduit run which contains at least one cable 36. Referring now to the exemplary illustrations of FIGS. 5 to 8, and without limitation, two inhibitors 10A, 10B may be placed between sections of conduit. First inhibitor 10A may be configured to engage a first section of conduit 13A through an opening in first end 11A. In some examples, and without limitation, the sections of conduit can be welded, pressed, cast, or glued to the sections of conduit. A second section of conduit 13B can be disposed between and engaged by openings in first inhibitor 10A (for example, opening in second end 10A) and second inhibitor 10B (for example, opening in first end 11B). In some embodiments, and as illustrated, second inhibitor 10B may further be adapted to engage an adapter (for example, and without limitation, coupler 14) through an opening in second end 12B. Coupling 14 can further be adapted to engage third section of conduit 13C. In other examples, third section of coupling 13C can be engaged directly to second inhibitor 10B without the use of coupling 14. It is to be appreciated that various combinations of inhibitors, conduit and couplers are contemplated in accordance with some embodiments of the present invention. For example, and without limitation, adapters may engaged both first end 11A of first inhibitor 10A and second end 12B of second inhibitor 10B.

Figure 6:
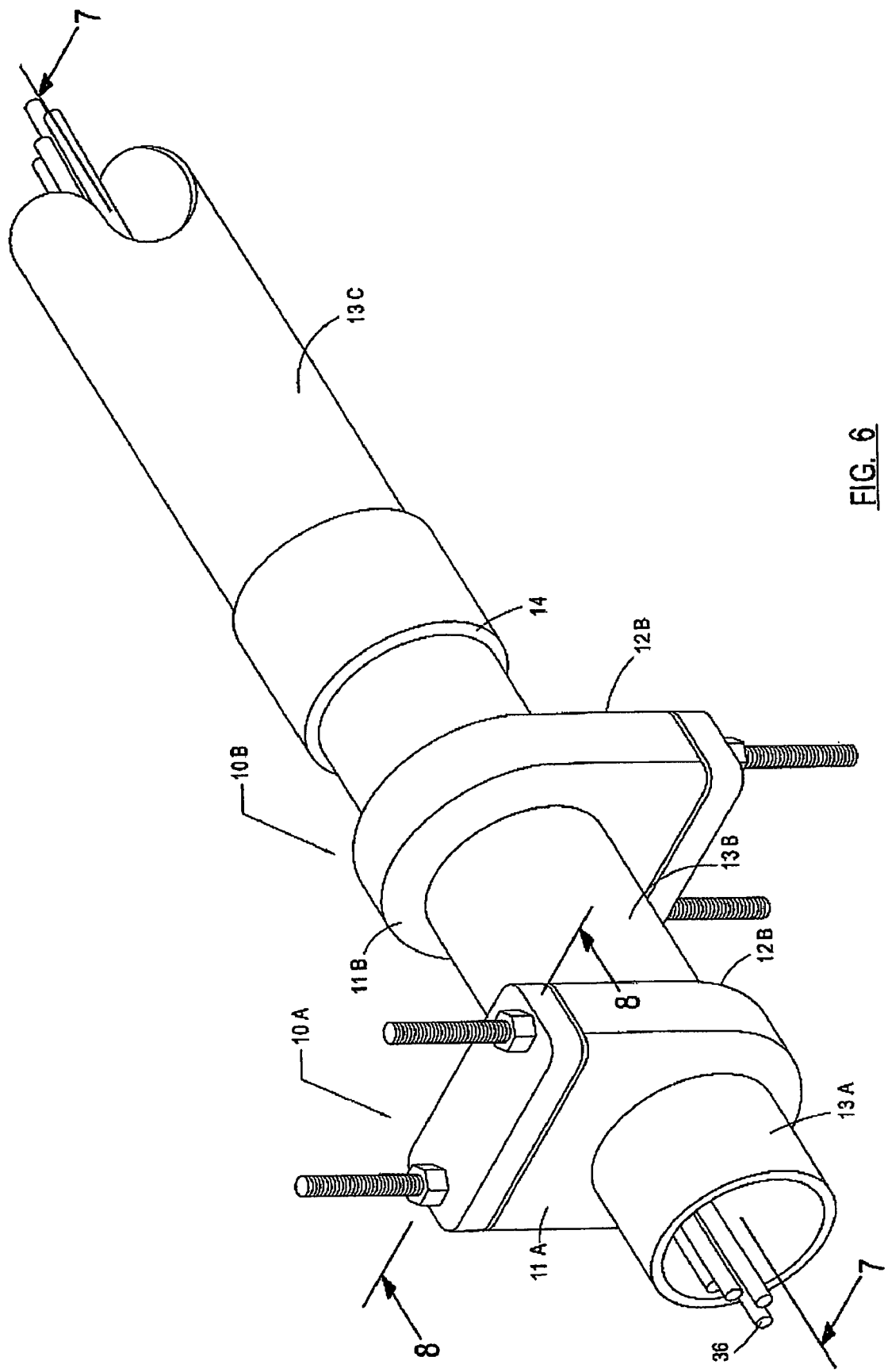
FIG. 6 is another perspective view of the exemplary system of FIG. 5 in accordance with some embodiments of the present invention.

In some embodiments, the first and second ends of the inhibitor can be configured in parallel. As illustrated in the example of FIG. 6, a parallel configuration of first end 11A and second end 12A results in the first section of conduit 13A and the second section of conduit 13B being coaxial relative to each other. However, it is to be appreciated that the first and second ends can be at any angle relative to each other in accordance with some embodiments of the present invention. For example, and without limitation, inhibitor 10A may have first and second ends which are angled thirty degrees relative to each other. Such a configuration would result in conduit sections 13A and 13B being angled by thirty degrees relative to each other. In other examples, inhibitor 10A may have first and second ends which are angled, forty-five, sixty, ninety or one hundred and twenty degrees relative to each other.

Figure 7:
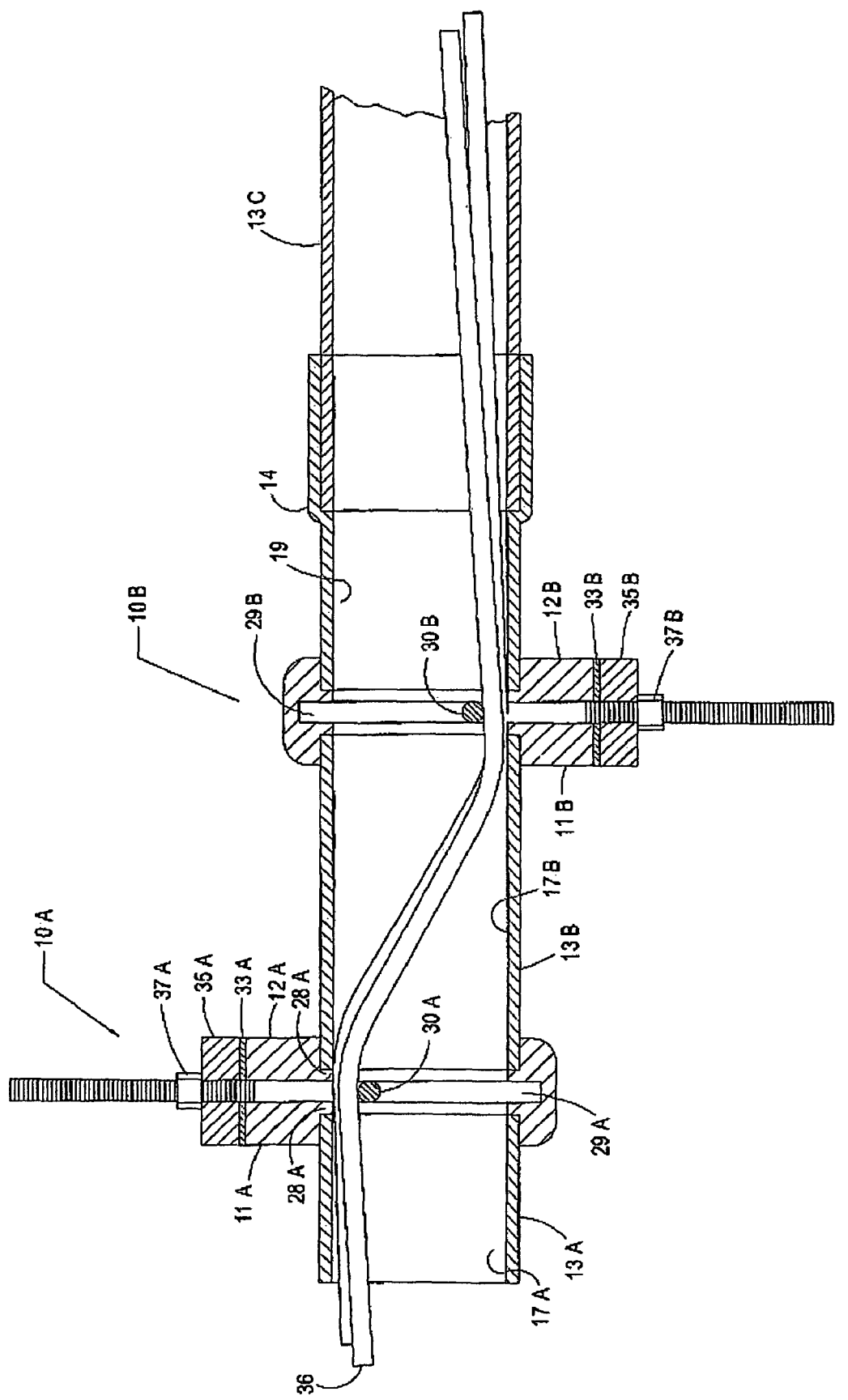
FIG. 7 is a cross sectional view of the exemplary system of FIG. 6, taken along the 7-7 lines.
Figure 8:
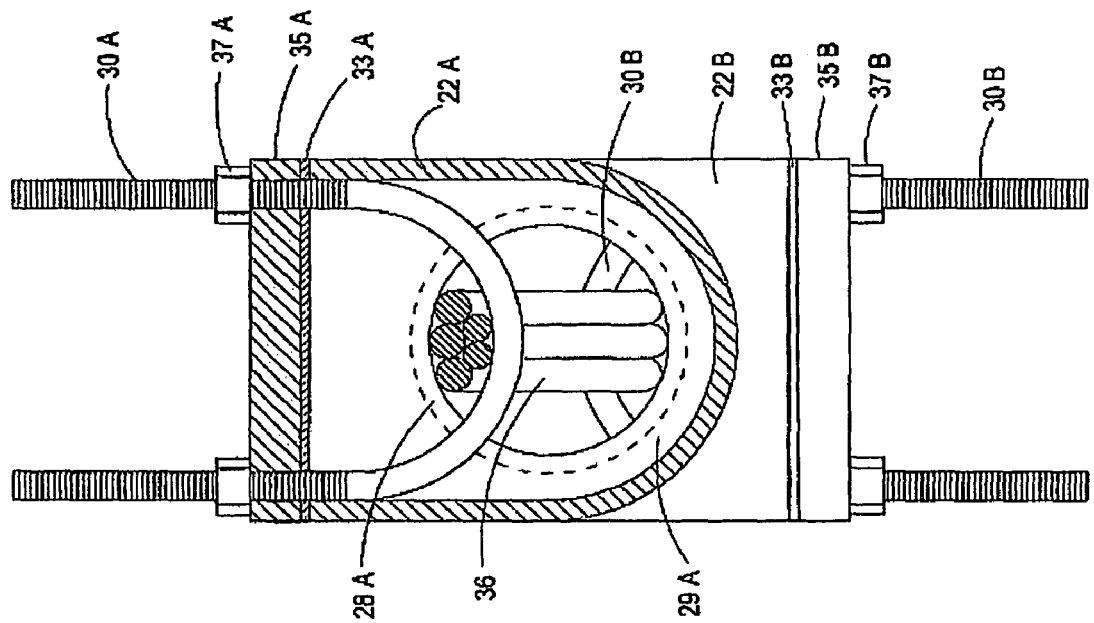
FIG. 8 is a cross sectional view of the exemplary system of FIG. 6, taken along the 8-8 lines.

In some embodiments, and as illustrated in FIG. 7, one or more inhibitors may be transversely separated by a relatively short distance. For example, and without limitation, inhibitors 10A and 10B may be separated by ten inches. In other examples, inhibitors 10A and 10B may be separated by five inches. The separation distance of the inhibitors may be selected corresponding to, among other things, the thickness and characteristics of the cable and internal dimensions of the inhibitors and/or the conduit.

In some embodiments, a plurality of transversely separated inhibitors may also be axially separated relative to a central axis of the conduits. For example, and without limitation, first inhibitor 10A may be configured to be about one hundred and eighty degrees out of phase with second inhibitor 10B. In other examples, four inhibitors can be configured to be about ninety degrees out of phase with each other. In yet other examples, a system can have (i) two inhibitors that are one hundred and eighty degrees out of phase with each other and (ii) a third inhibitor that is ninety degrees out of phase with the first two. It is to be appreciated that in accordance with some embodiments of the present invention, a system can have any number of inhibitors with any angle of axial separation, including but not limited to twelve inhibitors with thirty degrees of separation, eight inhibitors with forty five degrees of separation, etc.

It is to be appreciated that the transverse and/or axial separation of the inhibitors may be selected corresponding to the internal dimensions of the conduit and/or clamp guides and the maximum angular bend that may be tolerated by the cable. Referring to the example of FIG. 7, inhibitors 10A and 10B can be selected with a transverse and axial separation such that cable 36, when brought into compression by clamps 30A and 30B does not deform more than the maximum rated angular bend. In some examples, and without limitation, if (i) the inhibitors are configured with an axial separation of one hundred and eighty degrees, (ii) the cable can be bent with a maximum angle of B degrees, and (iii) the conduit has an internal diameter of D, then the transverse separation S of the inhibitors should be greater than or equal to D divided by the tangent function of B. In other examples, and without limitation, if (i) the inhibitors are configured with an axial separation of ninety degrees, (ii) the cable can be bent with a maximum angle of forty five degrees, and (iii) the conduit has an internal diameter of D, then the transverse separation S of the inhibitors should be greater than or equal to D. In other examples, and without limitation, if (i) the cable can be bent with a maximum angle of B degrees and (ii) the conduit has an internal diameter of D, then the transverse separation S and axial separation A of the inhibitors can be selected such that S is greater than or equal to D times the sin squared function of A/2 divided by the tangent function of B. Therefore, in some examples where the cable can be bent a maximum of forty five degrees and the conduit has a diameter of four inches, and without limitation, the inhibitors can have an axial separation of one hundred and eighty degrees and a transverse separation of greater than four inches. In other examples, the inhibitors can have an axial separation of ninety degrees and a transverse separation of greater than two inches. It is to be appreciated that other transverse and axial separation distances are contemplated in accordance with some embodiments of the present invention.

It is also to be appreciated that a wide range of different number of inhibitors with different transverse and or axially separations may be used in accordance with some embodiments of the present invention. For example, and without limitation, a system can include three inhibitors: the first and second can be separated by a distance of ten inches and one hundred and twenty degrees; and the second and third can be separated by a distance of four inches and ninety degrees. As shown in the exemplary illustration of FIG. 7, the cumulative axial separation of the plurality of inhibitors can be one hundred and eighty degrees (e.g., for the example where two inhibitors are axially separated by one hundred and eighty degrees. However, it is to be appreciated that some systems in accordance with some embodiments of the present invention may have other cumulative axial separations. For example, and without limitation, a system with three inhibitors each axially separated by ten degrees can have a cumulative axial separation of twenty degrees. In other examples, a system with four inhibitors each axially separated by ninety degrees can have a cumulative axial separation of three hundred and sixty degrees.

Another Exemplary Apparatus and System for Inhibiting the Removal of a Cable from a Conduit In some embodiments of the present invention, an inhibitor may comprise a plurality of clamp guides and a device body disposed on a unitary piece. Referring now to the exemplary illustrations of FIGS. 9 and 10, and without limitation, inhibitor 110 can have a first end 111 for engaging a first section of conduit (not shown) and a second end 112 for engaging a second portion of conduit 13. In some embodiments, first end 111 and or second end 112 can be configured to engage a second inhibitor (not shown) and/or a coupling feature. For example, and without limitation, second end 112 may have a coupling feature for coupling with conduit 13. In other examples, both first end 111 and second end 112 have such coupling features. In yet other examples, neither first end 111 nor second end 112 have such coupling features.

Clamps 130A, 130B may be disposed within clamp guides 122A, 122B, respectively, and configured to press cable 36 against an inner surface 132 of device body 120. In some embodiments, clamp guides 122A, 122B and/or body 120 may be formed of a metal or polymer with relatively high stiffness. In some examples, and without limitation, body 120 and clamp guides 122A, 122B may comprise moldable plastic. In other examples, they may both comprise cast iron, steel or aluminum. In some embodiments, clamp guides 122A, 122B and body 120 may be formed at the same time and of the same material. For example, clamp guides 122 and body 120 of inhibitor 110 may be formed by injection molding. In some embodiments, clamp guides 122A, 122B and body 120 may be formed of different materials. For example, clamp guides 122A, 122B may be formed of tempered steel and body 120 may be formed of cast iron. In these examples, clamp guides 122A, 122B may be welded, pressed, cast, glued, or otherwise fixedly attached to device body 120. It is to be appreciated that a variety of materials and combinations thereof may be used to form the components of the inhibitor in accordance with some embodiments of the present invention.

As shown in some exemplary illustrations, and without limitation, inhibitor 110 can have a first clamp guide 122A (and associated clamp 130A) and a transversely separated second clamp guide 122B (and associated clamp 130B) for inhibiting removal of cable 36 from conduit 13. In some embodiments, the plurality of clamp guides may have the same axial configuration relative to a central axis of the conduits. In some embodiments, and as discussed above, the plurality of clamp guides may be axially separated relative to a central axis of a conduit section. As shown, the clamp guides may be configured to be about one hundred and eighty degrees out of phase with each other. It is further to be appreciated that, as above, in some embodiments and without limitation, the separation distance (or transverse separation) and rotational phase (or axial separation) of the clamp guides may be determined with reference to the maximum permissible angular displacement of cable 36, the interior dimensions of the clamp guides and/or the interior dimensions of the body. For example, and without limitation, if (i) the cable can be bent with a maximum angle of B degrees and (ii) the body has an internal diameter of D, then the transverse separation S and axial separation A of the inhibitors can be selected such that S is greater than or equal to D times the sin squared function of A/2 divided the tangent function of B. In some examples, and without limitation, the clamp guides may be separated by a distance of ten inches and one hundred and eighty degrees out of phase from each other. In other examples, and without limitation, the clamp guides can be separated by a distance of three inches and one hundred and twenty degrees out of phase from each other. It is to be appreciated that any number of inhibitors may be separated by any transverse distance and axial distance in accordance with some embodiments of the present invention.

In some embodiments, clamps 130A, 130B and inner surface 132 of device body 120 can be configured with an increased coefficient of friction relative to cable 36. For example, and without limitation, a layer of vulcanized rubber can be affixed on a portion of clamp 130A and/or clamp 130B or on inner surface 132. In other examples, the clamps or inner surface may have a roughened surface. It is to be appreciated that there are many ways that the clamps and/or inner surface of the device body may be adapted in accordance with some embodiments of the present invention.

Another Exemplary Apparatus and System for Inhibiting the Removal of a Cable from a Conduit In some embodiments of the present invention, an inhibitor may comprise a single clamp guide and a device body on a unitary piece. As illustrated in the exemplary illustrations of FIGS. 11 and 12, inhibitor 210B may comprise a single clamp guide 222B formed on body 220B and disposed between first end 211B and second end 212B. In some embodiments, first end 211B and/or second end 212B may be configured to engage a conduit section 13. In other embodiments, one or both of first end 211B and second end 212B may comprise an adaptive or coupling feature (for example, and without limitation, an annular shoulder) for engaging conduit 13 or another inhibitor. For example, and without limitation, one or both of first end 211B and second end 212B may be configured to engage another inhibitor 210A. In other examples, inhibitor 210A may have a first end 211A with no coupling feature (for engaging a conduit, not shown) and a second end 212A with a coupling feature (for engaging second inhibitor 210B). As such, multiple inhibitors can be directly coupled together without the need for an intermediary section of conduit (in contrast to some exemplary embodiments as illustrated in FIG. 7). In some embodiments (and although not shown), first inhibitor 210A and second inhibitor 210B can be separated by a section of conduit disposed between them. In some examples, and without limitation, the inhibitors and/or sections of conduit, can be welded together. In other examples, they may be pressed, cast, or glued together. It is to be appreciated that the ends of the inhibitor can have multiple configurations in accordance with some embodiments of the present invention.

Figure 5:
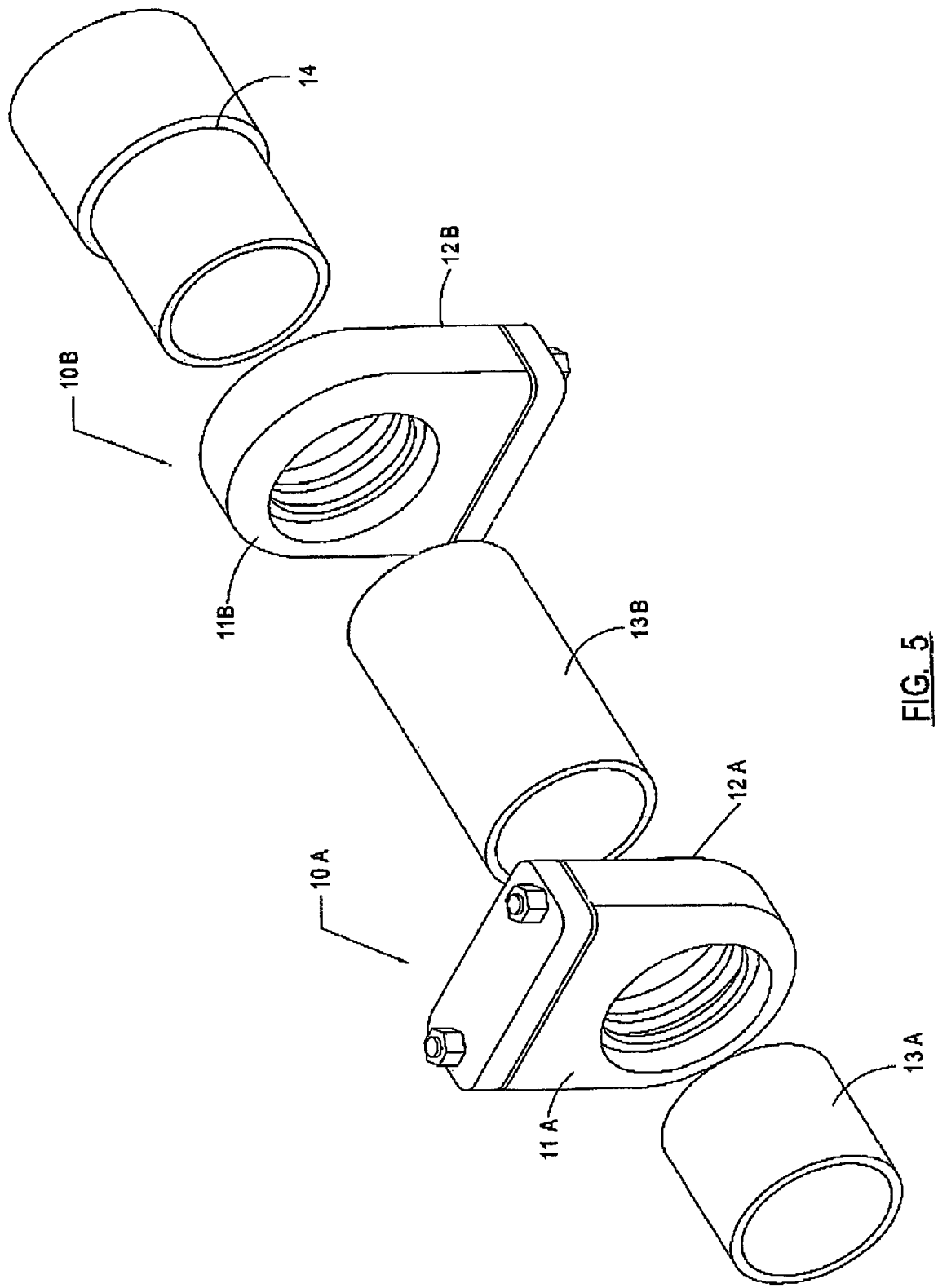
FIG. 5 is an exploded perspective view of an exemplary system incorporating the exemplary apparatus of FIG. 1 in accordance with some embodiments of the present invention.

It is to be appreciated that a system in accordance with some embodiments of the present invention can comprise a plurality of inhibitors. And in contrast to the exemplary embodiment as illustrated in FIGS. 5 to 7 (wherein the transverse separation distance between the clamps of the inhibitors can determined by the length of conduit section 13B), the distance between clamp 230A of inhibitors 210A and clamp 230B of inhibitor 210B can be determined by the length of ends 212A and 211B. For example, and without limitation, a system can be configured with (i) a distance of five inches between cavity 229A of clamp guide 222A and second end 212A of device body 220A and (ii) a distance of four inches between cavity 229B of clamp guide 222B and first end 211B of device body 220B. In this example, when two such inhibitors are joined together, for example by connecting first end 211B of second inhibitor 210B to second end 212A of first inhibitor 210A, the separation distance between the clamps will be nine inches. It is to be appreciated that any number of inhibitors can be provided with any transverse separation distance in accordance with some embodiments of the present invention.

It is further to be appreciated that in some embodiments, inhibitors 210A and 210B can also be axially separated relative to a central axis of conduit 13. In some examples, and without limitation, first inhibitor 210A can be coupled to second inhibitor 210B with a rotational phase difference of about forty five degrees. In other examples, and as shown, first inhibitor 210A and second inhibitor 210B can be configured with a rotational phase difference of one hundred and eighty degrees. In some embodiments, the determination of the rotational angle between two or more coupled inhibitors can be made with reference to the internal dimensions of the conduit and/or clamp guides and the maximum angular bend that may be tolerated by the cable. For example, as above, and without limitation, if (i) the cable can be bent with a maximum angle of B degrees and (ii) the conduit has an internal diameter of D, then the transverse separation S and axial separation A of the inhibitors can be selected such that S is greater than or equal to D times the sin squared function of A/2 divided the tangent function of B. Thus, in some examples, if cable 36 can tolerate a maximum angular bend of thirty degrees and the inside diameter of conduit 13 is six inches, inhibitors 210A and 210B can have an axial separation of one hundred and eighty degrees and a transverse separation distance of greater than about ten and one half inches. In other examples, inhibitors 210A and 210B can have an axial separation of sixty degrees and a transverse separation distance of greater than about two and one half inches. It is to be appreciated that any number of inhibitors may be separated by any transverse distance and any suitable axial rotation in accordance with some embodiments of the present invention.

An Exemplary Retrofit Apparatus for Inhibiting the Removal of a Cable from a Conduit In conventional implementations, the conduit can be assembled above ground by a construction crew. The crew may first assemble several sections of conduit end to end and attach them together using pipe glue, fasteners, or other adhesive means. The entire run of conduit can then be placed underground in a cavity formed in the earth. Cabling may then be introduced in one end of the conduit run and mechanical force or air pressure can be used to push (or pull) the cable down through to the other end of the conduit run. The cavity formed in the earth can then be backfilled.

Referring back to the exemplary system of FIGS. 5 through 8, it is to be appreciated that the sections of conduit are preferably secured together, and within openings in the inhibitor ends, prior to the conduit being placed in the earth. It is to be appreciated that if one were able to splice an inhibitor into a portion of conduit that has already been placed in the earth, the cable would first need to be withdrawn from that spliced portion so that the cable could be fed through the openings in the clamp guide and also be located between the clamp and a portion of the clamp guide. Because of these difficulties, it is another object of the present invention to provide a retrofit inhibitor for hindering the removal of cable that has already been installed through a conduit.

Referring now to the exemplary apparatus of FIGS. 13 to 15, inhibitor 310 can include a clamp guide 322, clamp 330, and securing mechanism 337. In some embodiments, clamp 330 may be a rigid fastener having securing features. For example, and without limitation, clamp 330 may be a U-Bolt, J-Bolt, V-Bolt, M-Bolt, or L-Bolt, having at least one threaded end for engaging a securing mechanism. In some embodiments, the securing mechanism may have complementary securing features that are sized and configured to engage with the securing features of the clamp. For example, and without limitation, securing mechanism 337 can have complementary threads and an opening for engaging with a threaded end of clamp 330.

In some embodiments, inhibitor 310 may further include washer 335 for distributing a load of clamp 330 and securing mechanism 337. In some embodiments, inhibitor 310 may also include a seal 333 for securing the interface between washer 335 and clamp guide 322. In some examples, and without limitation, seal 333 can be a deformable material which may be compressed between washer 333 and clamp guide 322 so as to seal the opening in clamp guide 322 wherein clamp 330 is disposed. In other examples, each of washer 335 and seal 333 may be configured with openings for receiving portions of clamp 330.

In some embodiments of the present invention, clamp guide 322 may comprise a number of subassembly components for circumscribing the conduit 13. For example, and without limitation, the clamp guide can comprise a plurality of portions which may be secured together with attachment devices. As shown in the exemplary illustration of FIG. 14, and without limitation, clamp guide 322 can have a first portion 322' and a second portion 322". The first and second portions may be configured to be secured together with attachment devices 327. In other examples, the clamp guide can include three portions that can be secured together with snap-fit connections. It is to be appreciated that clamp guide 322 may comprise any number of portions in a variety of geometries and configurations in accordance with some embodiments of the present invention. For example, and without limitation, both first portion 322' and second portion 322' of clamp guide 322 can be configured with a one hundred and eighty degree arc. In other examples, first portion 322' may be configured to have two ninety degree arc sub-portions (not shown) and second portion 322" can be configured to have a one hundred and eighty degree arc. It is to be appreciated that any number and configuration of portions and sub-portions may be provided in accordance with some embodiments of the present invention.

It is also to be appreciated that when the subassembly components of inhibitor 310 (and clamp guide 322) are assembled, inhibitor 310 can have a shape and geometry substantially similar to that of exemplary inhibitor 10 (of FIG. 1), exemplary inhibitor 110 (of FIG. 10), exemplary inhibitor 210A (of FIG. 12), or any other configuration within the scope of this invention. In some embodiments, the inhibitor can include a clamp, a securing mechanism, and a clamp guide configured such that, when a cable is disposed between a portion of the clamp and clamp guide, the clamp and securing mechanism can be engaged so as to cause the cable to be pressed against a portion of the clamp guide and/or an inner portion of the conduit.

Referring to the exemplary illustration of FIG. 15, a portion of conduit 13 carrying a cable 36 may be partially or fully cut to form an opening, the opening having a width sufficient for receiving clamp 330 therein. In some embodiments, first portion 322' and second portion 322" of clamp guide 322 may be configured with geometries suitable for forming a tight fit around conduit 13. For example, and without limitation, conduit 13 may have an outside diameter of six inches and clamp guide portions 322' and 322" may be configured such that when they are secured together with attachment devices 327, an opening having a diameter of six inches is formed. In some embodiments, clamp guide 322 may also include a seal (not shown) configured to form a tight seal with conduit 13. In some embodiments, pipe glue or another adhesive can be placed at the interface between clamp guide portions 322', 322" and conduit 13 for forming a tight connection. In some embodiments, and without limitation, the internal size of the opening in clamp guide 322 may be configured to be slightly larger than the outside diameter of the conduit such that, when used in combination with a seal or some other type of deformable seal, a tight connection is formed. It is to be appreciated that other sized clamp guide portions may be used for other sized conduit sections in accordance with some embodiments of the present invention.

It is to be appreciated that in some retrofit applications, conduit 13 can be fully or partially cut. In some embodiments, and referring to the example of FIG. 15 when the conduit is partially cut, clamp 330 should have a width that is not greater than the inside diameter of conduit 13 so that clamp 330 can be positioned therein. In some embodiments, and referring to the example where the conduit is fully cut, clamp 330 may have a width that is greater than the inside diameter of conduit 13.

It is to be appreciated that, as illustrated in the example of FIG. 15, cable 36 must be placed between a portion of clamp 330 and clamp guide portion 322". Thus, during retrofit installation, clamp 330 must be "fished" around the already installed cable 36. However, depending on whether conduit 13 is fully or partially cut, the dimensions of clamp 330, and the amount of working space, it may be difficult to properly position clamp 330. Thus, in some embodiments the clamp may include subassembly components.

In some embodiments, the clamp may include at least one clamp extension configured for securely attaching to a rigid fastener. In some embodiments, the extensions may include securing features for engaging with complementary securing features of a securing mechanism. Referring to the exemplary embodiment as illustrated in FIG. 14, and without limitation, extensions 331' and 331" may have threaded features for coupling to securing mechanism 337. In some examples, and without limitation, a rigid fastener 331 may have relatively shorter threaded ends to which extensions 331' and 331" may be fixed. In other examples, the rigid fastener may be a J-Bolt and one extension may be provided for attachment on the shorter end. In some embodiments, extensions 331' and 331" may be fixedly attached to rigid fastener 331 by a snap fit connection. However, it is to be appreciated that there are many configurations of rigid fasteners and many means of attaching the rigid fasteners to the clamp extension(s) which are contemplated in accordance with some embodiments of the present invention. In some examples, and without limitation, rigid fastener 331 may be fished around cable 36 and thereafter one or more extensions 331', 331" may be secured to rigid fastener 331. In other examples, extension 331' may be secured to rigid fastener 331 before being fished around cable 36, and thereafter extension 331" may be secured to rigid fastener 331. It should further be appreciated that the connection between the extensions and the rigid fastener must be strong enough to withstand (i) the normal load applied to cable 36 between clamp 330 and a portion of clamp guide 322 and (ii) the axial component of the resistive load applied to cable 36 during a removal attempt.

Another Exemplary Apparatus and System for Inhibiting the Removal of a Cable from a Conduit In some embodiments, the inhibitor may include a clamp comprising a flexible material with a high tensile strength. Referring now to the exemplary illustrations of FIGS. 16 to 18, and without limitation, clamp 430 may comprise a high-density fabric material. In other examples, clamp 430 can comprise nylon or other polymers. In other examples, clamp 430 can comprise rope, a belt, or hemp. In yet other examples, clamp 430 can comprise a thin coil of pliable metal such as aluminum. In other examples, clamp 430 can comprise a webbing. However, it is to be appreciated that other flexible materials are contemplated in accordance with some embodiments of the present invention.

Figure 16:
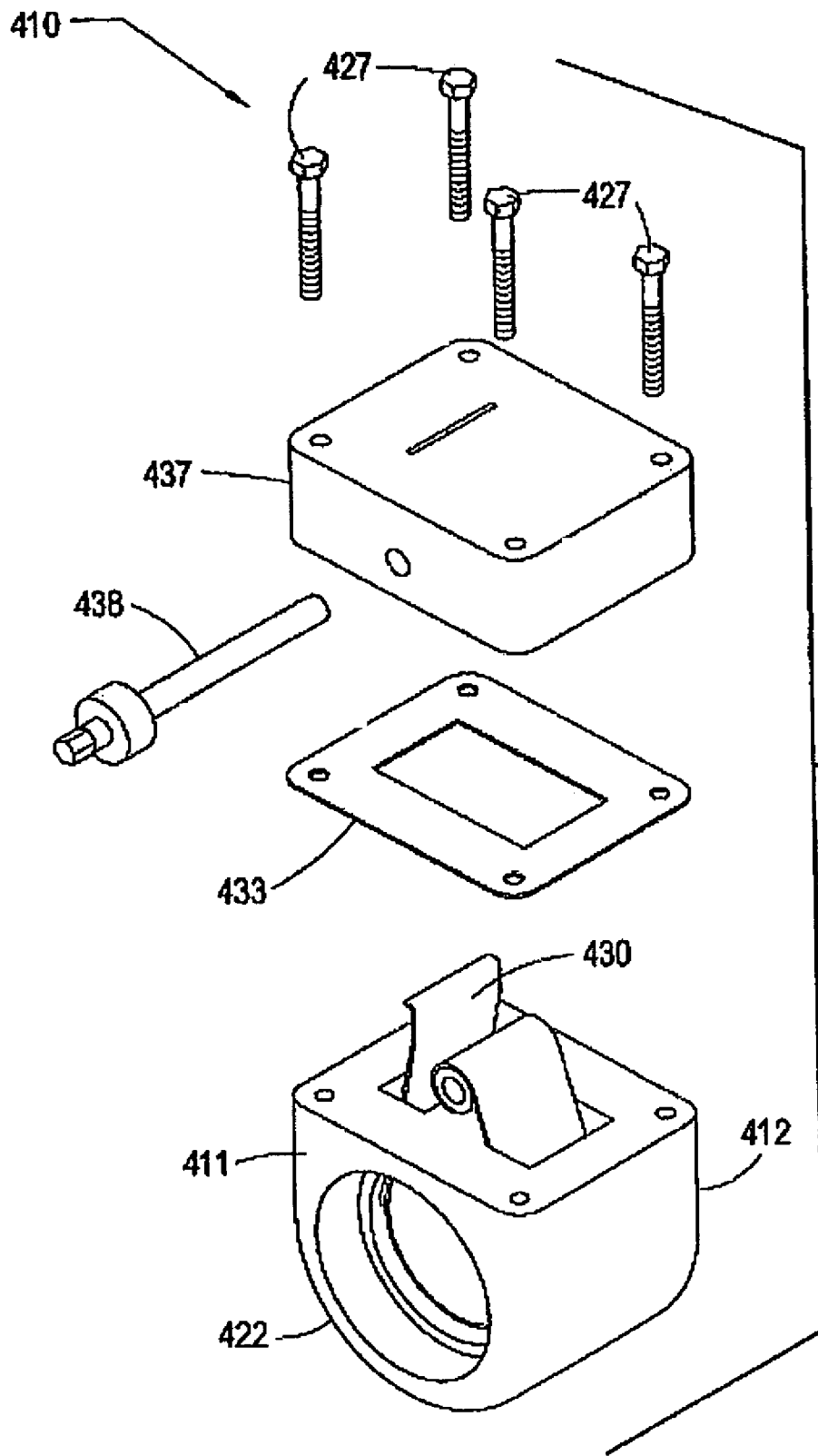
FIG. 16 is an exploded perspective view of another exemplary apparatus for hindering the removal of a wire or cable from a conduit in accordance with some embodiments of the present invention.

Referring particularly to FIG. 16, in some embodiments, inhibitor 410 may have a clamp guide 422 with a first 411 and second 412 end. Each of first 411 and second 412 ends can be configured to engage a section of conduit (not shown) or a coupler (not shown) in an opening therein. In some embodiments, and without limitation, the conduit or the coupler may engage the ends of the inhibitors by a snap fit, press, interference, or sliding fit connection. In some embodiments, the conduit may be secured to and maintained with the inhibitor by the addition of sealants or adhesives. For example, and without limitation, pipe glue may be applied to the interface between conduit and openings in the ends of the inhibitors for permanently fixing the conduit therein. In other examples, a sealant ring such as an O-Ring may be disposed in the interface between conduit and the openings. In some embodiments, a variety of mechanical fasteners such as screws, bolts, hooks, loops or rivets may be used to secure the inhibitor and the conduit. It is to be appreciated that there are many different means of engaging and maintaining the inhibitor in accordance with some embodiments of the present invention.

In some embodiments, securing mechanism 437 may be fixedly attached to clamp guide 422. In some examples, and without limitation, securing mechanism 437 and seal 433 may have holes for permitting passage of attachment devices 427. In some embodiments, attachment devices 427 may have threaded ends and clamp guide 422 may have appropriately positioned and sized threaded holes for receiving attachment devices 427. In some embodiments, attachment devices 427 and holes in clamp guide 422 may form a snap-fit connection. It is to be appreciated that other means of attaching the securing mechanism to the clamp guide are contemplated in accordance with some embodiments of the present invention. In some embodiments, securing mechanism 437 may be configured with a key 438 for attachment to one end of clamp 430. In some embodiments, key 438 can have a hexagonal head that can be engaged with a socket or box-end wrench. However, it is to be appreciated that other configurations of keys and/or heads are contemplated in accordance with some embodiments of the present invention.

In some embodiments, clamp guide 422 can include one or more slots, each slot configured to receive portions of clamp 430. In some embodiments, inhibitor 410 may also include a seal 433 for securing the interface between securing mechanism 437 and clamp guide 422. The seal may also have one or more openings which may correspond to the slots in the clamp guide through which portions of the clamp can pass through. For example, and without limitation, seal 433 can be a rubberized material which may be deformed between securing mechanism 437 and clamp guide 422 so as to form a tight seal. Similarly, in some embodiments, securing mechanism 437 may also include one or more slots for receiving an end of clamp 430.

In use, one end of clamp 430 can be placed through a slot in securing mechanism 437 and the other end of clamp 430 can be attached to key 438. As shown in the exemplary illustrations of FIGS. 14 and 16, key 438 may be rotated so as to cause cable 36 to move towards and be pressed against a portion 428 of clamp guide 422 or an inner wall 17 of conduit 13.

In some examples, and without limitation, the clamp may comprise a zip-tie strap. For example, without limitation, and referring now to FIGS. 26 and 27, clamp 930A may comprise a nylon zip-tie. In some examples, and without limitation, the clamp may comprise a nylon strip with a first portion having an integrated gear rack and a second portion having an apparatus for negating reverse movement of the gear rack (e.g., an integrated ratchet). In some embodiments, clamp guide 922A can include one or more slots, each slot configured to receive portions of clamp 930A. For example, and without limitation, clamp guide 922A may have a first slot for receiving an integrated ratchet 937A of clamp 930A and a second slot for receiving an integrated gear rack 931A of the clamp. In some examples, and without limitation, the first slot for receiving integrated ratchet 937A of the clamp can have dimensions smaller than integrated ratchet 937A so as to prevent integrated ratchet 937A from being pulled into the cavity of clamp guide 922A.

In some embodiments, inhibitor 910A may also include mechanism 935A fixedly attached by attachment devices 927 to clamp guide 922A. In some embodiments, inhibitor 910A may also include a seal 933A for securing the interface between mechanism 935A and clamp guide 922A. For example, and without limitation, seal 933A can be a rubberized material which may be deformed between mechanism 935A and clamp guide 922A so as to form a tight seal. It is to be appreciated that mechanism 935A and/or seal 933A may provide protection from the elements and surrounding environment.

In use, in some examples, and without limitation, integrated gear rack portion 931A of the clamp may be placed through a first slot in clamp guide 922A. Integrated gear rack portion 931A can then be placed through the second slot in clamp guide 922A and engaged with integrated ratchet portion 937A. It is to be appreciated that by engaging the integrated gear rack with the integrated ratchet, the cable may be pulled towards and be pressed against a portion of the clamp guide or an inner wall of the conduit section. In some embodiments, a slot may be provided in mechanisms 935A, 935B through which an end of the integrated gear rack portion of clamps 930A, 930B may pass. For example, mechanism 935B can include a slot through which integrated portion 931B of the clamp may pass. However, it is to be appreciated that in other embodiments, after tightly pulling the integrated gear rack 931A through the integrated ratchet 937A, any excess portion may be removed or relocated. For example, and without limitation, the excess may be cut off. In other examples, the excess portion may be located within a cavity of mechanism 935.

It is further to be appreciated that in accordance with some embodiments of the present invention, any of the previously identified embodiments (including but not limited to the multiple inhibitor systems, the unibody inhibitor systems, the transversely and axially separated inhibitors, the retrofit embodiment, etc.), may be adapted to substitute a rigid fastener with a flexible material clamp. For example, and without limitation, clamp guide 422 can comprise multiple portions (similar to the multiple portions 322' and 322" of clamp guide 322 as illustrated in the exemplary illustrations of FIGS. 13 to 15) for retrofit-type applications.

Thus, in some embodiments, clamp guide 422 may comprise a number of subassembly components for circumscribing the conduit 13 in a retrofit fashion. Similar to the exemplary apparatus as illustrated in FIG. 14, and without limitation, clamp guide 422 can have a plurality of portions, in a variety of geometries and configurations, which may secured together with attachment devices. For example, and without limitation, clamp guide 422 can be configured with two portions each providing a one hundred and eighty degree arc. In other examples, a first portion may be configured to have two ninety degree arc sub-portions and a third portion with a one hundred and eighty degree arc. In some embodiments, the portions may be configured with geometries suitable for forming a tight fit around conduit 13. In some embodiments, clamp guide 422 may also include a seal, pipe glue, or other adhesive for forming a tight fit with conduit 13. During some retrofit installations, and without limitation, the flexible material clamp can be "fished" around the already installed cable through a formed opening in the conduit, and the plurality of clamp guide portions can be secured together so as to circumscribe the conduit 13. It is to be appreciated that any number and configuration of portions and sub-portions may be provided in accordance with some embodiments of the present invention.

It is to be appreciated that a system in accordance with the present invention can comprise one or a plurality of inhibitors. Referring now to the examples of FIGS. 17 and 18, a plurality of clamps 410A, 410B can be transversely separated by sections of conduit (for example, and without limitation, conduit 13B). The clamps may also be axially separated relative to a central axis of conduit. In some examples, and without limitation, first inhibitor 410A can be coupled to second inhibitor 410B, have a rotational phase difference of about forty-five degrees, and be separated by a distance of about five inches. In other examples, and as shown, first inhibitor 410A and second inhibitor 410B can be configured with a rotational phase difference of one hundred and eighty degrees and separated by a distance of about ten inches. In some embodiments, the determination of the rotational angle between two or more coupled inhibitors can be made with reference to the internal dimensions of the conduit and/or clamp guides and the maximum angular bend that may be tolerated by the cable. For example, as above, and without limitation, if (i) the cable can be bent with a maximum angle of B degrees and (ii) the conduit has an internal diameter of D, then the transverse separation S and axial separation A of the inhibitors can be selected such that S is greater than or equal to D times the sin squared function of A/2 divided the tangent function of B. Thus, in some examples, if cable 36 can tolerate a maximum angular bend of thirty degrees and the inside diameter of conduit 13B is six inches, inhibitors 410A and 410B can have an axial separation of one hundred and eighty degrees and a transverse separation distance of greater than about ten and one half inches. In other examples, inhibitors 410A and 410B can have an axial separation of sixty degrees and a transverse separation distance of greater than about two and one half inches. However, it is to be appreciated that any number of inhibitors may be separated by any transverse distance and axial distance in accordance with some embodiments of the present invention.

Another Exemplary Apparatus for Inhibiting the Removal of a Cable from a Conduit As recited above, some embodiments of the present invention concern apparatuses including a rigid fastener, wherein a cable may be secured by imparting a "pulling" force on the bolt in a direction towards a securing mechanism, causing the cable to be pressed between the bolt and a portion of a clamp guide. Other embodiments concern apparatuses including a flexible material, wherein a cable may be secured by imparting a "pulling" force on a portion of the material, also in a direction towards a securing mechanism, causing the cable to be pressed between the material and a portion of a clamp guide. In yet other embodiments, and referring generally to the exemplary illustrations of FIGS. 19 to 25, apparatuses may include a clamp having a compression portion, and the cable can be secured by applying a "pushing" (rather than "pulling") force on the bolt in a direction away from a securing mechanism.

Figure 20:
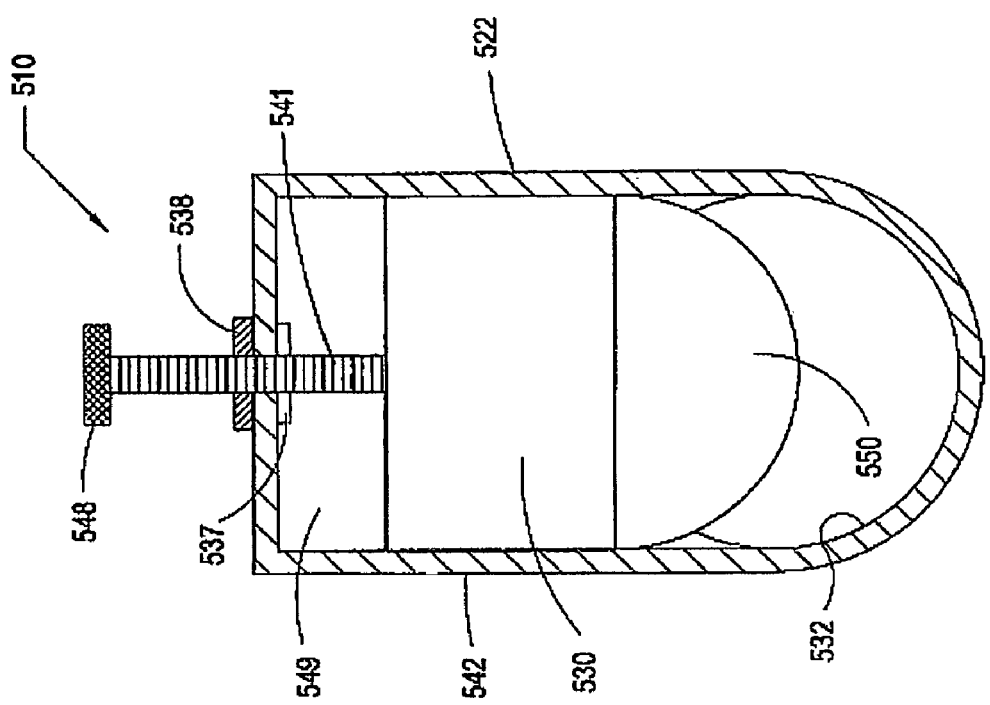
FIG. 20 is a cross sectional view of the exemplary apparatus of FIG. 19, taken along the 20-20 lines.
Figure 19:
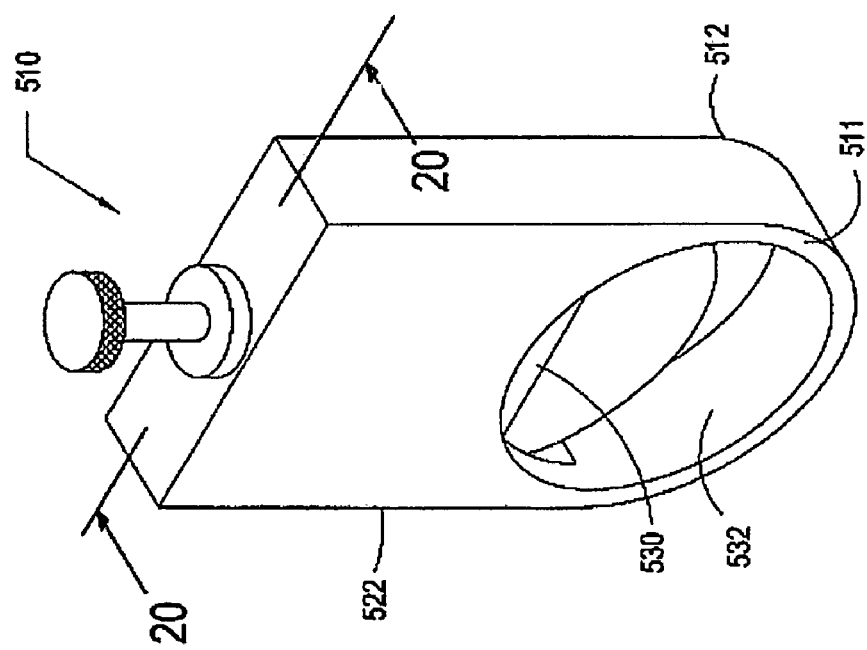
FIG. 19 is a perspective view of another exemplary apparatus for hindering the removal of a wire or cable from a conduit in accordance with some embodiments of the present invention.

Referring now specifically to the example of FIGS. 19 and 20, inhibitor 510 may comprise a clamp 530 disposed within a clamp guide 522 having a first 511 and second 512 end. In some embodiments, each of first 511 and second 512 ends can be configured to engage a section of tubular conduit or coupler (not shown) in an opening therein. As shown, the ends 511, 512 may have circular openings, however, it is to be appreciated that the ends may have oval, square, rectangular, or any other shape openings thereof for engaging a correspondingly shaped conduit or coupler. It is also to be appreciated that the openings in first 511 and second 512 end may not have the same shape.

Referring to FIG. 19, in some embodiments, and without limitation, the conduit or the coupler may engage the ends 511, 512 of the inhibitor 510 by a snap fit, press, interference, or sliding fit connection. In some embodiments, the conduit may be secured to, and maintained with, the inhibitor by the addition of sealants or adhesives. For example, and without limitation, pipe glue may be applied to the interface between conduit and openings in the ends of the inhibitors for permanently fixing the conduit therein. In other examples, a sealant ring such as an O-Ring may be disposed in the interface between conduit and the openings. In some embodiments, a variety of mechanical fasteners such as screws, bolts, hooks, loops or rivets may be used to secure the inhibitor and the conduit. It is to be appreciated that there are many different means of engaging and maintaining the inhibitor in accordance with some embodiments of the present invention.

In some embodiments, openings in first end 511 and openings in second end 512 may be parallel relative to each other. In some embodiments, openings in first end 511 and second end 512 may be angled relative to each other such that a section of conduit or a coupler attached to end 511 is angled with respect to a section of conduit or coupler attached to end 512. For example, and without limitation, inhibitor 510 may provide for an elbow in a long run of conduit sections by having a first end 511 oriented forty five degrees with respect to second end 512. It is to be appreciated the other relative angles between the ends are also contemplated in accordance with some embodiments of the present invention.

In some embodiments, clamp guide 522 may have an extended portion 542 defining a clamp guide cavity 549. In a preferred embodiment, the clamp guide cavity 549 may have a shape that corresponds to a portion of clamp guide 530. For example, and without limitation, extended portion 542 of clamp guide 522 may be configured such that a portion of clamp 530 and clamp guide cavity 549 have a substantially similar cross sectional area. It is also to be appreciated that clamp 530 may be slidably associated with the clamp guide inner surface.

In some embodiments, inhibitor 510 can comprise an actuator 541 with a corresponding head 548. In some examples, and without limitation, actuator 541 can be fixedly attached to clamp 530. In some other examples, actuator 541 can be attached to clamp 530 by a snap fit connection. In some other examples, actuator 541 and clamp 530 can comprise a unitary piece. It is to be appreciated that movement of clamp 530 within clamp guide 522 may be facilitated by actuator 541. Thus, in some embodiments, actuator 541 may have a securing features and a portion of clamp guide 522 may have complementary securing features. For example, and without limitation, actuator 541 may have threaded features and extended portion 542 may have complementary threaded features. In some other examples, actuator 541 may have an integrated gear rack while extended portion 542 has a complementary mechanism for negating the reverse movement of the gear rack (e.g., a ratchet). It is to be appreciated that other combinations of securing features are contemplated in accordance with some embodiments of the present invention. It is also to be appreciated that actuator 541 may comprise multiple subassemblies. For example, and while not shown, a first section of actuator 541 may comprise a first end engaged with clamp 530. A second section of actuator 541 may have a first end configured to be engaged with a second end of the first section of actuator 541 and may have a second end to which head 548 is attached.

In some embodiments, actuator 541 and clamp guide 522 may be configured in a screw-type configuration. For example, and without limitation, rotation of actuator 541 via head 548 (and relative to clamp guide 522) will produce relative motion between clamp guide 522 and the actuator 541. Because, in some embodiments, actuator 541 can be attached to clamp 530, the relative motion may cause clamp 530 to move relative to extended portion 542 of clamp guide 522. In some embodiments, head 548 may be a hexagonal fitting that is engaged by a socket or box-end wrench. In some embodiments, head 548 may be a hexagonal socket that is engaged by an Allen-type wrench. In some embodiments, head 548 may be engaged by a drive shaft that is rotated by a motor or engine in order to transmit an actuation motion to actuator 541. It is to be appreciated that other similar configurations of actuator 541, clamp guide 522, and head 548 are contemplated in accordance with some embodiments of the present invention.

In some embodiments, actuator 541 and clamp guide 522 may be configured in a gear rack-ratchet configuration. For example, and without limitation, actuator 541 may move relative to clamp guide 522 by imparting downward force on head 548. In some embodiments, actuator 541 can be a hydraulically or pneumatically driven piston capable of imparting motion to the clamp 530. In some embodiments, actuator 541 and clamp 530 may be configured as a cam moving within extended portion 542. It is to be appreciated that other similar configurations of actuator 541, clamp guide 522, and head 548 are contemplated in accordance with some embodiments of the present invention.

As illustrated in the example of FIG. 20, inhibitor 510 may also comprise one or more securing mechanisms for minimizing movement of clamp 530. In some embodiments, securing mechanism 538 may be configured to minimize movement of clamp 530. For example, and without limitation, securing mechanism 538 may be a threaded nut sized and configured to thread over threaded features of actuator 541. In other examples, securing mechanism 538 may be configured with ratchet-type features to engage with gear rack features of actuator 541 and to negate reverse movement of the gear rack feature. By fastening securing mechanism 538 against extended portion 542 of clamp guide 522, tensile load may be provided through actuator 541 and may also result in a locking effect to prevent motion of actuator 541. It is to be appreciated that securing mechanism 538 may comprise a separable element of inhibitor 510 or may integrated into one or more elements of inhibitor 510. For example, and without limitation, securing mechanism 538 may be integrated into a portion 542 of clamp guide 522. In other examples, and in the example where actuator 541 is a hydraulically driven piston, securing mechanism may be the hydraulic source itself. By application of pressure through associated hydraulic lines, clamp 530 may be locked in place. It is also to be appreciated that other securing mechanisms or combinations thereof are contemplated in accordance with some embodiments of the present invention. For example, and without limitation, securing mechanism 538 can be a cotter pin which is engaged with a component of inhibitor 510 to resist motion of actuator 541 and thus clamp 530.

In some embodiments, inhibitor 510 can also include securing mechanism 537 for minimizing movement of clamp 530. For example, and without limitation, securing mechanism 537 can be a roll-pin associated with actuator 541 for resisting upward force resulting from the restraining pressure between clamp 530 and portion 532 of clamp guide 522. It is to be appreciated that inhibitors in accordance with some embodiments of the present invention can include any combinations of securing mechanisms. For example, an inhibitor can include a securing mechanism for minimizing downward movement and/or a securing mechanism for minimizing upward movement.

When it is desired to secure a cable in accordance with some embodiments of the present invention, clamp 530 may initially be positioned in cavity 549 of clamp guide 522 such that a cable may be positioned between clamp 530 (and/or portion 550) and a portion 532 of clamp guide 522. By causing imparting movement on actuator 541 relative to clamp guide 522, clamp 530 may be urged towards an inside portion 532 of clamp guide 522, thereby pressing the axially disposed device (for convenience, and without limitation, referred to hereafter as "cable") between clamp 530 and portion 532 of clamp guide 522.

As illustrated in the examples of FIGS. 19 and 20, clamp 530 may have axis of movement substantially perpendicular to a central axis of the sections of conduit that may be coupled to first 511 and/or second 512 ends. However, in some embodiments, the inhibitor can be configured such that the clamp has an axis of movement other than perpendicular to a central axis of the sections of the conduit. It is believed that when clamp 530 moves about an axis that is not perpendicular to a central axis of the sections of conduit, a retention force may be applied to the cable by clamp 530 which has a vector generally opposite to that of a force which may be imparted on the cable during a theft attempt. As such, the reactive loads will tend to place the clamp 530 in compression rather than in bending, which may be a condition that is less likely to result in failure of the inhibitor 510.

In some embodiments, clamp 530 may be a solid block having a shape substantially similar to extended portion 542 of clamp guide 522. However, it is to be appreciated that other clamp geometries are contemplated in accordance with some embodiments of the present invention. For example, and without limitation, clamp 530 may comprise a U-Bolt, a J-Bolt, a Spade-Bolt, or an Eye-Bolt. It is to be appreciated however, that the geometry of clamp 530 should be selected such that it has a distal end with a geometry similar to that of a portion of the inside surface 532 of the inhibitor 510.

In some embodiments, clamp 530 may have a portion 550 that comprises a deformable material having an increased coefficient of friction. For example, and without limitation, portion 550 may comprise a layer of vulcanized rubber. In other examples, portion 550 can have a roughened surface or may have a tacky substance such as natural or synthetic oil or adhesive applied thereto. In some embodiments, portion 532 of clamp guide 522 may also have a layer of vulcanized rubber or a tacky substance applied thereto or may have a roughened surface. It is to be appreciated that by increasing the coefficient of friction, inhibitor 510 may be more effective in hindering removal of a cable.

It is to be appreciated that a variety of materials and combinations thereof may be used to form the components of the inhibitor in accordance with some embodiments of the present invention. In some embodiments, metal or polymers having relatively high stiffness may be used. For example, and without limitation, one, a plurality, or all components of inhibitor 510 may be formed of steel, cast iron, aluminum, or moldable plastic. In some embodiments, components upon which the most force is imparted may comprise materials having high stiffness and components upon which lesser force is imparted may comprise materials having lower stiffness.

In some embodiments, the dimensions of clamp guide 522 may also serve to anchor inhibitor 510 within the surrounding medium. For example, and without limitation, inhibitor 510 may be buried underground along with portions of the conduit and backfilled with earth. In some embodiments, clamp guide 522 may be configured to protrude in a radial direction sufficiently beyond that of sections of conduit. When a removal load is applied to a cable that has been secured in accordance with some embodiments of the present invention, the protruding portions of clamp guide 522 can engage the surrounding medium and supply reactive loads to further prevent removal of the cable. Thus, in some embodiments, clamp guide 522 can be formed with significant surface area so as to increase opposition with the surrounding medium thereby increasing the retention load applied to inhibitor 510. In some embodiments, anchoring features may be associated with an outer surface of inhibitor 510. For example, anchors may be spade shaped protrusions that are effective at engaging the surrounding earth to resist motion. In other examples, anchors may be protrusions with circular, rectangular, elliptical, or non-geometrically shaped cross sections sufficient to engage the earth. It is to be appreciated that the clamp guide may comprise various other shapes, sizes, configurations, and features suitable for engaging with the surrounding medium in accordance with some embodiments of the present invention.

Another Exemplary Apparatus and System for Inhibiting the Removal of a Cable from a Conduit In some embodiments, an inhibitor may comprise a plurality of clamp guides and a device body disposed on a unitary piece. Referring now to the exemplary illustrations of FIGS. 21 and 22, inhibitor 610 can have a first end 611 for engaging a first section of conduit (not shown) and a second end 612 for engaging a second section of conduit 13. In some embodiments, first end 611 and or second end 612 can be configured to engage a second inhibitor (not shown) and/or a coupling feature. For example, and without limitation, second end 612 may have a coupling feature for coupling with conduit 13. In some embodiments, both first end 611 and second end 612 have such coupling features. In some embodiments, neither first end 611 nor second end 612 have such coupling features.

Clamps 630A, 630B may be disposed within clamp guides 622A, 622B, respectively, and configured to press cable 36 against an inner surface 632 of device body 120. In some embodiments, clamp guides 622A, 622B and/or body 620 may be formed of a metal or polymer with relatively high stiffness. In some examples, and without limitation, body 620 and clamp guides 622A, 622B may comprise moldable plastic. In other examples, they may both comprise cast iron. In some embodiments, clamp guides 622A, 622B and body 620 may be formed at the same time and of the same material. For example, and without limitation, clamp guides 622 and body 620 of inhibitor 610 may be formed by injection molding. In some embodiments, clamp guides 622A, 622B and body 620 may be formed of different materials. For example, and without limitation, clamp guides 622A, 622B may be formed of tempered steel and body 620 may be formed of cast iron. In those examples, clamp guides 622A, 622B may be welded or otherwise fixedly attached to device body 620. It is to be appreciated that clamp guides 622A, 622B may also be pressed, cast, or glued to device body 620. It is also to be appreciated that a variety of materials and combinations thereof may be used to form the components of the inhibitor in accordance with some embodiments of the present invention.

As shown in the exemplary illustrations, inhibitor 610 can have a first clamp guide 622A (and associated clamp 630A) and a transversely separated second clamp guide 622B (and associated clamp 630B) for inhibiting removal of cable 36 from conduit 13. In some embodiments, the plurality of clamp guides may have the same axial configuration relative to a central axis of the sections of conduit. In some embodiments, the plurality of clamp guides may be axially separated relative to a central axis of a conduit section. As illustrated, and without limitation, the clamp guides 622A and 622B may be configured to be about one hundred and eighty degrees out of phase with each other. It is further to be appreciated that, in some embodiments, the separation distance (or transverse separation) and rotational phase (or axial separation) of the clamp guides may be determined with reference to the maximum permissible angular displacement of cable 36, the interior dimensions of the clamp guides and/or the interior dimensions of the body. In some examples, and without limitation, the clamp guides may be separated by a distance of ten inches and one hundred and eighty degrees out of phase from each other. In other examples, and without limitation, three clamp guides can be separated by a distance of three inches and one hundred and twenty degrees out of phase from each other. It is to be appreciated that any number of inhibitors may be separated by any transverse distance and axial distance in accordance with some embodiments of the present invention.

In some embodiments, clamps 630A, 630B and inner surface 632 of device body 620 can be configured with an increased coefficient of friction. For example, and without limitation, a layer of vulcanized rubber can be affixed on a portion of clamp 630A and/or clamp 630B or on inner surface 632. In other examples, the clamps or inner surface may have a roughened surface. It is to be appreciated that there are many ways that the clamps and/or inner surface of the device body may be adapted in accordance with some embodiments of the present invention.

In use, it can be seen that removal of cable 36 can be inhibited by the compression thereof against inner portion 632 of device body 620 by clamps 630A, 630B. By causing actuators 641A, 642B to move relative to clamp guides 622A, 622B (for example, and without limitation, by rotating heads 648A, 648B), clamps 630A, 630B will cause cable 36 to be pressed against portion 632. Once firmly in place, securing mechanisms 637A, 637B, 638A, 638B can be activated so as to prevent movement of clamps 630A, 630B. It is to be appreciated that any number of clamp guides (and thus clamps), with any axial separation, can be provided on a single unitary housing in accordance with some embodiments of the present invention.

As shown in the exemplary illustrations of FIGS. 21 to 22, cable 36 may see multiple forces when a tensile load (for example, a removal force) is applied to it. Taking a central axis of the sections of conduit 13 as a frame of reference, the applied tensile load may have (i) a vector generally in the direction of the central axis and (ii) a vector generally transverse to that axis. In addition, there may be a normal load applied to cable 36 between clamp 630A and a portion 632 of clamp guide. In reaction, there can be a resistive frictional load applied to cable 36 that will have a directional vector generally parallel and opposite to the axial component of the tensile load applied to cable 36. The resistive frictional load may also be proportional to the coefficient of friction that is specific to the materials used for construction of cable 36, clamps 630A, 630B, clamp guides 622A, 622B, interior portion 632 of device body 620, and/or conduit 13.

In the case where the tensile load is applied as an attempt to remove cable 36 from conduit 13 by overcoming the resistive loads imparted to cable 36 by inhibitor 610, it can be appreciated removal will not occur unless the axial component of the tensile force is sufficient to overcome the resistive frictional load. For a given tensile force applied to cable 36, the probability of cable 36 being removed is reduced if the tensile force in cable 36 has a larger transverse component than if the tensile load is entirely axial. It is believed that this is true because the axial component of the removal force is inversely proportional to the transverse component, and thus, an increase in the transverse component will cause a decrease in the axial component. When the axial component is reduced, the resistive frictional load is more likely to inhibit the removal of the cable 36 from the inhibitor 610.

Another Exemplary Apparatus and System for Inhibiting the Removal of a Cable from a Conduit In some embodiments of the present invention, an inhibitor may comprise a single clamp guide and a device body on a unitary piece. As illustrated in the exemplary illustrations of FIGS. 23 and 24, inhibitor 710B may comprise a single clamp guide 722B formed on body 720B and disposed between first end 711B and second end 712B. In some embodiments, first end 711B and/or second end 712B may be configured to engage a conduit section 13. In some embodiments, one or both of first end 711B and second end 712B may comprise an adaptive or coupling feature (for example, and without limitation, an annular shoulder). In some embodiments, one or both of first end 711B and second end 712B may be configured to engage another inhibitor (for example, and without limitation, inhibitor 710A). For example, and without limitation, inhibitor 710A may have a first end 711A with no coupling feature (for engaging a conduit, not shown) and a second end 712A with a coupling feature (for engaging second inhibitor 710B). As such, multiple inhibitors can be directly coupled together without the need for an intermediary section of conduit. In some embodiments (and although not shown), first inhibitor 710A and second inhibitor 710B can be separated by a section of conduit disposed between them. It is to be appreciated that the ends of the inhibitor can have multiple configurations in accordance with some embodiments of the present invention.

It is to be appreciated that some systems in accordance with embodiments of the present invention can comprise a plurality of inhibitors. In some embodiments, the distance between clamp 730A of inhibitor 710A and clamp 730B of inhibitor 710B can be determined by the length of ends 712A and 711B. For example, and without limitation, a system can be configured with (i) a distance of five inches between clamp 730A of inhibitor 710A and second end 712A and (ii) a distance of four inches between clamp 730B of inhibitor 710B and first end 711B. When two such inhibitors are joined together, for example by connecting first end 711B to second end 712A, the separation distance between the clamps will be nine inches. It is to be appreciated that any number of inhibitors can be provided with any transverse separation distance in accordance with some embodiments of the present invention.

In some embodiments, inhibitors 710A and 710B can be axially separated relative to a central axis of conduit 13. In some examples, and without limitation, first inhibitor 710A can be coupled to second inhibitor 710B with a rotational phase difference of about forty five degrees. In other examples, and as shown, first inhibitor 710A and second inhibitor 710B can be configured with a rotational phase difference of one hundred and eighty degrees. In some embodiments, the determination of the rotational angle between two or more coupled inhibitors can be made with reference to the internal dimensions of the conduit and/or clamp guides and the maximum angular bend that may be tolerated by the cable. For example, as above, and without limitation, if (i) the cable can be bent with a maximum angle of B degrees and (ii) the conduit has an internal diameter of D, then the transverse separation S and axial separation A of the inhibitors can be selected such that S is greater than or equal to D times the sin squared function of A/2 divided the tangent function of B. Thus, in some examples, if cable 36 can tolerate a maximum angular bend of ten degrees and the inside diameter 732A of body 720A is six inches, clamps 730A and 730B of inhibitors 710A and 710B, respectively, can have transverse separation of about five inches and a axial separation of about forty five degrees. It is to be appreciated, however, that any number of inhibitors may be separated by any transverse distance and axial distance in accordance with some embodiments of the present invention.

In use, and similar to the embodiments as illustrated in FIGS. 21 and 22, it can be seen that removal of cable 36 can be inhibited by the compression thereof against inner portion 732A of device body 720A by clamp 630A and by compression against inner portion 732B of device body 720B by clamp 730B. It is also to be appreciated that removal of cable 36 can further be inhibited by increasing the coefficient of friction between the cable 36 and clamps 730A, 730B and/or inner portions 732A, 732B. For example, and without limitation, a layer of vulcanized rubber can be affixed on a portion of clamp 730A and/or clamp 730B or on inner surfaces 632A and/or 632B. In other examples, clamp 730A and inner surface 732A can have a roughened surface while clamp 730B has a roughened surface. It is to be appreciated that there are many ways that the clamps and/or inner surface of the device body may be adapted in accordance with some embodiments of the present invention.

It is also to be appreciated that some embodiments of the present invention contemplate incorporating two or more types of inhibitors and/or clamps. For example, and without limitation, some systems in accordance with embodiments of the present invention can include a first inhibitor (for example, and without limitation, inhibitor 710A of FIG. 23) coupled to a second inhibitor (for example, and without limitation, inhibitor 410B of FIG. 17). In other examples, an inhibitor can include a first clamp and corresponding clamp guide (for example, and without limitation, clamp 630A) and a second clamp and corresponding clamp guide (for example, and without limitation, clamp 130B) disposed on a unitary body. It is to be appreciated that other combinations of inhibitors, clamps, and clamp guides are contemplated in accordance with some embodiments of the present invention.

Figure 25:
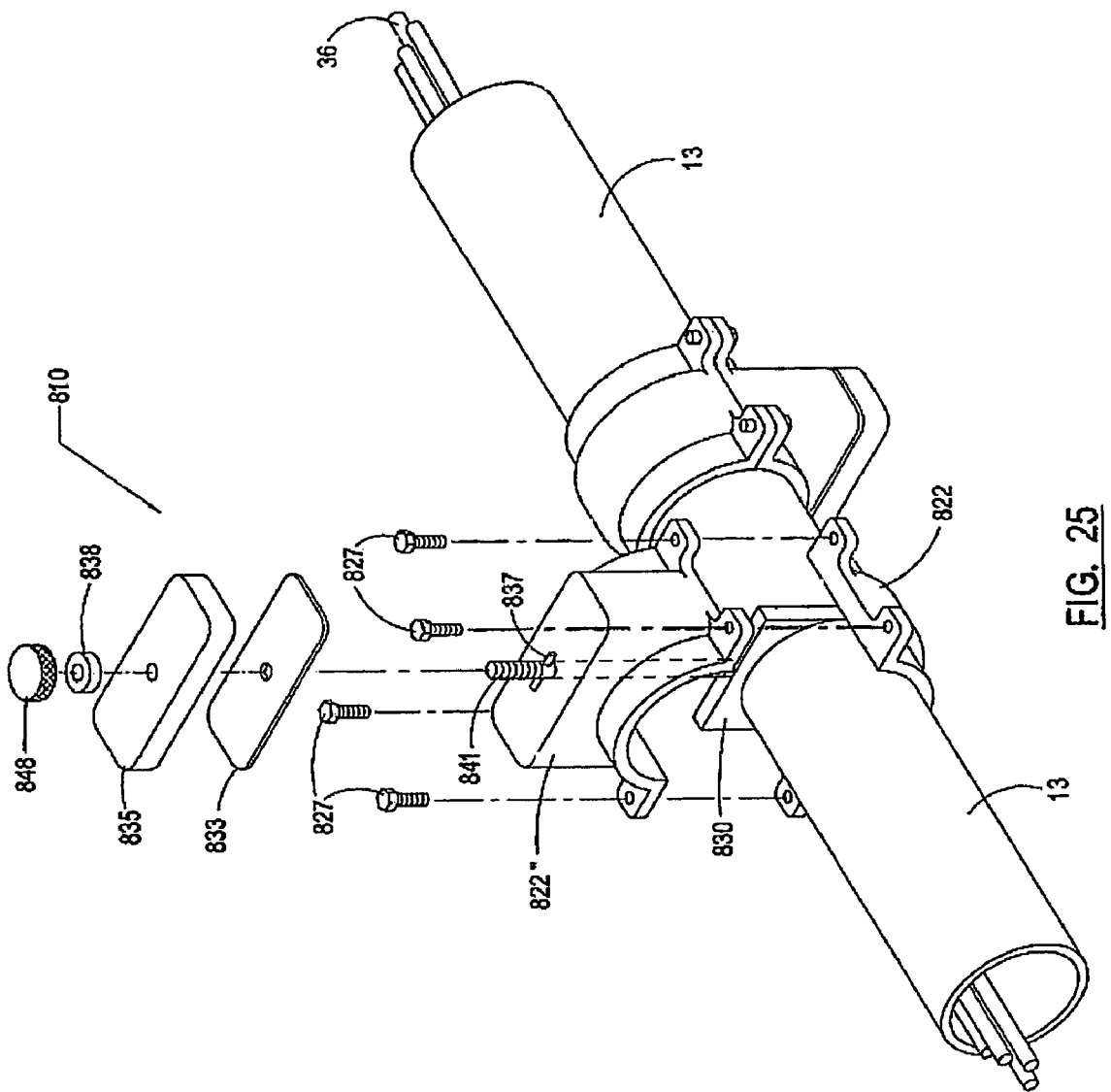
FIG. 25 is a partially exploded perspective view of another system for hindering the removal of a wire or cable from a conduit in accordance with some embodiments of the present invention.

Another Exemplary Retrofit Apparatus for Inhibiting the Removal of a Cable from a Conduit Referring now to the exemplary apparatus of FIG. 25, in some embodiments inhibitor 810 can include a compression-type clamp 830 and a clamp guide 822 having a number of subassembly components suitable for circumscribing the conduit. Accordingly, in some embodiments, the clamp guide can comprise a plurality of portions that may be secured together with attachment devices. For example, and without limitation, clamp guide 822 can have a first section 822' and a second portion 822". The first and second portions may be configured to be secured together with attachment devices 827. In other examples, clamp guide 822 can include three portions that can be secured together with snap-fit connections. It is to be appreciated that clamp guide 822 may comprise any number of portions in a variety of geometries and configurations in accordance with some embodiments of the present invention. For example, and without limitation, both first portion 822' and second portion 822" of clamp guide 822 can be configured with a one hundred and eighty degree arc. In other examples, first portion 822' may be configured to have a two ninety degree arc sub-portions (not shown) and second portion 822" can be configured to have a one hundred and eighty degree arc. It is to be appreciated that any number and configuration of portions and sub-portions may be provided in accordance with some embodiments of the present invention. It is further to be appreciated that there are other means for attaching the plurality of clamp guide portions to each other in accordance with some embodiments of the present invention.

Similar to some embodiments (as illustrated in the example of FIG. 20), inhibitor 810 can comprise an actuator 841 for facilitating movement of clamp 830. In some examples, and without limitation, actuator 841 can be fixedly attached to clamp 830. In other examples, actuator 841 can be attached to clamp 830 by a snap fit connection or actuator 841 and clamp 830 may form a unitary piece. In addition, in some embodiments, actuator 841 may have securing features and a portion of clamp guide 822 may have complementary securing features. For example, and without limitation, actuator 841 may have threaded features and second section of clamp guide 822" may have complementary threaded features. In other examples, actuator 841 may have an integrated gear rack while clamp guide section 822" has a complementary ratchet. It is to be appreciated that other combinations of securing features are contemplated in accordance with some embodiments of the present invention.

In some embodiments, actuator 841 and a portion of the clamp guide 822 may be configured in a screw-type configuration. For example, and without limitation, axial rotation of actuator 841 via head 848 may produce relative motion between actuator 841 and clamp guide portion 822". In some embodiments, head 848 may be a hexagonal fitting that can be engaged by a socket or box-end wrench while in some embodiments, head 848 may be a hexagonal socket that is engaged by an Allen-type wrench. In some embodiments, head 848 may be engaged by a drive shaft that is rotated by a motor or engine in order to transmit an actuation motion to actuator 841. It is to be appreciated that other similar configurations of actuator 841, clamp guide 822, and head 848 are contemplated in accordance with some embodiments of the present invention.

In some embodiments, actuator 841 and clamp guide 822 may be configured in a gear rack-ratchet configuration. For example, and without limitation, downward force may be imparted on head 848 thus causing actuator 841 to move relative to clamp guide portion 822". In some embodiments, actuator 841 can be a hydraulically or pneumatically driven piston capable of imparting motion to clamp 830. In some embodiments, actuator 841 and clamp 830 may be configured as a cam moving within extended portion 842. It is to be appreciated that other similar configurations of actuator 841, clamp guide 822, and head 848 are contemplated in accordance with some embodiments of the present invention.

As illustrated in the example of FIG. 25, inhibitor 810 may also comprise a securing mechanism 838. In some embodiments, securing mechanism 838 may be configured to minimize movement of clamp 830. For example, and without limitation, securing mechanism 838 may be a threaded nut sized and configured to thread over threaded features of actuator 841. In other examples, securing mechanism 838 may be configured with ratchet-type features to engage with gear rack features of actuator 841 and negate reverse movement thereof. By fastening securing mechanism 838 against a portion of the clamp guide (for example, portion 822"), tensile load may be provided through actuator 841 and will also result in a locking effect to prevent motion of actuator 841. It is to be appreciated that securing mechanism 838 may comprise a separable element of inhibitor 810 or may integrated into one or more elements of inhibitor 810. For example, and without limitation, securing mechanism 838 may be integrated into clamp guide portion 822". In other examples, and corresponding to the example where actuator 841 is a hydraulically driven piston, securing mechanism may be the hydraulic source itself. By applying pressure through associated hydraulic lines, clamp 830 may be locked in place. It is also to be appreciated that other securing mechanisms are contemplated in accordance with some embodiments of the present invention. For example, and without limitation, securing mechanism 838 can be a cotter pin which is engaged with a component of inhibitor 810 to resist motion of actuator 841 and thus clamp 830.

In some embodiments, inhibitor 810 can also include securing mechanism 837 for minimizing movement of clamp 830. For example, and without limitation, securing mechanism 837 can be a roll-pin associated with actuator 841 for resisting upward force resulting from the restraining pressure between clamp 830 and portion 822' of clamp guide 822. It is to be appreciated that inhibitors in accordance with some embodiments of the present invention can include any combinations of securing mechanisms. For example, an inhibitor can include a securing mechanism for minimizing downward movement and/or a securing mechanism for minimizing upward movement.

In use, a portion of conduit 13 carrying a cable 36 may be partially or fully cut to form an opening, the opening having a width sufficient for receiving clamp 830 therein. It is to be appreciated that in some retrofit applications, conduit 13 can be fully or partially cut. In some embodiments, and referring to the example where the conduit is partially cut, clamp 830 should have a width that is not greater than the inside diameter of conduit 13 so that clamp 830 can be positioned therein. In some embodiments, and referring to when the conduit is fully cut, clamp 830 may have a width that is greater than the inside diameter of conduit 13. In some embodiments, first portion 822' and second portion 822" of clamp guide 822 may be configured with geometries suitable for forming a tight fit around conduit 13. For example, and without limitation, conduit 13 may have an outside diameter of six inches and clamp guide portions 822' and 822" may be configured such that when they are secured together with attachment devices 827, an opening having a diameter of six inches is formed. In some embodiments, clamp guide 822 may also include a seal (not shown) configured to form a tight seal with conduit 13. In some embodiments, pipe glue or another adhesive can be placed at the interface between clamp guide portions 822', 822" and conduit 13 for forming a tight connection. In some embodiments, the internal size of the opening in clamp guide 822 may be configured to be slightly larger than the outside diameter of the conduit such that, when used in combination with a seal or some other type of deformable seal, a tight connection is formed. It is to be appreciated that other sized clamp guide portions may be used for other sized conduit sections in accordance with some embodiments of the present invention.

It is to be appreciated that inhibitors such as illustrated in the example of FIG. 25 are preferred for some retrofit applications. Referring back to FIG. 15, it can be seen that some inhibitors may be configured to secure cable 36 by the application of an upward "pulling" force on the clamp 330 in a direction radially-outward from a central axis of a section of conduit 13 and towards the securing mechanism. This may result in cable 36 being pressed between a portion of clamp 330 and clamp guide portion 322". In contrast, an exemplary inhibitor as illustrated in the example of FIG. 25, may be configured to secure cable 36 by the application of a downward "pushing" force on clamp 830 via actuator 841 away from the securing mechanism. Thus, it should be appreciated that in the exemplary retrofit inhibitor as illustrated in FIG. 25, clamp 830 may not need to be "fished" around cable 36.

Figure 26:
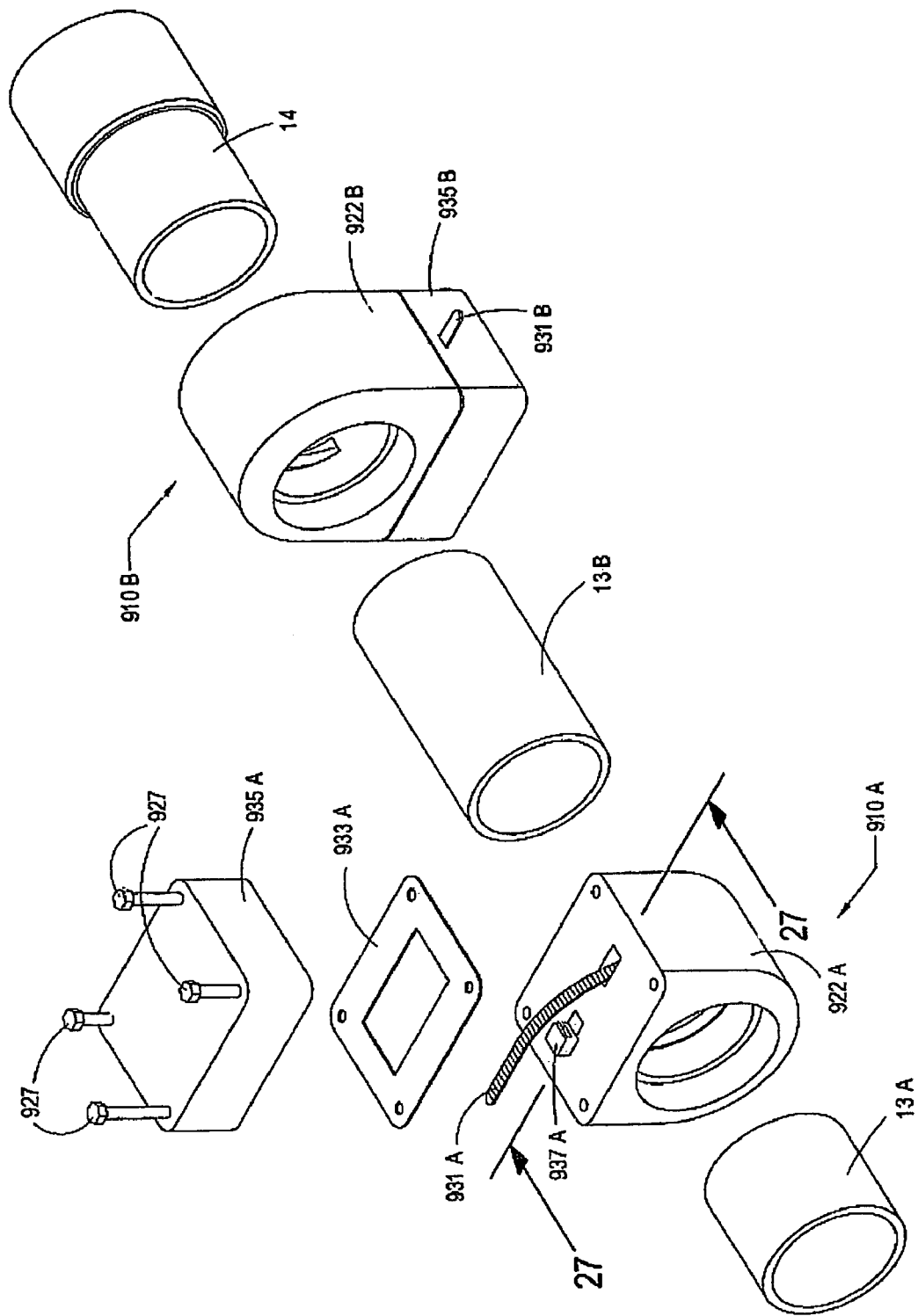
FIG. 26 is a partially exploded perspective view of another exemplary apparatus and system for hindering the removal of a wire or cable from a conduit in accordance with some embodiments of the present invention.
Figure 27:
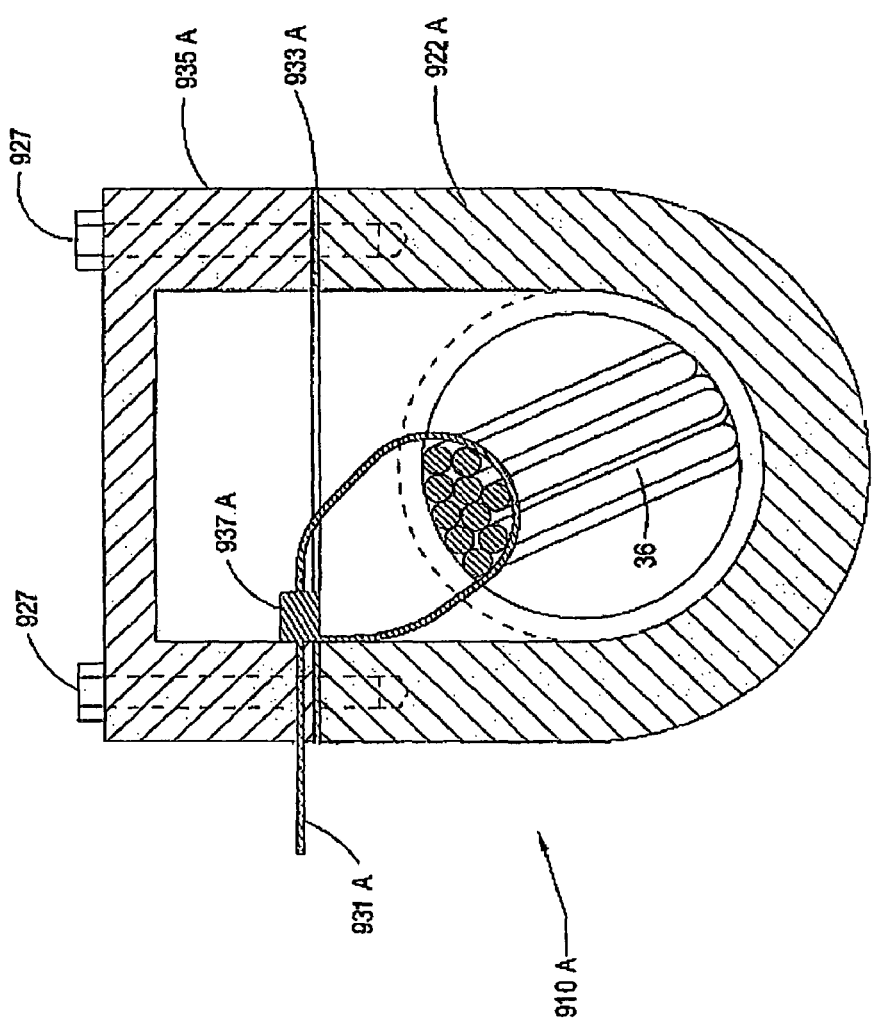
FIG. 27 is a cross sectional view of the exemplary apparatus of FIG. 26, taken along the 27-27 lines.

Another Exemplary Apparatus for Inhibiting the Removal of a Cable from a Conduit As above, in some embodiments, the inhibitor may include a clamp comprising a flexible material with a high tensile strength. In some examples, without limitation, and as illustrated in the examples of FIGS. 26 and 27, inhibitor 910A may include clamp 930A comprising a zip-tie strap. In some other embodiments, and as illustrated in the examples of FIGS. 28-36, the clamp may include a flexible material with a high tensile strength and further include one or more rigid portions for engaging with the clamp guide.

Referring particularly to FIG. 28, in some embodiments, inhibitor 1010 may include a clamp guide 1022 with a first and second end, each for engaging a section of conduit (not shown) or a coupler (not shown) in an opening therein. In some embodiments, mechanism 1035 may be fixedly attached to clamp guide 1022. In some embodiments, inhibitor 1010 may also include a seal 1033. In some examples, and without limitation, mechanism 1035 and seal 1033 may have holes for permitting passage of attachment devices 1027. It is to be appreciated that mechanism 1035 and/or seal 1033 may function provide protection from the elements and surrounding environment. In some embodiments, attachment devices 1027 may have threaded ends and clamp guide 1022 may have appropriately positioned and sized threaded holes for receiving attachment devices 1027. In some embodiments, attachment devices 1027 and holes in clamp guide 1022 may form a snap-fit connection. However, it is to be appreciated that other means of attaching mechanism 1035 to clamp guide 1022 are contemplated in accordance with some embodiments of the present invention.

As illustrated, and without limitation, clamp 1030 may include a flexible portion 1031 and a rigid portion 1038. For example, and without limitation, clamp 1030 may include a flexible portion 1031 such as a nylon strap and a rigid portion 1038 which may be formed of the same material as the flexible portion 1031. In other examples, flexible portion 1031 may comprise a steel or metallic belt and rigid portion 1038 may comprise a metallic body. However, it is to be appreciated that the clamp may comprise other materials in accordance with embodiments of the present invention. It is further to be appreciated that the flexible portion may comprise a first material and the rigid portion may comprise a second material. For example, and without limitation, the flexible portion may comprise hemp and the rigid portion may comprise moldable plastic.

Figure 30:
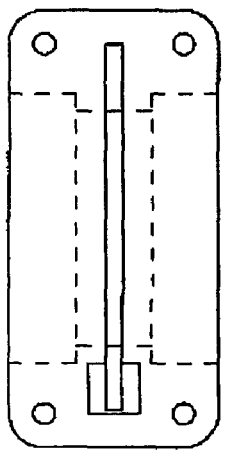
FIG. 30 is a cross sectional view of the exemplary apparatus of FIG. 28, taken along the 30-30 lines.
Figure 29:
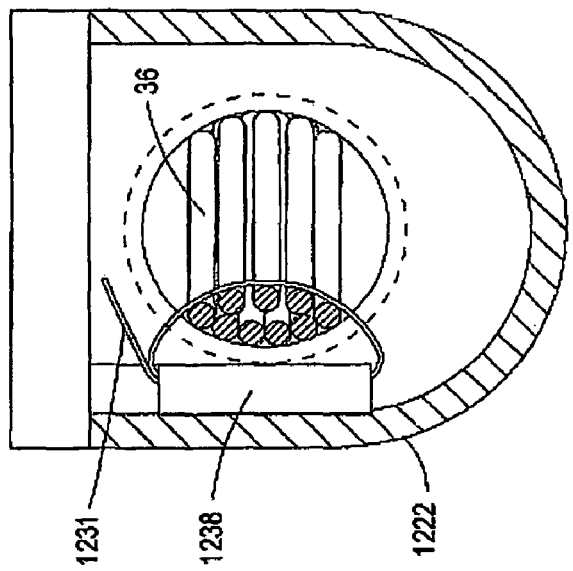
FIG. 29 is a cross sectional view of the exemplary apparatus of FIG. 28, taken along the 29-29 lines.
Figure 34:
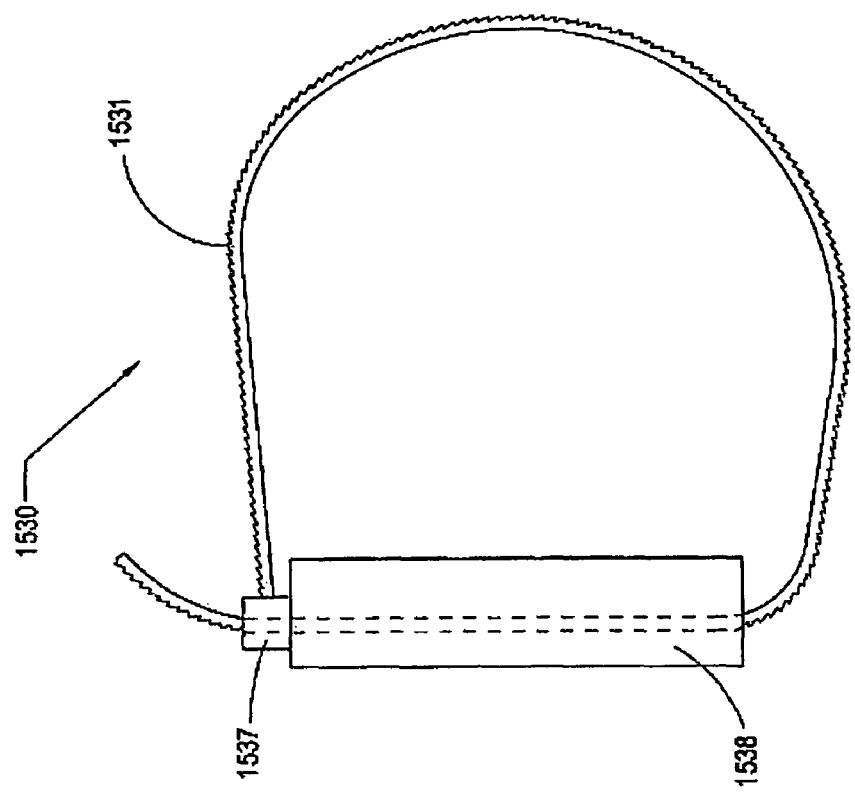
FIG. 34 is a cross sectional view of another exemplary clamp in accordance with some embodiments of the present invention.
Figure 33:
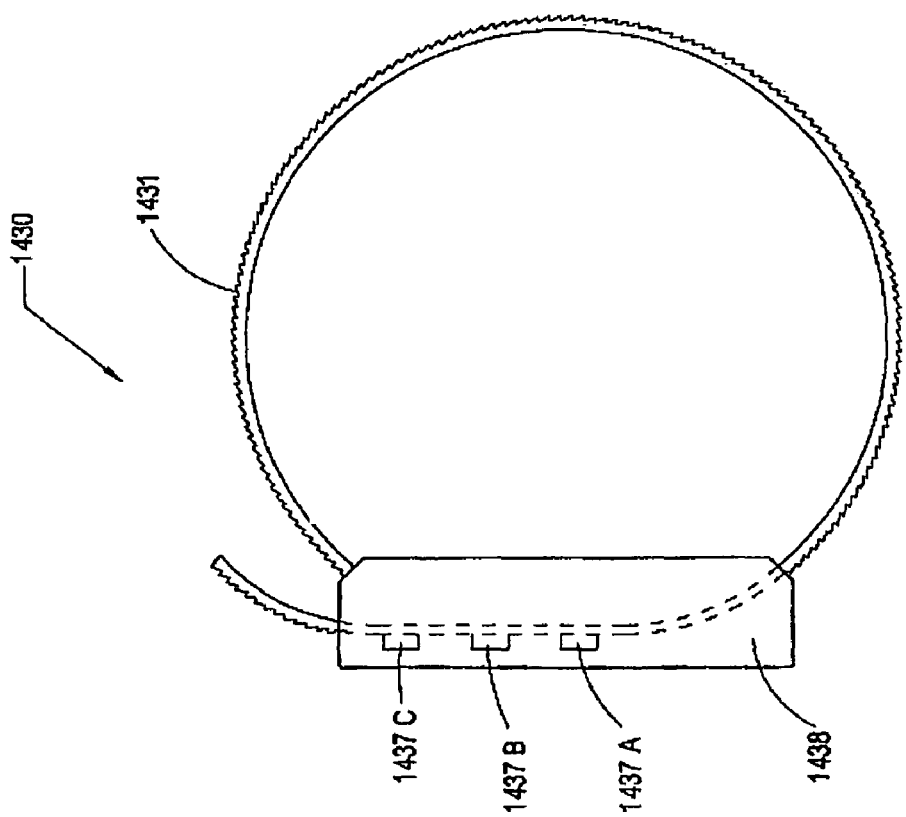
FIG. 33 is a cross sectional view of an exemplary clamp in accordance with some embodiments of the present invention.
Figure 35:
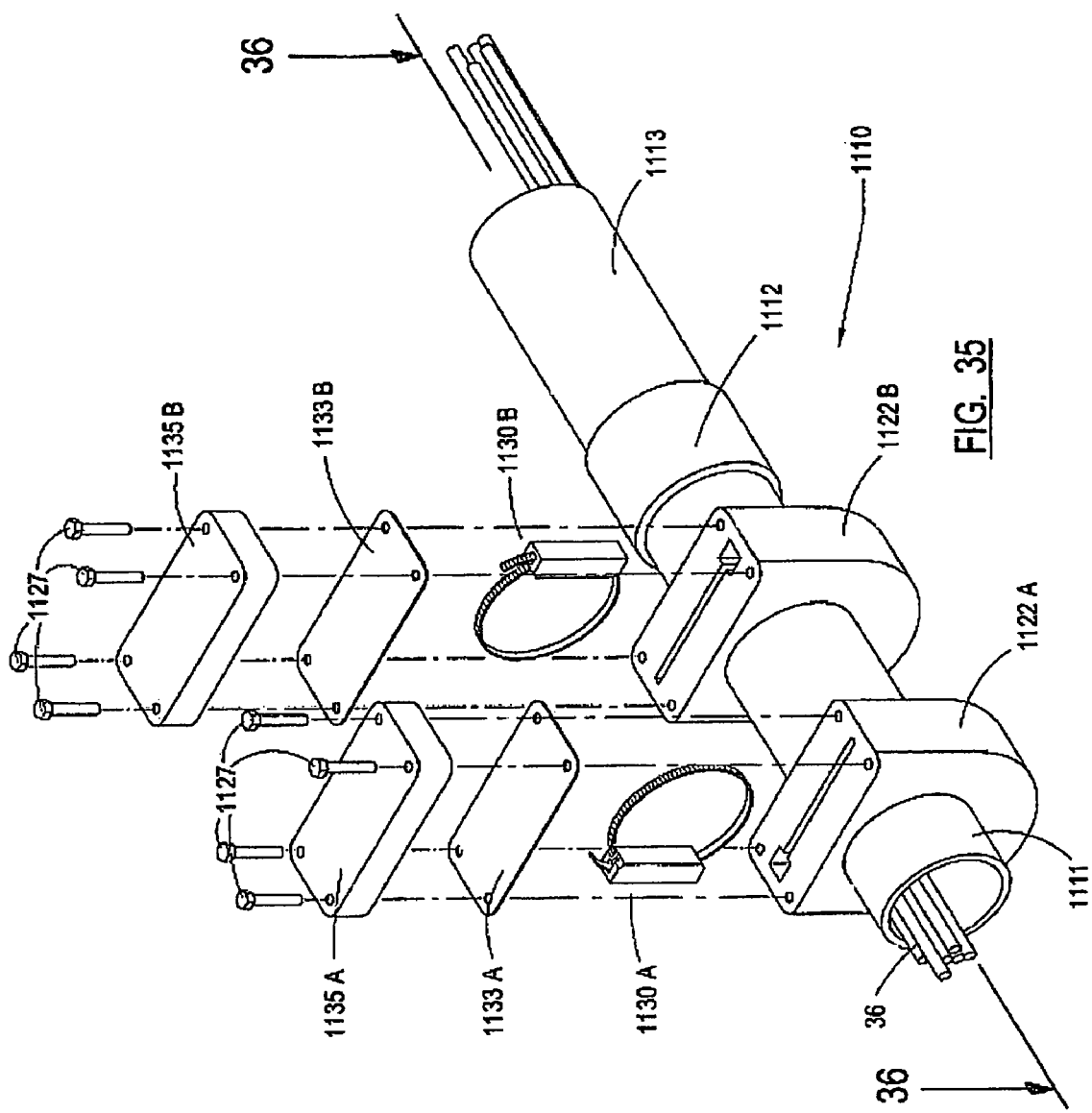
FIG. 35 is a perspective view of another exemplary system for hindering the removal of a wire or cable from a conduit in accordance with some embodiments of the present invention.

Referring to the exemplary illustrations of FIGS. 29-30, in some embodiments, clamp guide 1222 may have an slot for receiving flexible portion 1231 of the clamp and a cavity for receiving rigid portion 1238 of the clamp. In some examples, and without limitation, rigid portion 1238 may have a rectangular, circular, oval, oblong, triangular, star-shape, or any other shape, and clamp guide 1222 may have a complementary-shaped cavity therein. It is to be appreciated that the shape and dimensions of rigid portion 1238 and of the cavity formed in clamp guide 1222 should be selected so as to prevent rigid portion 1238 from dislocating when a sufficient removal force is applied to cable 36.

In some embodiments, rigid portion 1238 may have a length that is about equal to an inside diameter of the conduit which is engaged to clamp guide 1222. However, it is to be appreciated that in accordance with some embodiments of the present invention, rigid portion 1238 of the clamp may have a length that is greater than or less than the inside diameter of the conduit. In some embodiments, the cavity in clamp guide 1222 for receiving rigid portion 1238 of the clamp can be formed such that when properly seated, rigid portion 1238 is centered (as shown, centered vertically) with respect to the conduit.

Figure 32:
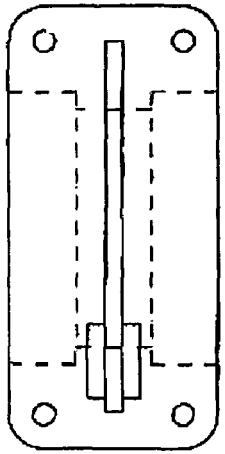
FIG. 32 is another cross sectional view of the exemplary apparatus of FIG. 31.
Figure 31:
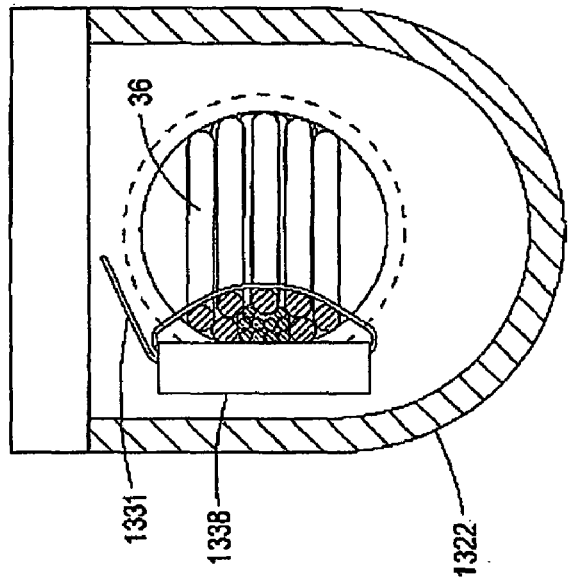
FIG. 31 is a cross sectional view of an exemplary apparatus for hindering the removal of a wire or cable from a conduit in accordance with some embodiments of the present invention.

In some embodiments, rigid portion 1238 of the clamp may have a surface which is tangential with an inside diameter of the conduit and/or an inner portion of the clamp guide. For example, the rigid portion of the clamp may be offset from a central axis of the conduit by an amount equal to the inside radius of the conduit. However, as illustrated in the examples of FIGS. 29-10, and without limitation, rigid portion 1238 of the clamp may be set back such that, when cable 36 is secured against the inside portion of the conduit and or the inside portion of the clamp guide, it does not come into contact with rigid portion 1238. In some other embodiments, as illustrated in the examples of FIGS. 31-32, and without limitation, rigid portion 1338 of the clamp may protrude slightly inward towards the central axis of the conduit such that cable 36, when secured, additionally is brought into compression with a surface of rigid portion 1338. It is to be appreciated that by tightly compressing cable 36 between flexible portion 1331 and rigid portion 1338 of the clamp, additional restraining force can be provided.

In some embodiments, the clamp may include one or more locking mechanisms for forming a tight frictional connection between the cable and the flexible portion of the clamp. Referring now to the example of FIG. 33, and without limitation, clamp 1430 may comprise a flexible portion 1431 and a rigid portion 1438. In some examples, and without limitation, clamp 1430 may comprise a single assembly wherein flexible portion 1431 and rigid portion 1430 are a unitary piece. In other examples, flexible portion 1431 may be separate from, but bonded to, rigid portion 1438. In some examples, and without limitation, flexible portion 1431 may comprise an integrated gear rack and locking mechanism 1437A may comprise a ratchet. In some examples, clamp 1430 may comprise a plurality of locking mechanisms 1437A, 1437B, 1437C, each for engaging with flexible portion 1431. In some embodiments, and without limitation, the locking mechanism(s) may be formed in or on the rigid portion of the clamp. For example, and without limitation, locking mechanism 1437A, 1437B, 1437C may be part of rigid portion 1438. However, in some embodiments, as illustrated in the exemplary clamp of FIG. 34, and without limitation, locking mechanism 1537 may be separable from rigid portion 1538. For example, clamp 1530 may comprise a zip-tie having a flexible portion 1531 with an integrated gear rack, a locking mechanism 1537 integrated onto one end of the flexible portion 1531, and a rigid portion 1538 with a cavity through which a portion of the flexible portion 1531 may pass.

It is to be appreciated, however, that other types of clamps are contemplated in accordance with some embodiments of the present invention. For example, and without limitation, the clamp may be a screw-type clamp comprising a flexible band with a thread pattern cut therein and a rigid worm-drive screw. In other examples, and without limitation, the clamp may be a wire-type clamp comprising a flexible wire portion with a rigid captive nut/screw assembly.

Referring back to the exemplary illustration of FIG. 28, in some examples, and without limitation, clamp 1030 may be formed into a large loop by passing one end of flexible portion 1031 through rigid portion 1038. Clamp 1030 may thereafter be placed into clamp guide 1022 such that rigid portion 1038 occupies the cavity formed in clamp guide 1022 and the loop formed by flexible portion 1031 substantially extends the entire inside diameter of the inside portion of clamp guide 1022. The cable (not shown) can then be fed down the conduit, through clamp guide 1022, and through the inside area of the loop formed in flexible material 1031. The end of flexible portion 1031 can then be pulled tight, thus securing the cable against one of the group consisting of the inside portion of the clamp guide, the inside portion of the conduit, and combinations thereof.

In some other embodiments, clamp 1030 can secure a cable that has already been positioned through clamp guide. For example, and without limitation, a retrofit application can include initially placing rigid portion 1038 of the clamp into the cavity formed in the recess of clamp guide 1022. An end of flexible portion 1031 can be fished down through clamp guide 1022, around the cable, and back up through rigid portion 1038. Thereafter, the end of flexible portion 1031 can be pulled tight, securing the cable.

It is to be appreciated that in accordance with some embodiments of the present invention, any of the previously identified embodiments (including but not limited to the multiple inhibitor systems, the unibody inhibitor systems, the transversely and axially separated inhibitors, the retrofit embodiment, etc.), may be adapted to substitute a clamp having both flexible and rigid portions. For example, and without limitation, clamp guide 1022 can comprise multiple portions (similar to the multiple portions 322' and 322" of clamp guide 322 as illustrated in the exemplary illustrations of FIGS. 13 to 15) for retrofit-type applications.

In other examples, and without limitation, an inhibitor may comprise a plurality of clamp guides and a device body disposed on a unitary piece. Referring now to the exemplary illustrations of FIGS. 35-36, inhibitor 1110 can have a first end 1111 for engaging a first section of conduit (not shown)

and a second end 1112 for engaging a second section of conduit 13. In some embodiments, first end 1111 and or second end 1112 can be configured to engage a second inhibitor (not shown) and/or a coupling feature. For example, and without limitation, second end 1112 may have a coupling feature for coupling with conduit 13. In some embodiments, both first end 1111 and second end 1112 can have such coupling features. In some embodiments, neither first end 1111 nor second end 1112 can have such coupling features.

Clamps 1130A, 1130B may be disposed within clamp guides 1122A, 1122B, respectively, and configured to press cable 36 against an inner surface 1132 of device body 1120. In some embodiments, clamp guides 1122A, 1122B and/or body 1120 may be formed of a metal or polymer with relatively high stiffness. In some examples, and without limitation, body 1120 and clamp guides 1122A, 1122B may comprise moldable plastic. In other examples, they may both comprise cast iron. In some embodiments, clamp guides 1122A, 1122B and body 1120 may be formed at the same time and of the same material. For example, and without limitation, clamp guides 1122 and body 1120 of inhibitor 1110 may be formed by injection molding. In some embodiments, clamp guides 1122A, 1122B and body 1120 may be formed of different materials. For example, and without limitation, clamp guides 1122A, 1122B may be formed of tempered steel and body 1120 may be formed of cast iron. In those examples, clamp guides 1122A, 1122B may be welded or otherwise fixedly attached to device body 1120. It is to be appreciated that clamp guides 1122A, 1122B may also be pressed, cast, or glued to device body 1120. It is also to be appreciated that a variety of materials and combinations thereof may be used to form the components of the inhibitor in accordance with some embodiments of the present invention.

As shown in the exemplary illustrations, inhibitor 1110 can have a first clamp guide 1122A (and associated clamp 1130A) and a transversely separated second clamp guide 1122B (and associated clamp 1130B) for inhibiting removal of cable 36 from conduit 13. In some embodiments, the plurality of clamp guides may have the same axial configuration relative to a central axis of the sections of conduit. In some embodiments, the plurality of clamp guides may be axially separated relative to a central axis of a conduit section. As illustrated, and without limitation, the clamp guides 1122A and 1122B may be configured to be about one hundred and eighty degrees out of phase with each other. For example, inhibitor 1110 can include first clamp 1130A and second clamp 1130B configured to compress cable 36 at locations which are one hundred and eighty degrees out of phase.

It is further to be appreciated that, in some embodiments, the separation distance (or transverse separation) and rotational phase (or axial separation) of the clamp guides may be determined with reference to the maximum permissible angular displacement of cable 36, the interior dimensions of the clamp guides and/or the interior dimensions of the body. In some examples, and without limitation, the clamp guides may be separated by a distance of ten inches and one hundred and eighty degrees out of phase from each other. In other examples, and without limitation, three clamp guides can be separated by a distance of three inches and one hundred and twenty degrees out of phase from each other. It is to be appreciated that any number of inhibitors may be separated by any transverse distance and axial distance in accordance with some embodiments of the present invention.

In some embodiments, clamps 1130A, 1130B and inner surface 1132 of device body 120 can be configured with an increased coefficient of friction. For example, and without limitation, a layer of vulcanized rubber can be affixed on an inside surface of flexible portion 1131A, 1131B, on an inside surface of rigid portion 1138A, 1138B, and/or on inner surface 1132. In other examples, the clamps or inner surface may have a roughened surface. It is to be appreciated that there are many ways that the clamps and/or inner surface of the device body may be adapted in accordance with some embodiments of the present invention.

In use, it can be seen that removal of cable 36 can be inhibited by the compression thereof against inner portion 1132 of device body 1120 by clamps 1130A, 1130B. By pulling the flexible portions of clamps 1130A, 1130B tightly through the rigid portions, and engaging them with corresponding securing mechanism, it is to be appreciated that cable 36 will be pulled tightly into friction compression with inside portions of the clamp guides and/or conduit. It is further to be appreciated that any number of clamp guides (and thus clamps), with any axial separation, can be provided on a single unitary housing in accordance with some embodiments of the present invention.

As illustrated, cable 36 may see multiple forces when a tensile load (for example, a removal force) is applied to it. Taking a central axis of the sections of conduit 13 as a frame of reference, the applied tensile load may have (i) a vector generally in the direction of the central axis and (ii) a vector generally transverse to that axis. In addition, there may be a normal load applied to cable 36 between clamp 1130A and a portion 1132 of clamp guide. In reaction, there can be a resistive frictional load applied to cable 36 that will have a directional vector generally parallel and opposite to the axial component of the tensile load applied to cable 36. The resistive frictional load may also be proportional to the coefficient of friction that is specific to the materials used for construction of cable 36, clamps 1130A, 1130B, clamp guides 1122A, 1122B, interior portion 1132 of device body 1120, and/or conduit 13.

In the case where the tensile load is applied as an attempt to remove cable 36 from conduit 13 by overcoming the resistive loads imparted to cable 36 by inhibitor 1110, it can be appreciated removal will not occur unless the axial component of the tensile force is sufficient to overcome the resistive frictional load. For a given tensile force applied to cable 36, the probability of cable 36 being removed is reduced if the tensile force in cable 36 has a larger transverse component than if the tensile load is entirely axial. It is believed that this is true because the axial component of the removal force is inversely proportional to the transverse component, and thus, an increase in the transverse component will cause a decrease in the axial component. When the axial component is reduced, the resistive frictional load is more likely to inhibit the removal of the cable 36 from the inhibitor 1110.

An Exemplary Method of Inhibiting the Removal of a Cable from a Conduit

In some embodiments, a method of inhibiting the removal of a cable can include causing a clamp that is at least partially enclosed within a clamp guide to compress the cable against an inner surface of the clamp guide and/or conduit.

For example, referring generally to the exemplary apparatuses as illustrated in FIGS. 1-15, and without limitation, an inhibitor can include a rigid bolt type clamp and a securing mechanism. The securing mechanism can be rotated with respect to a protruding end of a clamp, thereby causing the clamp to move radially in the direction of the securing mechanism. The rotation of the securing mechanism can continue until the cable is compressed between (i) a portion of the clamp and (ii) a portion of the inhibiting device, a portion of the clamp guide, and/or a portion of the conduit.

Figure 17:
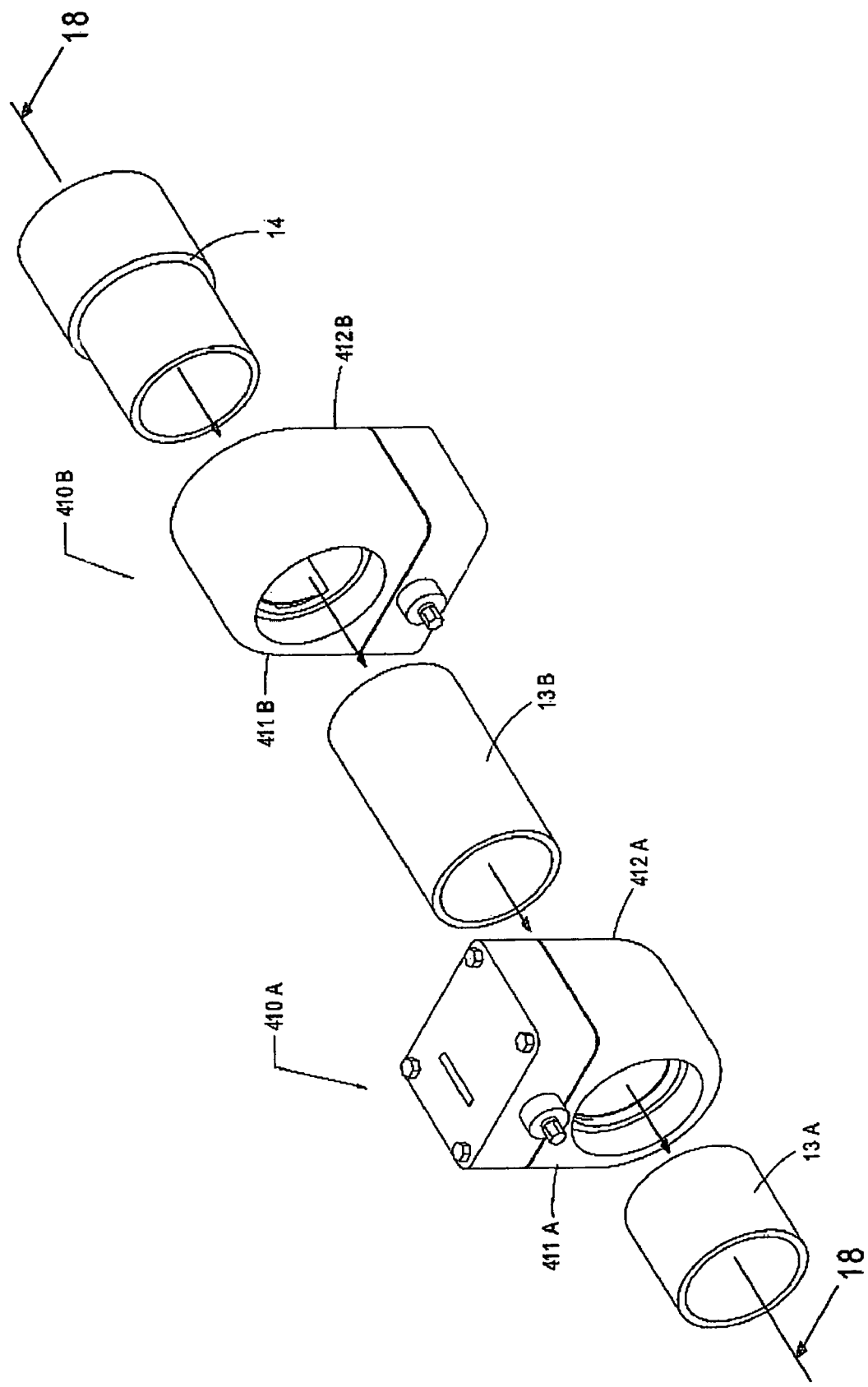
FIG. 17 is an exploded perspective view of an exemplary system incorporating the apparatus of FIG. 16 in accordance with some embodiments of the present invention.
Figure 18:
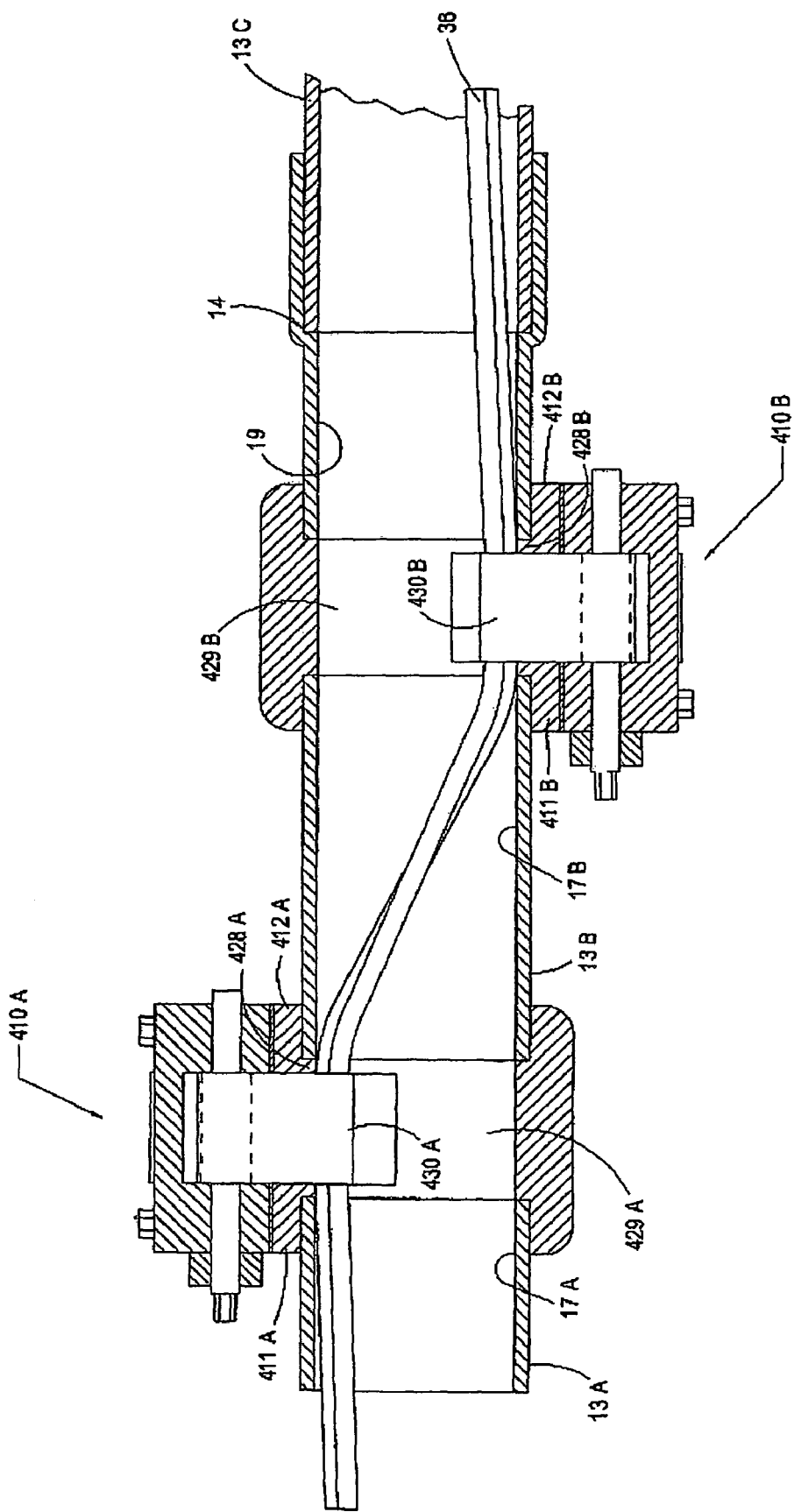
FIG. 18 is a cross sectional view of the exemplary system of FIG. 17, taken along the 18-18 lines.

In other examples, referring generally to the exemplary apparatuses as illustrated in FIGS. 16-18, and without limitation, an inhibitor can include a flexible ratchet type clamp and a securing mechanism. A user can secure the cable by rotating a key associated with the securing mechanism, thereby causing a clamp (attached on one end of the key) to move in the direction of the securing mechanism. The rotation of the key can continue until the cable is compressed between (i) a portion of the clamp and (ii) a portion of the inhibiting device, a portion of the clamp guide, and/or a portion of the conduit.

In other examples, referring generally to the exemplary apparatuses as illustrated in FIGS. 26-27, and without limitation, an inhibitor can include a zip-tie style clamp having a flexible portion with an integrated gear rack and an integrated ratchet or other similar device for negating reverse movement of the integrated gear rack. A user can secure the cable by pulling one end of the integrated gear rack through the integrated ratchet, thereby causing the cable to be pulled in the direction towards the ratchet. The user can pull the end of the integrated gear rack until the cable is compressed between (i) a portion of the clamp and (ii) a portion of the inhibiting device, a portion of the clamp guide, and/or a portion of the conduit.

In other examples, referring generally to the exemplary apparatuses as illustrated in FIGS. 19-25, and without limitation, an inhibitor can include a compression type clamp and an actuator. A user can secure the cable by applying force to the actuator (which can be incident or rotational) thereby causing the clamp to move in the direction opposite to the actuator. The force can continue to be applied to the actuator until the cable is compressed between (i) a portion of the clamp and (ii) a portion of the inhibiting device, a portion of the clamp guide, and/or a portion of the conduit.

In some embodiments, a method of inhibiting the removal of a cable can include (i) engaging a first inhibiting device having a body, a clamp, and a securing mechanism to a conduit, (ii) moving the clamp so as to compress the cable against an inner surface of the body and/or conduit, and (iii) causing the securing mechanism to prevent the clamp from moving with respect to the body.

For example, referring generally to the exemplary apparatuses as illustrated in FIGS. 1-12 and 16-24, and without limitation, a first cable-carrying device can be attached to a first side of an inhibiting device. Similarly, a second portion of conduit can be attached to a second side of the inhibiting device. In some examples, and without limitation, the cable-carrying device can be a section of conduit. In other examples, the cable-carrying device can be a coupler. In yet other examples, the cable-carrying device can be a second inhibiting device. In some examples, and without limitation, the user can engage the cable-carrying device to the inhibitor snap fit connection or a press, interference, or sliding fit. In some embodiments, a user can secure the cable-carrying device to the inhibitor by using a variety of mechanical fasteners such as screws, bolts, hooks, loops, and rivets. In other examples, the user can also apply sealants or adhesives such as pipe glue or an O-ring to form a seal at the interface of the cable-carrying device and the inhibitor.

In some embodiments, the method can further include the step of compressing the cable by a plurality of clamps. For example, referring generally to the exemplary systems as illustrated in FIGS. 5-12, 15, 17-18, and 22-25, and without limitation, the cable may be compressed by two or more clamps. In some examples, a user may connect a first cable-carrying device to a first inhibiting device, connect a second inhibiting device to the first via a second cable-carrying device, and connect a third cable-carrying device to the second inhibiting device.

In some embodiments, the user can separate the clamps both axially and transversely relative to a central axis of the cable-carrying devices. For example, and without limitation, a user can install a first and a second clamp which are transversely separated by ten inches and axially separated by an angle of one hundred and eighty degrees. In other examples, a user can install three clamps each of which are separated by five inches and one hundred and twenty degrees. However, it is to be appreciated that any transverse and/or axial separation may be selected in accordance with some embodiments of the present invention. In some embodiments, the user can determine the angular separation with respect to the distance between the two inhibitors and the maximum permissible deformation of the cable. The axial and transverse separation between the two inhibitors in part determine the maximum tensile load (when applied during an attempted removal of the cable) that the system can withstand.

In some embodiments, method can further include the step of increasing the coefficient of friction of one of the group consisting of the clamp, the clamp guide, the conduit, and combinations thereof. For example, and without limitation, a user may apply a layer of vulcanized rubber to both the clamp and the clamp guide. In other examples, the surface of the clamp or clamp guide can have a roughened surface or may have a tacky substance such as natural or synthetic oil or adhesive applied thereto. It is to be appreciated that other ways of increasing the coefficient of friction to increase the effectiveness of the inhibitor are contemplated in accordance with some embodiments of the present invention.

An Exemplary Method of Retrofitting a Conduit to Include an Inhibitor

In some embodiments, an inhibiting device can have a clamp and a body with at least two portions, and a retrofitting method can include the steps of: (i) forming an opening in a portion of the conduit, (ii) positioning the clamp through the opening and inside the conduit, (iii) positioning each portion of the body so as to partially circumscribe the conduit, and (iv) secure each portion of the body of the inhibiting device together.

For example, referring generally to the exemplary apparatuses as illustrated in FIGS. 13-15 and 25, and without limitation, an opening can be formed in a section of conduit containing a cable. In some examples the conduit can be fully cut while in other examples only a portion of the conduit needs be cut. It is to be appreciated that the opening must be of suitable dimensions for installing the clamp therein. For example, the cross section of the opening should be at least the same dimensions as the cross section of the clamp to be installed there through.

In some embodiments, after the opening is created in the conduit, a user can manipulate the clamp such that the cable is positioned inside the opening and between the clamp and a portion of the inhibiting device. In some examples, and referring generally to the exemplary apparatuses as illustrated in FIGS. 13-15, and without limitation, the clamp may include a rigid fastener with or without one or more extensions. In use, the user can "fish" the clamp around the cable so as to position the cable in an opening of the clamp (for example, located on an inside portion of the clamp). In some examples, and without limitation, a user can fish the rigid fastener around the cable before attaching one or more of the extensions. In other examples, a user can first attach one or more of the extensions before fishing the clamp (including the rigid fastener and extensions) around the cable. In other examples, and referring generally to the exemplary apparatus as illustrated in FIG. 25, and without limitation, the clamp may include a compression type clamp. In use, the user may not need to "fish" the clamp around the cable, but rather ensure that the cable and clamp are positioned such that when force is imparted on the clamp (via the actuator) it will compress the cable between the clamp and a portion of the conduit. In yet other examples, and referring generally to the exemplary apparatus as illustrated in FIGS. 26-36, the clamp may include a flexible portion which may "fished" around the cable before pulling it through a rigid portion and/or locking mechanism.

In some examples, and without limitation, the clamp guide may comprise two portions. In other examples, the clamp guide may comprise more than two portions. When it is desired to install the clamp guide around the conduit, a user can arrange the portions in a way such that, when assembled, the clamp guide completely circumscribes the conduit and completely covers the formed opening. In some embodiments, the user can apply a seal or a sealant to the interface between the clamp guide and the conduit to form an environmental barrier. However, it is to be appreciated that other type of securing means may be used in accordance with some embodiments of the present invention.

In some examples, the clamp guide may be installed after the clamp has been positioned inside the opening formed in the conduit. For example, referring generally to the exemplary apparatus as illustrated in FIG. 25, and without limitation, after the clamp is positioned inside the opening of the conduit, the actuator can be positioned though a hole in a first portion of the clamp guide. In another example, referring generally to the exemplary apparatus as illustrated in FIGS. 13-15, and without limitation, after the clamp may be positioned in the conduit opening (and "fished" around the cable), one or more extended portions of the clamp can be positioned through a slot in a first portion of the clamp guide. The first and second portions of the clamp guide may then be connected to each other. In some examples, and without limitation, the clamp guide portions can be attached to one another via attachment devices such as mechanical screws, bolts, or snap fit connectors.

In other examples, the clamp guide may be installed before the clamp has been positioned inside the opening formed in the conduit. For example, referring generally to the exemplary embodiments as illustrated in FIGS. 13-15, and without limitation, the entire clamp guide can be installed around the conduit before the clamp is located in the opening. After the clamp guide has been installed, the clamp can be positioned through the slot in the clamp guide. If the cable is already located inside of the conduit, the user may need to "fish" the clamp around it. If the cable has not already been positioned inside of the conduit, there may not be a need to "fish" the clamp.

As above, the user can then secure the cable by causing it to be compressed between a portion of the clamp and one or more portions of the clamp guide and conduit. In some examples, referring generally to the exemplary apparatuses as illustrated in FIGS. 13-15, and without limitation, a securing mechanism can be rotated with respect to a protruding end of a clamp, thereby causing the clamp to move radially in the direction of the securing mechanism. In other examples, referring generally to the exemplary apparatuses as illustrated in FIGS. 19-25, and without limitation, a user can secure the cable by applying force to the actuator (which can be incident or rotational) thereby causing the clamp to move in the direction opposite to the actuator. In some examples, and without limitation, the actuator and a portion of the clamp guide may have threaded features and the force may be applied by rotating a head on the actuator. In other examples, the actuator may comprise a hydraulic piston and the force may be applied by applying hydraulic pressure in the associated hydraulic lines.

In some embodiments, the user can install numerous inhibitors along a section of conduit. In some embodiments, the user can install two inhibitors separated axially and transversely relative to a central axis of the conduit. For example, as illustrated in the exemplary systems as illustrated in FIGS. 15 and 25, two inhibitors may be installed along a section of conduit. In some embodiments, a user can install additional inhibitors having the same axial orientation. In some embodiments, a user can install additional inhibitors having different axial orientations. For example, and without limitation, two inhibitors may be installed along a section of conduit, the inhibitors having a transverse separation of five inches and an axial separation of sixty degrees.

CONCLUSION

Thus, the present invention provides efficient and economical apparatuses, systems, and methods for inhibiting the removal of cable from conduit. In some embodiments, the inhibiting devices can include rigid fasteners, fabric, or compression type clamps. In some embodiments, the inhibiting devices can include unitary clamp guides or multiple component clamp guides suitable for retrofit applications. In some embodiments, a system can include a plurality of clamps which may be transversely and/or axially separated.

It is to be understood that variations, permutations, and modifications of the present invention may be made without departing from the scope thereof. As such, one or more features of some exemplary embodiments as described above may be practiced in conjunction with some other exemplary embodiments. For example, and without limitation, clamp 130A and clamp guide 122A of the exemplary inhibitor 110 as illustrated in FIG. 10 can be substituted with clamp 430A and clamp guide 422A as illustrated in the exemplary ratchet and coil system of FIGS. 16-18. In other examples, the clamp guide of the exemplary inhibitor as illustrated in FIG. 16 can be configured to have a number of subassembly components similar to the subassembly components of the clamp guide as illustrated in the exemplary inhibitor of FIG. 13. In other examples, a system can include both an inhibitor as illustrated in the example of FIG. 1 and an inhibitor as illustrated in the example of FIG. 19. In other examples, it is to be appreciated that any clamp style (for example, and without limitation, the u-bolt, the fabric, and the compression type clamps) may be practice in conjunction with any inhibitor style (for example, and without limitation, the individual inhibitor, the multiple clamp inhibitor, and the retrofit inhibitor). It is also to be understood that the present invention is not to be limited by the specific embodiments disclosed herein or as illustrated in the referenced drawings, but rather, is defined in accordance with the appended claims when read in light of the foregoing specification.

What is claimed is:

1. An apparatus for inhibiting the removal of a device axially disposed within a conduit, said apparatus comprising:
 a) a clamp guide engageable with said conduit, said clamp guide having an opening for axially receiving said device therethrough and a cavity adjacent to said opening;
 b) a moveable clamp at least partially enclosed in said clamp guide, wherein a portion of said clamp enclosed in said clamp guide is positionable in said cavity to permit said device to be received through said clamp guide opening and positionable in said clamp guide opening to frictionally engage said device; and c) a securing mechanism for securing said clamp to said clamp guide.

2. The apparatus of claim 1, wherein said clamp is capable of moving in a direction that is generally perpendicular to a central axis of said conduit.

3. The apparatus of claim 2, wherein said clamp is capable of frictionally compressing said device at a location where an axis of movement of said clamp generally intersects a vector running perpendicular from said central axis of said conduit towards said securing mechanism.

4. The apparatus of claim 2, wherein said clamp is capable of frictionally compressing said device at a location where an axis of movement of said clamp generally intersects a vector running perpendicular from said central axis of said conduit away from said securing mechanism.

5. The apparatus of claim 1, wherein said clamp comprises a rigid fastener.

6. The apparatus of claim 5, wherein said clamp further comprises one or more rigid extension pieces.

7. The apparatus of claim 5, wherein said clamp comprises threaded features and said securing mechanism comprises complementary threaded features.

8. The apparatus of claim 1, wherein said clamp comprises a flexible material having a high tensile strength.

9. The apparatus of claim 1, wherein at least a distal end of said clamp comprises a deformable material.

10. The apparatus of claim 9, further comprising an actuator engaged with said clamp and said securing mechanism.

11. The apparatus of claim 1, wherein said clamp guide engages said conduit though an adapter.

12. The apparatus of claim 1, wherein said clamp guide comprises a plurality of portions, wherein each of said portions partially circumscribes said conduit.

13. The apparatus of claim 1, wherein said clamp guide comprises a first end for engaging a first section of said conduit and a second end for engaging a second section of said conduit.

14. The apparatus of claim 1, further comprising a plurality of clamp guides transversely and axially separated relative to a central axis of said conduit.

15. The apparatus of claim 14, wherein at least two of said plurality of clamp guides are axially separated by about between 30 and 180 degrees.

16. The apparatus of claim 14, wherein a first of said plurality of clamp guides has an end for engaging a first section of conduit and a second of said plurality of clamp guides has an end for engaging a second section of conduit.

17. The apparatus of claim 1, further comprising anchoring features configured to engage said clamp in a fixed position with respect to a surrounding medium.

18. The apparatus of claim 1, wherein said portion of said clamp enclosed in said clamp guide comprises an opening for axially receiving said device.

19. The apparatus of claim 18, wherein said opening in said clamp is larger than said opening in said clamp guide.

20. The apparatus of claim 1, wherein said device is compressed between said clamp and an inner surface of said clamp guide when said portion of said clamp is positioned in said clamp guide opening.

21. The apparatus of claim 20, wherein said inner surface has a surface with an increased coefficient of friction.

22. The apparatus of claim 21, wherein said inner surface has a surface with one of the group consisting of a roughened material, vulcanized rubber, oil, an adhesive, and combinations thereof provided thereon.

23. The apparatus of claim 1, wherein said device is compressed between said clamp and an inner surface of said conduit when said portion of said clamp is positioned in said clamp guide opening.

24. A system for inhibiting the removal of a linear device axially disposed within a conduit, said system comprising:

a) a first inhibiting means engaged with a first section of said conduit;

b) a second inhibiting means engaged with a second section of said conduit; and c) a coupling means engaged with said first inhibiting means and said second inhibiting means, wherein each of said first and said second inhibiting means comprise an opening for axially receiving said device therethrough, a cavity adjacent to said opening, a clamp having a portion positionable in said cavity to permit said device to be received through said opening and positionable in said opening to frictionally engage said device, and a securing mechanism for securing said clamp.

25. The system of claim 24, wherein said first and said second inhibiting means are transversely and axially separated relative to a central axis of said conduit.

26. The system of claim 25, wherein said first and said second inhibiting means are axially separated by about between 30 and 180 degrees.

27. The system of claim 25, wherein said coupling means comprises a third section of said conduit.

28. The system of claim 25, wherein said coupling means comprises an adapter.

29. The system of claim 28, wherein at least one of said first and said second inhibiting means comprises said adapter.

30. The system of claim 24, wherein said coupling means comprises a portion of each of said first and said second inhibiting means.

31. The system of claim 24, wherein said clamps are capable of moving in directions generally perpendicular to a central axis of said conduit.

32. The system of claim 24, further comprising anchoring features configured to engage at least one of said inhibiting means relative to the surrounding medium.

33. The system of claim 24, wherein said device is compressed between at least one of said clamps and one of the group consisting of an inner surface of said first inhibiting means, an inner surface of said second inhibiting means, and combinations thereof when said portion of said clamp is positioned in said clamp guide opening.

34. The system of claim 24, wherein said device is compressed between at least one of said clamps and an inner surface of said coupling means when said portion of said clamp is positioned in said clamp guide opening.

35. The system of claim 24, wherein said device is compressed between at least one of said clamps and one of the group consisting of an inner surface of said first section of conduit, an inner surface of said second section of conduit, and combinations thereof when said portion of said clamp is positioned in said clamp guide opening.

36. The system of claim 24, wherein at least one of said clamps comprise a rigid fastener.

37. The system of claim 24, wherein at least one of said clamps comprise a flexible material having a high tensile strength.

38. The system of claim 24, wherein at least one of said clamps comprise a distal end formed of a deformable material.

39. A method of inhibiting the removal of a linear device in a conduit, comprising the steps of:
 a) engaging an inhibiting device to said conduit, said inhibiting device comprising a body, a clamp, and a securing mechanism, wherein said body has an opening for axially receiving said linear device and a cavity adjacent to said opening;
 b) positioning a portion of said clamp in said cavity;
 c) disposing said linear device through said opening;
 d) positioning said portion of said clamp in said opening to frictionally engage said linear device; and
 e) causing said securing mechanism to prevent said clamp from moving with respect to said body.

40. The method of claim 39, wherein said clamp comprises a rigid fastener, said step of positioning said portion of said clamp in said opening comprising
 pulling said clamp in a direction towards said securing mechanism.

41. The method of claim 39, wherein at least a portion of said clamp comprises a deformable material, said step of positioning said portion of said clamp in said opening comprising
 pushing said clamp in a direction away from said securing mechanism.

42. The method of claim 39, wherein said step of engaging said inhibiting device to said conduit comprises the steps of:
 a) forming at least a partial opening in a portion of said conduit, said opening formed in said conduit having a dimension at least equal to a dimension of said clamp;
 b) positioning said clamp through said opening formed in said conduit;
 c) positioning each of at least two portions of said body so as to partially circumscribe said conduit; and
 d) securing each of said portions of said body to each other such that said body completely circumscribes said conduit and completely covers said opening formed in said conduit.

43. The method of claim 39, wherein said clamp comprises a flexible material having a high tensile strength, said step of positioning said portion of said clamp in said opening comprising pulling said clamp in a direction towards said securing mechanism.

44. The method of claim 39, wherein said device is compressed between said portion of said clamp and an inner surface of said body.

45. The method of claim 39, wherein said device is compressed between said portion of said clamp and an inner surface of said conduit.

46. An apparatus for preventing the removal of a wire axially disposed in a housing, said apparatus comprising a movable clamp at least partially enclosed in said housing and a lock to fix the position of said clamp with respect to said housing, wherein a portion of said clamp has a first position in a cavity of said housing permitting said wire to be disposed in said housing and a second position in said housing for frictionally compressing said wire against an inner surface of said housing.

47. An apparatus for restraining a wire disposed in a conduit, said apparatus comprising:
 a) a housing with a first end for engaging with a first section of said conduit and a second end for engaging with a second section of said conduit, said housing having an opening for receiving said wire and a cavity adjacent to said opening;
 b) a U-bolt at least partially enclosed in said housing, said U-bolt having a bent portion and two extended portions, wherein said extended portions protrude through at least one opening in said housing; and
 c) at least two nuts for attachment to said extended portions, wherein said wire may be axially disposed in said housing when said bent portion of said U-bolt is positioned in said cavity and frictionally compressed between said bent portion of said U-bolt and said housing when said bent portion of said U-bolt is positioned in said opening and when said nuts are secured on said extended portions.

48. The apparatus of claim 47, wherein said U-Bolt further comprises a J-Bolt and at least one extension bolt.

49. An apparatus for restraining a wire disposed in a conduit, said apparatus comprising:
 a) a housing with a first end for engaging with a first section of said conduit and a second end for engaging with a second section of said conduit; and
 b) a strap at least partially enclosed in said housing, said strap having a first end engaged with a key disposed within a lock, wherein said key comprises a gear rack and said lock comprises a ratchet corresponding to said gear rack, wherein said wire may be axially disposed in said housing and frictionally compressed between said strap and said housing when said key is rotated in said lock.

50. An apparatus for restraining a wire disposed in a conduit, said apparatus comprising:
 a) a housing with a first end for engaging with a first section of said conduit and a second end for engaging with a second section of said conduit;
 b) a bolt having a first end inside said housing and a second end outside of said housing, wherein said first end has a deformable member attached thereto;
 c) a roll pin engaged with said bolt at a location inside of said housing; and
 d) a lock nut engaged with said bolt at a location outside said housing, wherein said wire may be axially disposed in said housing and frictionally compressed between said deformable member and said housing when said bolt is rotated with respect to said roll pin.

51. An apparatus for inhibiting the removal of a device axially disposed within a conduit, said apparatus comprising a clamp at least partially enclosed in a clamp guide, said clamp guide having an opening for axially receiving said device therein, wherein said apparatus is capable of frictionally compressing said device between said clamp and an inner surface of one of the group consisting of said clamp guide, said conduit, and combinations thereof, and wherein said clamp is capable of being secured to said clamp guide by a securing mechanism, wherein said clamp comprises a flexible material having a high tensile strength, wherein said clamp further comprises a rigid keyed portion and said clamp guide comprises a slot for receiving said keyed portion of said clamp therein.

52. The apparatus of claim 51, wherein said rigid keyed portion comprises said ratchet.

53. An apparatus comprising a moveable clamp having a distal end enclosed in a housing for engaging a conduit, said housing having an opening and a cavity adjacent to said opening, said clamp having an extended position for permitting a device to be disposed axially through said opening and a retracted position for engaging said device, wherein said distal end of said clamp is positioned in said cavity when said clamp is in said extended position, and wherein said distal end of said clamp is positioned in said opening when said clamp is in said retracted position.

54. The apparatus of claim 53, wherein said clamp comprises an opening for receiving said axially disposed device therethrough when said clamp is in said extended position.

55. The apparatus of claim 54, wherein said distal end of said clamp is capable of frictionally compressing said device against said housing when said clamp is in said refracted position.

56. The apparatus of claim 54, wherein said distal end of said clamp is capable of frictionally compressing said device against said conduit when said clamp is in said retracted position.

57. An apparatus comprising a moveable clamp having a distal end enclosed in a housing for engaging a conduit, said housing having an opening and a cavity adjacent to said opening, said clamp having a retracted position for permitting a device to be disposed axially through said opening and an extended position for engaging said device, wherein said distal end of said clamp is positioned in said cavity when said clamp is in said retracted position, and wherein said distal end of said clamp is positioned in said opening when said clamp is in said extended position.

58. The apparatus of claim 57, wherein said distal end of said clamp is capable of frictionally compressing said device against said housing when said clamp is in said extended position.

59. The apparatus of claim 57, wherein said distal end of said clamp is capable of frictionally compressing said device against said conduit when said clamp is in said extended position.

60. An apparatus for inhibiting the removal of an axially disposed device comprising:
 a) a housing for engaging a conduit, said housing having an opening for receiving said axially disposed device therethrough and a cavity adjacent to said opening;
 b) a movable clamp at least partially enclosed in said housing, said clamp having a distal end for frictionally compressing said axially disposed device, wherein said clamp distal end is capable of being positioned in said housing cavity to permit said axially disposed device to be received through said housing opening; and
 c) a mechanism for securing the position of said clamp with respect to said housing.

61. An apparatus for inhibiting the removal of an axially disposed device comprising:
 a) a housing for engaging a conduit, said housing having an opening for receiving said axially disposed device therethrough;
 b) a movable clamp with a distal end enclosed in said housing, said distal end having an opening for receiving and frictionally compressing said axially disposed device, wherein said housing opening is not larger than said clamp distal end opening to permit said axially disposed device to be received through said clamp distal end opening and said housing opening; and
 c) a mechanism for securing the position of said clamp with respect to said housing.

62. An apparatus for inhibiting the removal of an axially disposed device comprising:
 a) a housing for engaging a conduit, said housing having an opening for receiving said axially disposed device therethrough and a cavity adjacent to said opening;
 b) a movable clamp with a distal end enclosed in said housing, said distal end having an inner opening for receiving and frictionally compressing said axially disposed device, wherein said housing opening is not larger than said clamp distal end opening, and wherein said clamp distal end is capable of being positioned in said housing cavity; and
 c) a mechanism for securing the position of said clamp with respect to said housing.

63. An apparatus for inhibiting the removal of a device axially disposed within a conduit, said apparatus comprising:
 a) a clamp guide engageable with said conduit, said clamp guide having an opening for axially receiving said device therethrough;
 b) a moveable clamp at least partially enclosed in a said clamp guide, said clamp comprising a distal end for engaging said device and having an opening for axially receiving said device therethrough, wherein said opening of said clamp guide is not larger than said opening of said clamp distal end; and
 c) a securing mechanism for securing said clamp to said clamp guide.

64. The apparatus of claim 63, wherein said clamp comprises a rigid fastener.

65. The apparatus of claim 63, wherein said clamp comprises a flexible material having a high tensile strength.

66. An apparatus for preventing the removal of a wire axially disposed in a housing, said apparatus comprising a movable clamp at least partially enclosed in said housing and a lock to fix the position of said clamp with respect to said housing, wherein said housing has an opening for receiving said wire and wherein said clamp has an opening in a distal end thereof for receiving said wire, and wherein said housing opening is not smaller than said clamp distal end opening.

* * * * *

UNITED STATES PATENT AND TRADEMARK OFFICE
CERTIFICATE OF CORRECTION

PATENT NO. : 8,232,474 B2
APPLICATION NO. : 12/420474
DATED : July 31, 2012
INVENTOR(S) : Richard J. Yribarren It is certified that error appears in the above-identified patent and that said Letters Patent is hereby corrected as shown below:

IN THE CLAIMS

Column 39, line 32 of the issued patent: change "said conduit though an adapter" to -- said conduit through an adapter --.

Column 40, lines 65-66 of the issued patent: change "at least one of said clamps comprise" to -- at least one of said clamps comprises --.

Column 43, line 6-7 of the issued patent: change "said clamp in said refracted position" to -- said clamp in said retracted position --.

Signed and Sealed this
Twenty-eighth Day of May, 2013

Teresa Stanek Rea
*Acting Director of the United States Patent and Trademark Office*